(12) United States Patent
Oishi

(10) Patent No.: US 6,912,725 B2
(45) Date of Patent: Jun. 28, 2005

(54) DISC CARTRIDGE

(75) Inventor: Kengo Oishi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 301 days.

(21) Appl. No.: 10/147,994

(22) Filed: May 20, 2002

(65) Prior Publication Data

US 2002/0172142 A1 Nov. 21, 2002

(30) Foreign Application Priority Data

| May 21, 2001 | (JP) | ................................... 2001-151590 |
|---|---|---|
| May 21, 2001 | (JP) | ................................... 2001-151591 |
| May 25, 2001 | (JP) | ................................... 2001-157156 |
| May 25, 2001 | (JP) | ................................... 2001-157157 |
| May 28, 2001 | (JP) | ................................... 2001-159532 |
| Sep. 28, 2001 | (JP) | ................................... 2001-303441 |

(51) Int. Cl.[7] .............................................. G11B 23/03
(52) U.S. Cl. ..................... 720/741; 720/734; 360/133
(58) Field of Search ............................... 720/725, 738, 720/739, 741, 743; 360/133

(56) References Cited

U.S. PATENT DOCUMENTS

| 6,023,398 | A | * | 2/2000 | Tannert et al. ............. 360/133 |
|---|---|---|---|---|
| 6,205,116 | B1 | * | 3/2001 | Hashimoto .................. 369/291 |
| 6,356,527 | B1 | * | 3/2002 | Shiomi et al. ............. 369/291 |
| 6,614,622 | B2 | * | 9/2003 | Kikuchi et al. ............ 360/133 |
| 6,728,199 | B2 | * | 4/2004 | Obata et al. ................ 369/291 |
| 2001/0014079 | A1 | * | 8/2001 | Kikuchi et al. ............ 369/291 |
| 2001/0040866 | A1 | * | 11/2001 | Shiomi et al. ............. 369/291 |
| 2001/0055270 | A1 | * | 12/2001 | Obata et al. ................ 369/291 |
| 2002/0012316 | A1 | * | 1/2002 | Inoue et al. ................ 369/291 |
| 2002/0075796 | A1 | * | 6/2002 | Shiomi et al. ............. 369/291 |

FOREIGN PATENT DOCUMENTS

| DE | 3344368 A | * | 6/1984 | ............ G11B/5/01 |
|---|---|---|---|---|
| JP | 11-312353 | | 11/1999 | |
| JP | 2000-30394 | | 1/2000 | |
| JP | 2000-30395 | | 1/2000 | |
| JP | 2000-30396 | | 1/2000 | |
| JP | 2000-30397 | | 1/2000 | |
| JP | 2000-30398 | | 1/2000 | |
| JP | 2000-30399 | | 1/2000 | |
| JP | 2000-90626 | | 3/2000 | |
| JP | 2000-90627 | | 3/2000 | |
| JP | 2000-90628 | | 3/2000 | |
| JP | 2001023330 A | * | 1/2001 | ............ G11B/23/03 |

* cited by examiner

Primary Examiner—William J. Klimowicz
(74) Attorney, Agent, or Firm—Sughrue Mion, PLLC

(57) ABSTRACT

In a disc cartridge, when a shutter fitting portion disposed at the outside of a case is pressed, a shutter drawing portion is drawn to rotate an arcuate guide wall portion together with a shutter main body. The shutter drawing portion is swingable in the width direction of the arcuate guide wall portion, and thus occurrence of component force for inclining the shutter main body due to the pulling of the shutter drawing portion can be suppressed. Therefore, a first shutter member is smoothly rotated, and an aperture for access to a disc medium is opened. According to the present invention, there is provided a disc cartridge in which a shutter member for opening/closing an aperture for access to a disc medium housed therein can operate smoothly.

6 Claims, 40 Drawing Sheets

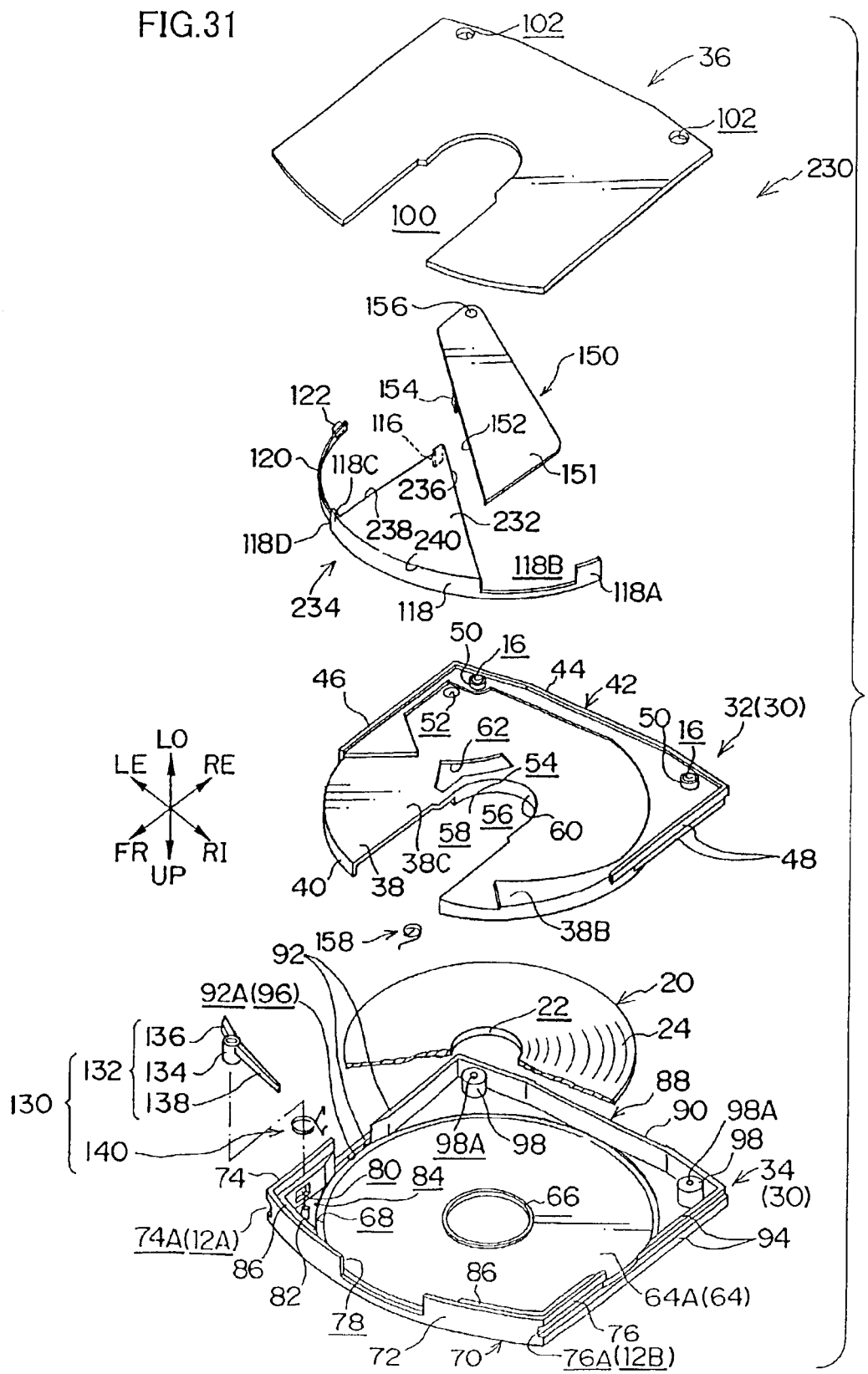

FIG.38
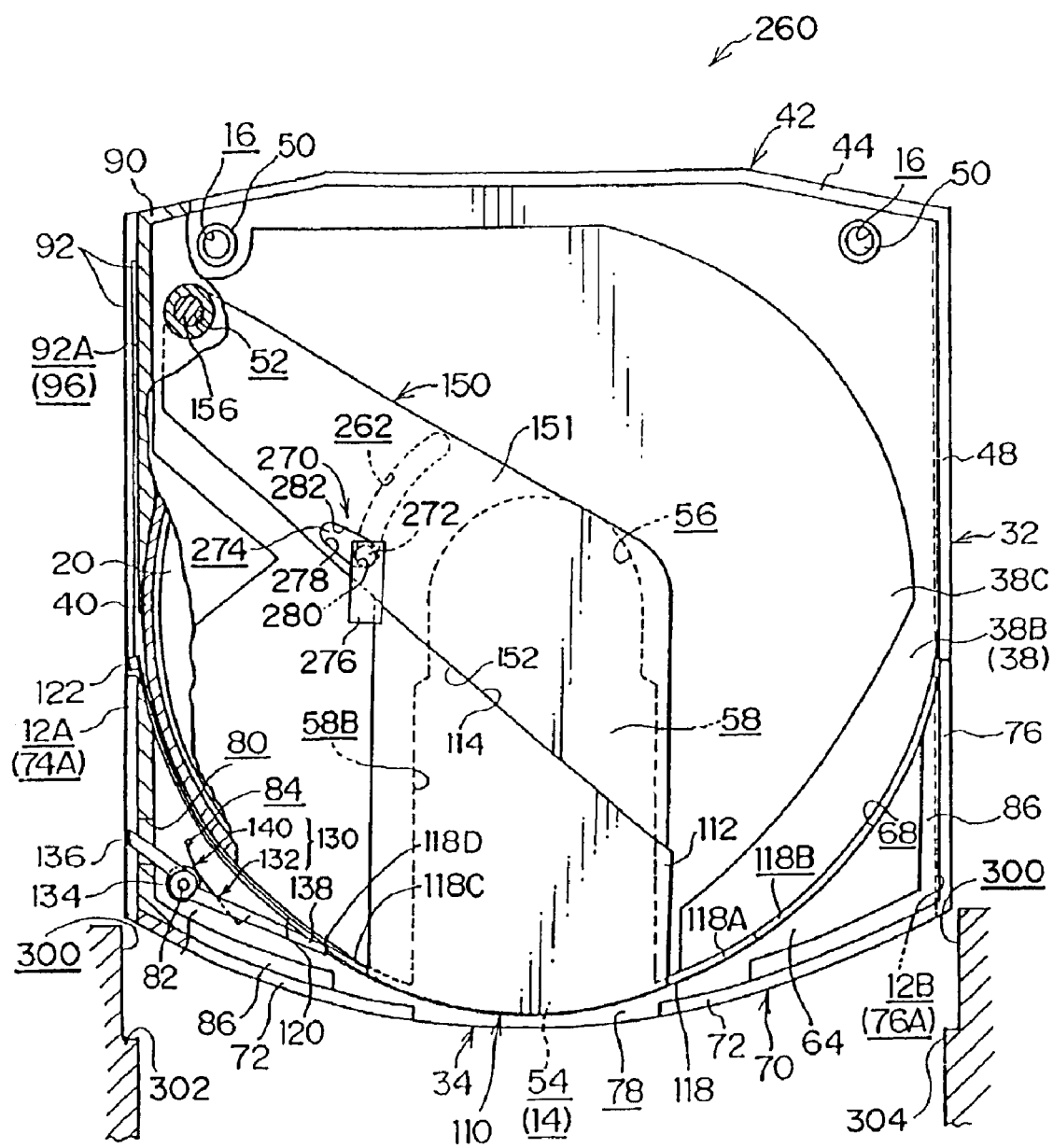
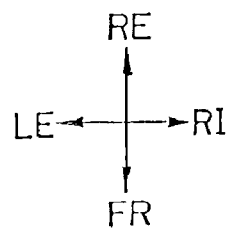

FIG.39
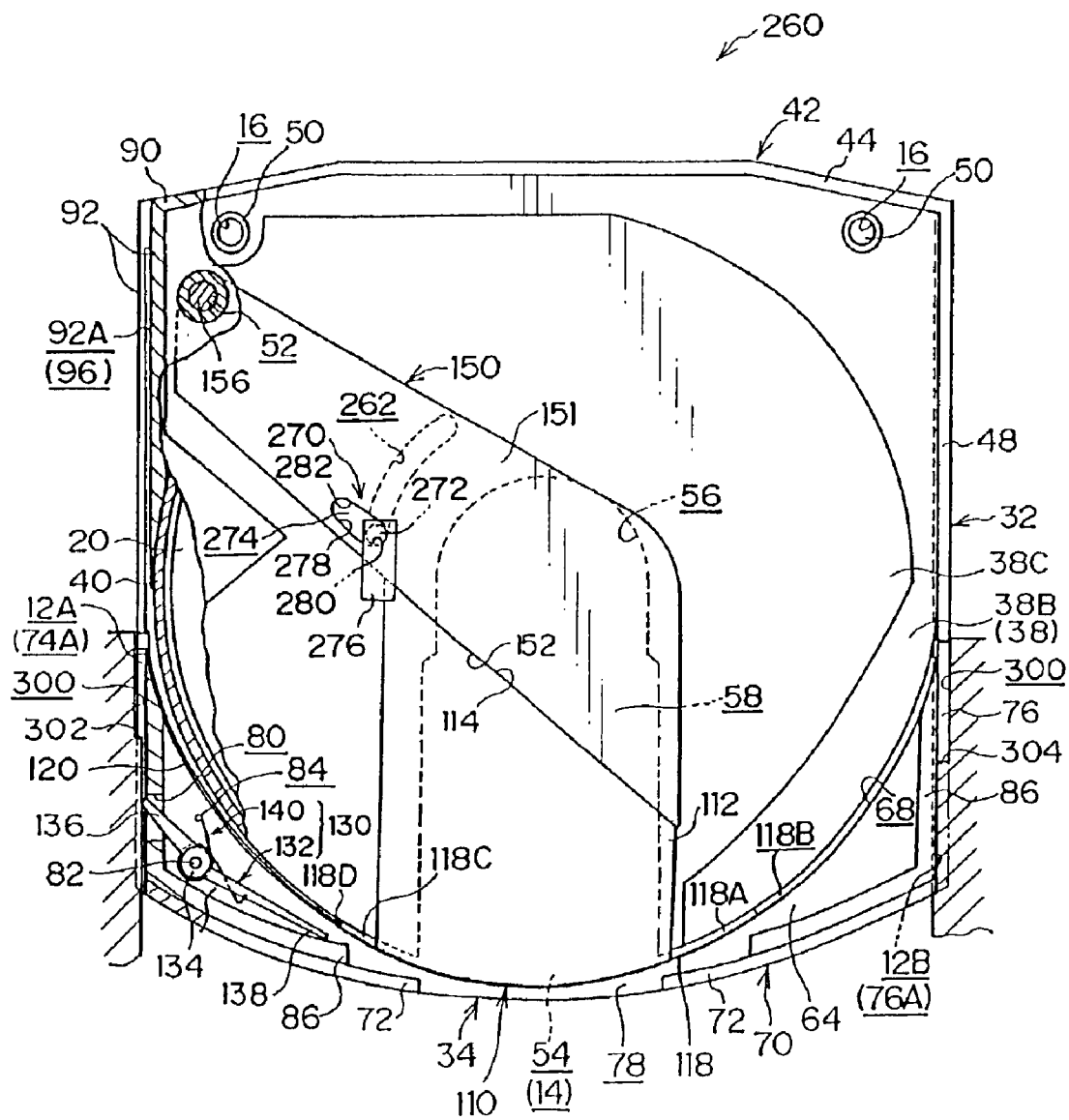
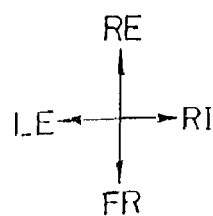

DISC CARTRIDGE

BACKGROUND OF THE INVENTION

1. Field of the Invention

The present invention relates to a disc cartridge in which a disc-shaped medium used as a recording/reproducing medium for an information processing device or the like is rotatably housed with preventing invasion of dust, etc. into the disc cartridge.

2. Description of the Related Art

Disc-type media such as an optical disc, a magneto-optical disc, etc. have been used as recording/reproducing media for portable computers, for example. When information is recorded into or reproduced from such a disc medium, a laser beam is irradiated onto a recording face of the disc medium while the disc medium is loaded and rotated in a drive device. The recording of the information on the disc medium is performed by formation of pits due to decomposition of a dye layer of the recording face, phase variation, magnetization or the like, and the reproduction of the recorded information from the disc medium is performed on the basis of variation in reflectivity or polarization angle of the laser beam.

In order to enhance the recording capacity for such disc media, it has been proposed to shorten the wavelength of a laser beam to be irradiated onto the recording face. When information recording or reproduction is carried out by using a short-wavelength laser beam, for example, a blue-violet laser beam, the laser beam is attenuated by a cover layer for protecting the recording face of the disc medium. In order to suppress the attenuation of the laser beam due to the cover layer, the thickness of the cover layer is required to be small. When the thickness of the cover layer is reduced as described above, the diameter of the spot of the laser beam on the surface of the cover layer (the exposed surface to the outside) is reduced, so that the influence of dust or the like adhering to the surface of the cover layer is no longer negligible.

Therefore, there has been used a disc cartridge having a case in which a disc medium is housed to prevent adhesion of dust, etc. to the disc medium. Such a cartridge is designed to have an aperture through which the center hole portion formed at the center portion of the disc medium and a part of the recording face (cover layer) of the disc medium are exposed to the outside, and a shutter member for opening/closing the aperture.

With this construction, the aperture of the disc cartridge is normally closed by the shutter member to prevent invasion of dust, etc. into the disc cartridge, that is, adhesion of dust or the like to the disc medium. The aperture is opened by the shutter member through the loading of the disc cartridge into the disc drive device, whereby holding of the center hole portion by a rotating spindle shaft and approach of the laser head to the recording face (irradiation of the laser beam) are allowed.

Such a disc cartridge is disclosed in Japanese Laid-open Patent Application No. 2000-30394. The disc cartridge disclosed in this publication will be described hereunder with reference to FIG. 43.

FIG. 43 is an exploded perspective view showing a disc cartridge 400.

As shown in FIG. 43, the disc cartridge 400 comprises an upper shell 402 and a lower shell 404 which are joined to each other to form a case, and a disc-shaped disc medium 406 is rotatably housed in the case. The lower shell 404 is equipped with a cylindrical wall 404 A in which the disc medium 406 is housed, and an aperture 408 which is cut out to extend from the front portion of the cylindrical wall 404 A to the substantially center portion of the lower shell 404.

The aperture 408 comprises a laser-head inserting (approaching) aperture 408A extending in the radial direction of the disc medium 406, and a rotating spindle-shaft inserting aperture 408B corresponding to the center hole portion 406A of the disc medium 406, the laser-head inserting aperture 408A and the rotating spindle-shaft inserting aperture 408B being formed continuously with each other, and the aperture 408 is used to access the disc medium 406.

The disc cartridge 400 is further equipped with a first shutter member 410 and a second shutter member 412 for opening/closing the aperture 408. The first shutter member 410 has a shutter main body 414 for mainly opening/closing a substantially trapezoidal aperture 408A, and a shutter guide portion 416 which is erectly provided at the front end of the shutter main body 414, formed in the arcuate shape corresponding to the cylindrical wall 404A, guided by the cylindrical wall 404A and opens/closes the notch portion (the start portion of the aperture 408) of the front portion of the cylindrical wall 404A.

One end portion of the shutter guide portion 416 is joined to a thin-plate type operating member 418 which can be deformed in the thickness direction, and a block-shaped operating portion 418A is provided to the tip of the operating member 418. The shutter guide portion 416 and the operating member 418 are formed integrally with each other, or they are formed separately from each other and then secured (fixed) to each other by adhesion, welding, press-fixing or the like to be joined to each other. Accordingly, the tension (operating force) which usually acts on the operating member 418 is transferred to the shutter guide portion 416 to rotate the shutter guide portion 416.

The second shutter member 412 is rotated around the rotational shaft 412C provided at the end portion thereof to mainly open/close the aperture 408B. A torsion spring (not shown) is equipped to the rotational shaft 412C, and the second shutter member is urged by the torsion spring so as to close the aperture 408B.

The disc cartridge 400 is equipped with a cover member 420 disposed so that the first and second shutter members 410, 412 are movable between the cover member 420 and the lower shell 404. The cover member 420 is provided with an aperture 422 to access the disc medium 406, which corresponds to the aperture 408.

In the disc cartridge 400, when the disc medium 406 is unused, the shutter main body 414 of the first shutter member 410 and the second shutter member 412 are disposed to close the apertures 408, 422 while the end faces 414A, 412A thereof abut against each other. Specifically, the first shutter member 410 mainly closes the aperture 408A, and the second shutter member 412 mainly closes the aperture 408B. Under this state, the shutter guide portion 416 of the first shutter member 410 closes the start portion of the aperture 408A (the cut-out portion of the cylindrical wall 404A).

On the other hand, when the disc medium 406 is used, the disc cartridge 400 is loaded in the drive device, and the end faces 414A, 412A of the first and second shutter members 410, 412 are moved in such a direction that they are separated from each other, thereby opening the apertures 408, 422.

Specifically, when the operating portion 418A fixed to the tip of the operating member 418 of the first shutter member 410 is moved in the direction of an arrow P along a guide groove 424 on the side surface of the case in connection with the loading of the cartridge into the drive device (the operating member 418 is drawn), the first shutter member 410 is rotated in the direction of an arrow Q around the axial center of the cylindrical wall 404A (that is, the disc medium 406) while the shutter guide portion 416 is guided along the outer peripheral surface of the cylindrical wall 404A.

Following this rotation, the first shutter member 410 presses a press-subjected piece 412B located along the end face 412A of the second shutter member 412 through a press piece 414B located along the end face 414A of the first shutter member 410 to rotate the second shutter member 412 in the direction of an arrow R around the rotational shaft 412C. That is, the first shutter member 410 and the second shutter member 412 are rotated in the different directions while interlocked with each other, thereby opening the apertures 408, 422. Under this state, a window portion 416A formed in the shutter guide portion 416 is located at the front portion of the cylindrical wall 404A to open the cut-out portion (aperture 408A) of the cylindrical wall 404A.

On the other hand, when the apertures 408, 422 thus opened are closed again, the operating portion 418A is pressed in the opposite direction to the direction of the arrow P by the drive device, or the first shutter member 410 is pressed through the press piece 414B by the press-subjected piece 412B of the second shutter member 412 with the urging force of the torsion spring, whereby the first and second shutter members 410, 412 are rotated in the closing direction of the aperture 408, etc. (in the opposite directions to the directions of the arrows Q, R) while interlocked with each other, thereby closing the apertures 408, 422.

As omitted from the drawings, a modification of the interlocking means for interlocking the first and second shutter members 410, 412 is described in the above publication. The interlocking means according to this modification is equipped with a projecting portion disposed away from the rotational center of the first shutter member 410 (the axial center of the cylindrical wall 404A) and an elongated hole in which the projecting portion provided to the second shutter member 412 is fitted, instead of the press piece 414B and the press-subjected piece 412B.

When the aperture 408, etc. are closed, the interlocking means is designed so that the projecting portion presses the hole wall of the elongated hole while the difference in rotational locus between the first shutter member 410 and the second shutter member 412 is absorbed by the movement of the projecting portion in the longitudinal direction of the elongated hole, whereby the second shutter member 412 is allowed to be driven by the first shutter member 410 even when the aperture 408, etc. are closed, so that the torsion spring described above is unnecessary.

However, the disc cartridge 400 as described above has the following problems.

First, in the disc cartridge 400, the shutter guide portion 416 and the operating member 418 are fixed to each other as described above, so that there occurs such a case that the rotational direction (the direction of the arrow Q) of the shutter guide portion 416 of the first shutter member 410 and the operating direction (the direction of the arrow P) of the operating member 418 are displaced from each other in the up-and-down direction due to errors in working (in case of being formed integrally) and errors in installation (in case of being fixed separately). That is, there occurs such a case that the longitudinal direction of the shutter guide portion 416 and the longitudinal direction of the operating member 418 are displaced from each other in the intersecting direction (the state that the center line of the operating member 418 is inclined in the height direction with respect to the center line of the shutter guide portion 416).

The displacement in the longitudinal direction between the shutter guide portion 416 and the operating member 418 makes a part of the operating force acting on the operating portion 418A (operating member 418) act as component force in a direction different from that of the rotational force of the shutter guide portion 416, so that not only the operating force required to open/close the aperture 408, etc. is magnified, but also the first shutter member 410 is inclined, thereby disturbing the smooth operation of the first shutter member 410. When the displacement is large, it is difficult to suitably dispose the operating portion 418A fixed to the tip of the operating member 418 in the guide groove 424.

Secondly, in the disc cartridge 400, the first shutter member 410 presses the second shutter member 412 to open the aperture 408, etc., so that large force (operating force) is required to slide the shutter guide portion 416 of the first shutter member 410 along the cylindrical wall 404A. Particularly when the sliding motion is not smooth, the first shutter member 410 may wear the outer peripheral surface of the cylindrical wall 404A to cause occurrence of powder dust (wear powder).

Likewise, particularly when the sliding motion between the upper end face of the shutter guide portion 416 of the first shutter member 410 and the inner surface of the upper shell 402 and the sliding motion between the lower surface of the first shutter member 410 (the shutter main body 414 and the shutter guide portion 416) and the inner surface of the cover member 420 are not smooth, the upper end face and lower end face of the first shutter member 410 wear the inner surface of the upper shell 402 and the inner surface of the cover member 420, so that powder dust, etc. may occur.

Such powder dust, etc. adhere to the recording face of the disc medium 406 to cause occurrence of errors (loss of recording/reproducing signals, so-called drop-out) in the recording/reproducing operation.

Thirdly, in the disc cartridge 400, a corner portion 414D is formed in the shutter main body 414 of the first shutter member 410 so as to be sandwiched between the abutting end face 414A and the end face 414C which abuts against the end portion of the aperture 408, etc. under the state that the aperture 408, etc. is closed, and when the aperture 408, etc. are closed, the corner portion 414D passes the aperture 408, etc. and is accommodated in a reception portion between the lower shell 404 (case) and the cover member 420. Therefore, if the shutter main body 414 constituting the first shutter member 410 is warped, the corner portion 414D may interfere in the reception port of the reception portion (the edge portion of the aperture 408 or the aperture 422).

The interference between the first shutter member 410 (corner portion 414D) and the edge portion of the aperture 408 or aperture 422 not only disturbs the smooth motion of the first shutter member 410, but also makes it impossible to close the aperture 408, etc. That is, the dust-proof performance for the disc medium 406 is lowered, and in accordance with the construction of the drive device, it maybe impossible to unload the disc cartridge 400 from the drive device.

Fourthly, in the conventional cartridge 400 having joint means according to the modification, the elongated hole of the interlocking means is designed to be linear. Therefore, the gap between the elongated hole and the projecting portion is required to be minimized in order to close the aperture 408, etc. with no gap by the abutting of the end faces 414A, 412A of the first and second shutter members 410 and 412 against each other when the opened aperture 408, etc. are closed again.

Therefore, there is a case that the operating force (driving force) to make the first and second shutter members 410, 412 operate interlockingly with each other is magnified, and also the first shutter member 410 and the second shutter member 412 do not operate (interlock with each other) smoothly. Further, in order to make the first and second shutter members 410, 412 interlock with each other properly, excessive dimensional precision and installation precision are required to the interlocking means, resulting in increase of the cost.

SUMMARY OF THE INVENTION

In view of the foregoing situation, a first object of the present invention is to provide a disc cartridge in which a shutter member operates smoothly.

More specifically, a second object of the present invention is to provide a disc cartridge in which a shutter guide portion of a shutter member and an operating member are properly joined to each other to smoothly open an aperture to access a disc medium.

A third object of the present invention is to provide a disc cartridge in which the sliding performance of a shutter member is improved so that the opening/closing operation of a shutter member can be smoothly performed.

A fourth object of the present invention is to provide a disc cartridge in which a shutter member can operate smoothly so that the end portion thereof does not interfere in the edge portion of an aperture, and the aperture to access a disc medium can be surely closed.

A fifth object of the present invention is to provide a disc cartridge in which a first shutter member and a second shutter member are smoothly interlocked with each other by proper driving force, and an aperture to access a disc medium can be surely closed.

(1) In order to attain the first and second objects, the disc cartridge is characterized by including: an aperture to access a disc-shaped medium, the aperture being formed in a case in which a disc-shaped disc medium is rotatably housed inside a cylindrical wall having a substantially cylindrical shape; a plate-shaped shutter main body which is rotated to open/close at least a part of the aperture; a shutter guide portion which is curved along the cylindrical wall and erectly provided to the shutter main body; and an operating member having one end portion joined to the shutter guide portion and the other end portion located at the outside of the case, the other end of the operating member being drawn from the external to rotate the shutter guide portion along the cylindrical wall when at least a part of the aperture is opened, wherein the operating member is joined so as to be slidable in the width direction of the shutter guide portion.

In the disc cartridge of (1), the aperture to access the disc medium is formed at one surface or both the surfaces of the disc-shaped medium of the case in which the disc medium is rotatably housed, and at least a part of the aperture is closed by the shutter main body when the disc medium is unused, thereby preventing invasion of dust into the case.

When the disc medium is used, the other end portion of the operating member whose one end portion is joined to the shutter guide portion is drawn out from the external, and the shutter guide portion is rotated along the cylindrical wall, whereby the shutter main body is rotated in the opening direction and at least a part of the aperture to access the disc medium is opened.

It is needless to say that the disc cartridge may be designed so that the whole of the aperture of the shutter main body is opened/closed or so that a part of the residual part of the aperture is opened/closed by another shutter member or the like.

Since the operating member is joined to the shutter guide portion so as to be swingable in the width direction of the shutter guide portion (the height direction of the cylindrical wall), even when the operating member is drawn out under the state that the longitudinal direction of the operating member and the longitudinal direction of the shutter guide portion are displaced from each other, the operating member is swung in the width direction, and thus it is difficult to generate component force to move the shutter guide portion in the width direction (to incline the shutter main body with respect to the aperture-formed face). Accordingly, the shutter guide portion and the shutter main body are smoothly rotated and the aperture is opened.

As described above, in the disc cartridge of (1), the shutter guide portion and the operating member can be properly joined to each other, and the aperture to access the disc medium can be smoothly opened. That is, the shutter member is smoothly operated.

(2) In the disc cartridge of (1), the width of the operating member is set to be smaller than the width of the shutter guide portion.

In the disc cartridge of (2), the width of the operating member (the width in the height direction of the cylindrical wall) is smaller than the width of the shutter guide portion, so that the operating member is surely swingable without interfering in the case and generation of the component force which would incline the shutter main body due to the drawing operation of the operating member can be surely suppressed.

Further, the installation of the operating member to the case can be easily performed, and the disc cartridge can be designed to be compact in size (reduced in thickness).

(3) In order to attain the first object, the disc cartridge is characterized by including: an aperture to access a disc-shaped medium, the aperture being formed in a case in which a disc-shaped disc medium is rotatably housed inside a cylindrical wall having a substantially cylindrical shape; a plate-shaped shutter main body which is rotated to open/close at least a part of the aperture; a shutter guide portion which is curved along the cylindrical wall and erectly provided to the shutter main body; and an operating member having one end portion joined to the shutter guide portion and the other end portion located at the outside of the case, the other end of the operating member being drawn from the external to rotate the shutter guide portion along the cylindrical wall when at least a part of the aperture is opened, wherein the operating member is joined to a portion located at the outside of the inner peripheral surface of the shutter guide portion.

In the disc cartridge of (3), the aperture to access the disc medium is formed at one surface or both the surfaces of the disc-shaped medium of the case in which the disc medium is rotatably housed, and at least a part of the aperture is closed by the shutter main body when the disc medium is unused, thereby preventing invasion of dust into the case.

When the disc medium is used, the other end portion of the operating member whose one end portion is joined to the shutter guide portion is drawn out from the external, and the shutter guide portion is rotated along the cylindrical wall, whereby the shutter main body having the shutter guide portion erected therefrom is rotated in the opening direction of the aperture and at least a part of the aperture to access the disc medium is opened.

It is needless to say that the disc cartridge may be modified so that the shutter main body opens/closes the whole of the shutter main body, or a part of the residual part of the aperture is opened/closed by another shutter member or the like.

Since the operating member is joined to a portion (outer peripheral surface side) located at the outside of the inner peripheral surface of the shutter guide portion, the sliding between the operating member and the cylindrical wall through the drawing operation thereof is prevented or the sliding area is reduced, so that the sliding resistance to the cylindrical wall is suppressed. Therefore, the operating force (driving force) of the operating member when the aperture is opened is suppressed, and the operating member operates smoothly. It is needless to say that in this construction the shutter guide portion and the operating member may be integrally formed or the operating member may be joined to the shutter guide portion so as to be swingable in the height direction of the cylindrical direction (the width direction of the shutter guide portion).

As described above, in the disc cartridge of (3), the shutter member operates smoothly.

(4) In any disc cartridge of (1) to (3), the operating member is joined to the shutter guide portion while a through-hole provided at the one end portion of the operating member is loosely fitted to a support shaft provided on the outer surface of the shutter guide portion.

In the disc cartridge of (4), the through-hole formed at one end portion of the operating member is loosely fitted to the support shaft provided to the outer surface of the shutter guide portion, and the operating member is joined to the shutter guide portion. Therefore, with such a simple structure, the operating member is joined to the outer surface of the shutter guide portion (a portion located at the outside of the inner peripheral surface) so as to be swingable in the width direction.

(5) In order to attain the first and third objects, a disc cartridge includes: a case which is formed by joining an upper shell and a lower shell to each other and in which a disc-shaped medium is rotatably housed inside a cylindrical wall formed erectly on the inner surface of the lower shell; an aperture to access the disc medium which is formed in the lower shell by cutting out the cylindrical wall from the front portion thereof; a shutter member which is provided to the outside of the lower shell and slides along the outer peripheral surface of the cylindrical wall to open/close the aperture; and a cover member having an aperture which is formed by cutting out the cover member from the front portion thereof so as to be overlapped with said aperture to access the disc medium, the shutter member being movably accommodated between the cover member and the lower shell, wherein the inner surface of a site of the shutter member which is designed to have such a width dimension that the aperture of the cylindrical wall can be closed is designed to have a friction reducing shape that reduces the friction between the inner surface of the site of the shutter member and the outer peripheral surface of the cylindrical wall.

In the disc cartridge of (5), the aperture to access the disc medium formed in the lower shell, which constitutes the case with the upper case and houses the disc medium inside the cylindrical wall thereof, is opened/closed through the sliding motion of the shutter member along the cylindrical wall. The aperture to access the disc medium may be formed in the upper shell.

At least a part of the site of the shutter member which slides along the cylindrical wall is designed to have such a width dimension that the aperture of the cylindrical wall formed by cutting out the front portion of the cylindrical wall erected from the lower shell can be closed, and the aperture of the cylindrical wall is opened/closed through the sliding motion.

Here, the inner surface of the site of the shutter member which is designed to have such a width dimension that the aperture of the cylindrical wall can be closed is designed to have a friction reducing shape which reduces the friction between the inner surface of the site of the shutter member and the outer peripheral surface of the cylindrical wall, so that the sliding resistance (friction) between the outer peripheral surface of the cylindrical wall of the lower shell and the inner surface of the shutter member is reduced. Therefore, the shutter member is smoothly slid, and malfunction due to friction and occurrence of powder dust, etc. due to wear can be prevented. Accordingly, the aperture to access the disc medium can be stably opened/closed, and occurrence of errors in the recording/reproducing operation due to adhesion of powder dust, etc. to the disc medium can be prevented.

As described above, in the disc cartridge of (5), the sliding performance of the shutter member can be improved, and the opening/closing operation of the shutter member can be smoothly performed. That is, the shutter member operates smoothly.

(6) In order to attain the first and third objects, a disc cartridge includes: a case which is formed by joining an upper shell and a lower shell to each other and in which a disc-shaped medium is rotatably housed inside a cylindrical wall formed erectly on the inner surface of the lower shell; an aperture to access the disc medium which is formed in the lower shell by cutting out the cylindrical wall from the front portion thereof; a shutter member which is provided to the outside of the lower shell and slides along the outer peripheral surface of the cylindrical wall to open/close the aperture; and a cover member having an aperture which is formed by cutting out the cover member from the front portion thereof so as to be overlapped with the aperture to access the disc medium, the shutter member being movably accommodated between the cover member and the lower shell, wherein the outer peripheral surface of the cylindrical wall of the lower shell is designed to have a friction reducing shape that reduces the friction between the inner surface of the site of the shutter member and the outer peripheral surface of the cylindrical wall.

In the disc cartridge of (6), the aperture to access the disc medium formed in the lower shell, which constitutes the case with the upper case and houses the disc medium inside the cylindrical wall thereof, is opened/closed through the sliding motion of the shutter member along the cylindrical wall. The aperture to access the disc medium may be formed in the upper shell.

At least a part of the site of the shutter member which slides along the cylindrical wall is designed to have such a width dimension that the aperture of the cylindrical wall formed by cutting out the front portion of the cylindrical wall erected from the lower shell can be closed, and the aperture of the cylindrical wall is opened/closed through the sliding motion.

Here, the outer peripheral surface of the cylindrical wall of the lower shell is designed to have a friction reducing shape which reduces the friction between the inner surface of the site of the shutter member and the outer peripheral surface of the cylindrical wall, so that the sliding resistance (friction) between the outer peripheral surface of the cylindrical wall of the lower shell and the inner surface of the shutter member is reduced. Therefore, the shutter member is smoothly slid, and malfunction due to friction and occurrence of powder dust, etc. due to wear can be prevented. Accordingly, the aperture to access the disc medium can be stably opened/closed, and occurrence of errors in the recording/reproducing operation due to adhesion of powder dust, etc. to the disc medium can be prevented.

As described above, in the disc cartridge of (6), the sliding performance of the shutter member can be improved, and the opening/closing operation of the shutter member can be smoothly performed. That is, the shutter member operates smoothly.

(7) In the disc cartridge of (5) or (6), the friction reducing shape is a substantially uneven shape in plan view which is achieved by providing plural grooves extending in the up-and-down direction.

In the disc cartridge of (7), since the friction reducing shape formed on one or both of the inner surface of the shutter member and the outer peripheral surface of the cylindrical wall is a substantially uneven shape in plan view which is achieved by providing plural grooves extending in the up-and-down direction, the contact area of the outer peripheral surface of the cylindrical wall of the lower shell and the inner surface of the shutter member can be suitably reduced, and thus the sliding resistance (friction) can be surely reduced.

(8) In the disc cartridge of (5), the friction reducing shape is a substantially uneven shape which is achieved by providing many minute projections.

In the disc cartridge of (8), since the friction reducing shape formed on the inner surface of the shutter member is a substantially uneven shape which is achieved by providing many minute projections, the contact area of the outer peripheral surface of the cylindrical wall of the lower shell and the inner surface of the shutter member can be suitably reduced, and thus the sliding resistance (friction) can be surely reduced. It is preferable that these minute projections are not provided to the lower shell because the structure of the metal mold is complicated. Accordingly, in this case, they are provided to only the inner surface of the shutter member.

(9) In any disc cartridge of (5) to (8), the inner surface of the site of the shutter member which is designed to have such a width dimension that the aperture of the cylindrical wall can be closed is formed of a material having excellent sliding performance and wear resistance.

In the disc cartridge of (9), since the inner surface of the shutter member is formed of a material having excellent sliding performance and wear resistance, the sliding motion of the shutter member can be more smoothly made, and also occurrence of powder dust, etc. can be further remarkably prevented.

(10) In order to attain the first and third objects, a disc cartridge includes: a case which is formed by joining an upper shell and a lower shell to each other and in which a disc-shaped medium is rotatably housed inside a cylindrical wall formed erectly on the inner surface of the lower shell; an aperture to access the disc medium which is formed in the lower shell by cutting out the cylindrical wall from the front portion thereof; a shutter member which is provided to the outside of the lower shell and slides along the outer peripheral surface of the cylindrical wall to open/close the aperture; and a cover member having an aperture which is formed by cutting out the cover member from the front portion thereof so as to be overlapped with the aperture to access the disc medium, the shutter member being movably accommodated between the cover member and the lower shell, wherein a site of the shutter member whose width dimension is set so that the aperture of the cylindrical wall can be closed, the site at least including the upper end portion and/or the lower end portion of the shutter member, is designed to have a friction reducing shape which reduces the friction between the upper end portion and/or the lower end portion of the site of the shutter member and the upper shell and/or the cover member.

In the disc cartridge of (10), the aperture to access the disc medium formed in the lower shell, which constitutes the case with the upper case and houses the disc medium inside the cylindrical wall thereof, is opened/closed through the sliding motion of the shutter member along the cylindrical wall. The aperture to access the disc medium may be formed in the upper shell.

At least a part of the site of the shutter member which slides along the cylindrical wall is designed to have such a width dimension that the aperture of the cylindrical wall formed by cutting out the front portion of the cylindrical wall erected from the lower shell can be closed, and the aperture of the cylindrical wall is opened/closed through the sliding motion.

Here, the site of the shutter member (the site at least includes the upper end portion and/or the lower end portion of the shutter member) whose width dimension is set so that the aperture of the cylindrical wall can be closed is designed to have a friction reducing shape which reduces the friction between the upper end portion and/or the lower end portion of the site of the shutter member and the upper shell and/or the cover member, and thus the sliding resistance (friction) between the upper end portion of the shutter member and the upper shell and/or the sliding resistance (friction) between the lower end portion of the shutter member and the cover member are reduced. Therefore, the shutter member makes a smooth sliding motion, and malfunction due to friction and occurrence of powder dust, etc. due to wear can be prevented. Accordingly, the aperture to access the disc medium can be stably opened/closed, and occurrence of errors in the recording/reproducing operation due to adhesion of powder dust, etc. to the disc medium can be prevented.

As described above, in the disc cartridge of (10), the sliding performance of the shutter member is improved, and the opening/closing operation of the shutter member can be smoothly performed. That is, the shutter member operates smoothly.

(11) In the disc cartridge of (10), the friction reducing shape is a substantially corrugated shape in front view.

In the disc cartridge of (11), since the friction reducing shape formed on at least the upper end portion and/or the lower end portion of the site of the shutter member whose width dimension is set so that the aperture of the cylindrical wall can be closed is a substantially corrugated shape in front view, the contact area between the upper end portion of the shutter member and the upper shell and/or the contact area between the lower end portion of the shutter member and the cover member can be suitably reduced, and the sliding resistance (friction) can be surely reduced.

(12) In the disc cartridge of (10), the friction reducing shape is a substantially uneven shape in front view.

In the disc cartridge of (12), since the friction reducing shape formed on at least the upper end portion and/or the lower end portion of the site of the shutter member whose width dimension is set so that the aperture of the cylindrical wall can be closed is a substantially uneven shape in front view, the contact area between the upper end portion of the shutter member and the upper shell and/or the contact area between the lower end portion of the shutter member and the cover member can be suitably reduced, and the sliding resistance (friction) can be surely reduced.

(13) In the disc cartridge of (10) to (12), at least the upper end portion and/or the lower end portion of the site of the shutter member whose width dimension is set so that the aperture of the cylindrical wall can be closed is formed of a material having excellent sliding performance and wear resistance.

In the disc cartridge of (13), since at least the upper end portion and/or the lower end portion of the site of the shutter member whose width dimension is set so that the aperture of the cylindrical wall can be closed is formed of a material having excellent sliding performance and wear resistance, the sliding motion of the shutter member can be further smoothly performed, and occurrence of powder dust, etc. can be more remarkably prevented.

(14) In order to attain the first and fourth objects, a disc cartridge includes: an aperture to access a disc-shaped medium, the aperture being formed in a case in which the disc medium is rotatably housed; a shutter member for opening/closing at least a part of the aperture; and a cover member having an aperture corresponding to the aperture, the shutter member being accommodated between the cover member and the case, wherein when the aperture is closed, the close-side end portion of the shutter member passes the aperture and is accommodated in a reception portion between the case and the cover member, and at least one of the edge portion of the close-side end portion of the shutter member and the edge portion of the reception port of the reception portion is chamfered to have a tapered structure.

In the disc cartridge of (14), the aperture to access the disc medium is formed on one or both of the surfaces of the case in which the disc-shaped disc medium is rotatably housed, and at least a part of the aperture is opened/closed through the sliding motion of the shutter member between the case and the cover member.

Particularly when the aperture is closed, the close-side end portion of the shutter member (the end portion of the head side in the moving direction) passes the aperture through the movement of the shutter member, and then it is accommodated in the reception portion between the case and the cover member.

The disc cartridge may be designed so that the shutter member opens/closes the whole of the aperture or a part of the residual part of the aperture is opened/closed by another shutter member or the like.

Here, at least one of the edge portion of the close-side end portion of the shutter member (the end portion in the thickness direction) and the edge portion of the reception port of the reception portion is chamfered to have a tapered structure. In other words, at least the close-side end portion of the shutter member is tapered, or the reception port (aperture) of the reception portion is expanded. Therefore, the interference between the close-side end portion of the shutter member and the reception portion (that is, the edge portion of the aperture of the case or cover member) through the closing operation of the aperture can be prevented.

Accordingly, even when the shutter member is warped, the close-side end portion of the shutter member can be accommodated in (enter) the reception portion smoothly to surely close the aperture.

The tapered structure of the close-side end portion of the shutter member and the reception portion is preferably provided to the warp side of at least the shutter member (or a side at which a warp is expected to occur). Further, both the close-side end portion of the shutter member and the reception portion may be designed in the tapered structure. Further, the tapered structure of (14) contains a tapered structure achieved by chamfering which provides a curved line in sectional profile (in cross-sectional view).

As described above, in the disc cartridge of (14), the shutter member can be smoothly operated with no interference between the end portion thereof and the edge portion of the aperture, and the aperture to access the disc medium can be surely closed. That is, the shutter member operates smoothly.

(15) In the disc cartridge of (14), the tapered structure is formed substantially symmetrically by chamfering the edge portions at both the sides of the shutter member in the thickness direction and/or both the confronting edge portions of the reception port.

The tapered structure of (14) contains an asymmetrical tapered structure achieved by chamfering one surface of the shutter member or one edge portion of the reception port (case or cover member). However, in the disc cartridge of (15), the tapered structure is substantially symmetrically formed by chamfering the edge portions at both the sides of the shutter member in the thickness direction and/or both the confronting edge portions of the reception port (the aperture edge portions of the case and the cover member), so that it is unnecessary to identify the warping direction of the shutter member in the working or installing step of the shutter member and thus the workability and installation can be enhanced.

(16) In order to attain the first and fourth objects, a disc cartridge includes: an aperture to access a disc-shaped medium which is provided to a case in which the disc medium is rotatably housed inside a cylindrical wall having a substantially cylindrical shape; a shutter main body having a flat-plate shape which is rotated to open/close at least a part of the aperture; and a shutter guide portion which is erectly provided to the shutter main body and curved along the cylindrical wall, wherein when the shutter main body is rotated in the closing direction of the aperture to close at least a part of the aperture while the shutter guide portion is guided along the cylindrical wall, the close-side end portion of the shutter main body passes the aperture and is accommodated between the case and the cover member with the abutting portion thereof against the shutter guide portion located at the head side.

In the disc cartridge of (16), the aperture to access the disc medium is formed in one surface or both the surfaces of the case in which the disc medium is rotatably housed inside the cylindrical wall, and the shutter main body is rotated while the shutter guide portion is guided along the cylindrical wall, thereby opening/closing at least a part of the aperture.

Particularly when the close-side end portion of the shutter main body passes the aperture through the rotation of the shutter main body and then is accommodated between the case and the cover member.

The disc cartridge may be designed so that the shutter member opens/closes the whole of the aperture or a part of the residual part of the aperture is opened/closed by another shutter member or the like.

Here, when the aperture is closed, the close-side end portion of the shutter main body is accommodated between the case and the cover member with the abutting portion thereof against the shutter guide portion located at the head side. In other words, the close-side end portion of the shutter main body is accommodated between the case and the cover member while the portion which is prevented from being warped by the shutter guide portion is located at the head side. Therefore, even when a warp occurs, the close-side end portion of the shutter main body is smoothly accommodated in (enters) the gap between the case and the cover member while the warp is corrected, whereby the aperture can be surely closed.

As described above, in the disc cartridge of (16), the shutter member can be smoothly operated with no interference between the end portion thereof and the edge portion of the aperture, and the aperture to access the disc medium can be surely closed. That is, the shutter member operates smoothly.

(17) In the disc cartridge of (16), the longitudinal-direction site of the aperture is designed in a rectangular shape extending along the radial direction of the disc medium, and the outer edge of the shutter main body is designed in a wedge shape to have a linear portion extending along the longitudinal direction under the close state of the aperture, an oblique side portion which is inclined with respect to the linear portion and extends along the longitudinal direction under the open state of the aperture, and an arcuate portion to which the shutter guide portion is erectly provided. When the aperture is closed, a part of the arcuate portion side of the oblique side portion is accommodated between the case and the cover member.

In the disc cartridge of (17), the linear portion of the shutter main body closes the aperture under the state that it extends along the longitudinal direction of the aperture, and the oblique side portion opens the aperture under the state that it extends along the longitudinal direction.

Since the close-side end portion of the shutter main body accommodated between the case and the cover member is the oblique side portion extending from the linear portion serving as the end portion at the open side of the shutter main body to the arcuate portion having the shutter guide portion erected therefrom, no corner portion exists in the gap portion into which the shutter main body gets between the case and the cover member, and thus the interference between the close-side end portion (an oblique side portion) of the shutter main body and the edge portion of the aperture can be surely prevented. Accordingly, the oblique side portion is more smoothly accommodated in the gap between the case and the cover member, and thus more surely closes the aperture.

(18) In the disc cartridge (17), a part of the aperture is formed in the erected surface of the cylindrical wall, and a window which can open a part of the aperture is formed in the shutter guide portion with the cross point between the arcuate portion and the oblique side portion as a start point.

In the disc cartridge of (18), since the shutter guide portion is provided with the window portion which can open the extension portion of the aperture along the cylindrical wall with the start point of the window portion being set to the cross point between the oblique side portion of the shutter main body extending in the longitudinal direction of the aperture when the aperture is opened and the arcuate portion from which the shutter guide portion is erected. Therefore, the positioning of the window with respect to the shutter main body can be easily performed, and the installation of the shutter main body and the shutter guide portion and the design and manufacturing of a metal mold for integrally forming the shutter main body and the shutter guide portion can be easily performed.

(19) In order to attain the first and fifth objects, a disc cartridge includes: an aperture to access a disc-shaped medium which is provided to a case in which the disc medium is rotatably housed; a first shutter member which is rotated around the axial center of the disc medium to open/close a part of the aperture; a second shutter which is rotated around a predetermined rotational center to open/close a part of the residual part of the aperture; and interlocking means having an elongated hole formed in any one shutter member of the first shutter member and the second shutter member and a projecting portion which is provided to the other shutter member and fitted in the elongated hole, the interlocking means interlocks the first shutter member and the second shutter member while the projecting portion is moved in the longitudinal direction of the elongated hole, wherein the elongated hole has a linear portion for linearly guiding the projecting portion, and a bend portion which draws the first member and the second member up to each other just before the aperture is closed and eliminates the gap between the first shutter member and the second shutter member.

In the disc cartridge of (19), the aperture to access the disc medium is formed in one surface or both the surfaces of the case in which the disc medium is housed, and when the disc medium is unused, the first shutter member and the second shutter member are located at the closing positions to close the aperture, thereby preventing invasion of dust, etc. into the case.

On the other hand, when the disc medium is used, the first shutter member is rotated in the aperture direction of the aperture around the axial center of the disc medium, and the second shutter member is rotated in the aperture direction of the aperture around the predetermined rotational center while interlocking with the first shutter member by the interlocking means, whereby the aperture is opened. At this time, according to the interlocking means in which the elongated hole formed in any one of the first and second shutter members and the projecting portion provided to the other shutter member are fitted to each other, the projecting portion is moved in the longitudinal direction of the elongated hole to interlock the first shutter member and the second shutter member with each other while absorbing the difference in rotating locus between the first and second shutter members.

Further, when the aperture opened is closed again, the first shutter member and the second shutter member are rotated in the aperture closing directions thereof interlockingly with each other to close the aperture.

It is needless to say that any one of the first shutter member and the second shutter member may work at the driving side, and the driving-side member and the driven-side member may be different between the aperture opening operation and the aperture closing operation.

Here, since the elongated hole of the interlocking means has the linear portion for linearly guiding the projecting portion and the bend portion for drawing the first shutter member and the second shutter members up to each other to eliminate the gap between the first shutter member and the second shutter member, the projecting portion is loosely fitted at the linear portion to smoothly interlock the first shutter member and the second shutter member with each other with the gap based on the loose fitting (margin, clearance), and the first shutter member and the second shutter member are drawn up to each other (relatively greatly moving) while eliminating the gap, whereby the aperture can be surely closed.

For example, in the construction that the first and second shutter members close the aperture by overlapping the end portions thereof with each other, the overlap portions can be reduced in size and the weight can be reduced.

It is needless to say that the elongated hole of (19) covers not only a through hole, but also a hole having a bottom like a groove or the like. The linear portion of (19) may be designed not only in such a structure that the elongated itself is linear, but also in such a structure that the hole wall of the elongated hole (a portion which linearly guides the projecting portion and pressed by the projecting portion or presses the projecting portion) is linear. Further, the bend portion of (19) may be designed not only in such a structure that the elongated hole itself is a bent portion, but also in such a structure that only one of the confronting hole walls of the elongated hole is a bent portion.

(20) In the disc cartridge of (19), the first shutter member and the second shutter member close the aperture with both the end faces thereof abutted against each other, and when the aperture is closed, the bend portion is bent so that the end faces of the first and second shutter members can abut against each other.

The disc cartridge of (20) contains such a structure that end portions of the first and second shutter members are overlapped with each other to close the aperture. However, in the disc cartridge of (20), the first and second shutter members close the aperture with the end faces thereof abutted against each other.

Here, the bend portion of the elongated hole is bent so that the end faces of the first and second shutter members can abut against each other when the aperture is closed. The aperture can be also surely closed even for such a construction that the end faces of the first and second shutter members abut against each other to close the aperture, on which it has been recognized that the gap is liable to occur due to the loose fitting between the elongated hole and the projecting portion (gap, backlash). Accordingly, the thickness of the disc cartridge can be reduced with keeping the dust control performance.

BRIEF DESCRIPTION OF THE DRAWINGS

FIGS. 1A and 1B are diagrams showing the outlook of a disc cartridge according to a first embodiment of the present invention, wherein FIG. 1A is a perspective view which is taken in an oblique direction from an upper front side and FIG. 1B is a perspective view which is taken in an oblique direction from a lower front side;

FIG. 31 is an exploded perspective view showing a disc cartridge according to a fifth embodiment of the present invention, which is viewed from the lower side of the disc cartridge;

FIG. 38 is a view which shows the whole construction of the disc cartridge according to the sixth embodiment of the present invention under the aperture closed state, which is a partially-notched bottom view when the lower plate portion is removed;

FIG. 39 is a view which shows the lock release state of the disc cartridge according to the sixth embodiment of the present invention, which corresponds to FIG. 38;

FIGS. 42A and 42B are views which show the interlocking state of the first shutter member and the second shutter member in the aperture closing operation, wherein FIG. 42A is a diagram showing a state just before the aperture is closed, and FIG. 42B is a diagram showing the aperture closed state.

DESCRIPTION OF THE PREFERRED EMBODIMENTS

Preferred embodiments according to the present invention will be described hereunder with reference to the accompanying drawings.

A disc cartridge 10 according to a first embodiment of the present invention will be described hereunder with reference to FIGS. 1 to 9.

First, the whole construction of the disc cartridge 10 will be described, and then the joint structure of an arcuate guide wall portion 118 serving as a shutter guide portion and a shutter drawing portion 120 serving as an operating member which are main parts of the present invention will be described in detail.

When an arrow FR, an arrow RE, an arrow UP, an arrow LO, an arrow RI and an arrow LE are shown in the figures, they indicate "forward" (loading direction), "rearward", "upward", "downward", "rightward" and "leftward" of the disc cartridge 10 seen from such a direction that the disc cartridge 10 is loaded (inserted) to a drive device. When "front", "rear", "upper", "lower", "right" and "left" are merely described or shown, they correspond to the directions indicated by the respective arrows. These directions are shown for convenience's sake, and they do not limit the directions when the disc cartridge 10 is used. Accordingly, for example, the disc cartridge 10 may be disposed in horizontal position or in vertical position when it is used.
(Whole Construction of Disc Cartridge)

Figure 1A:
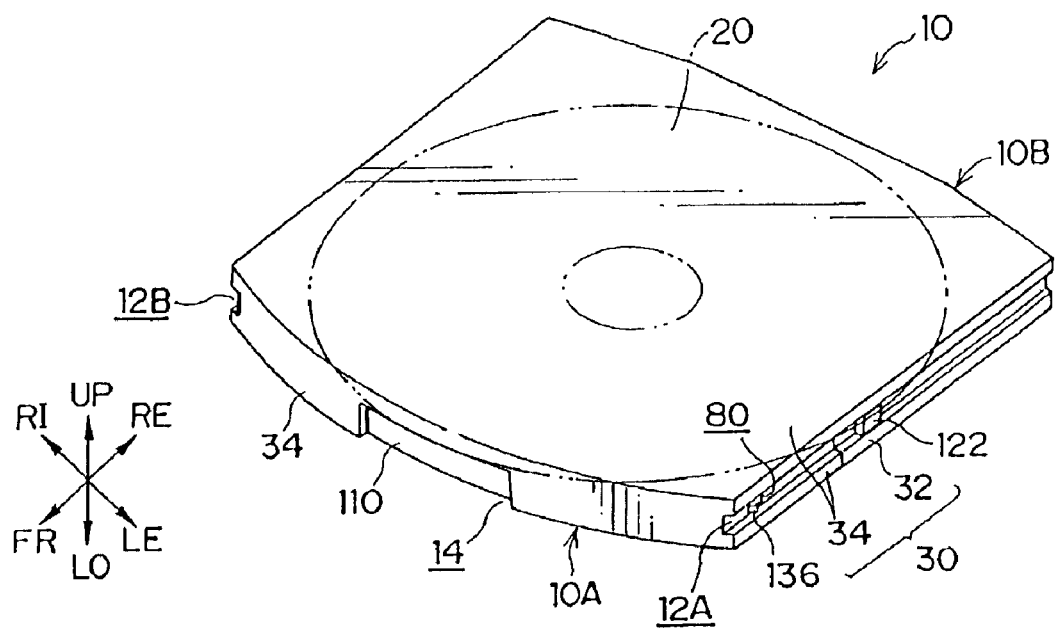
Figure 1B:
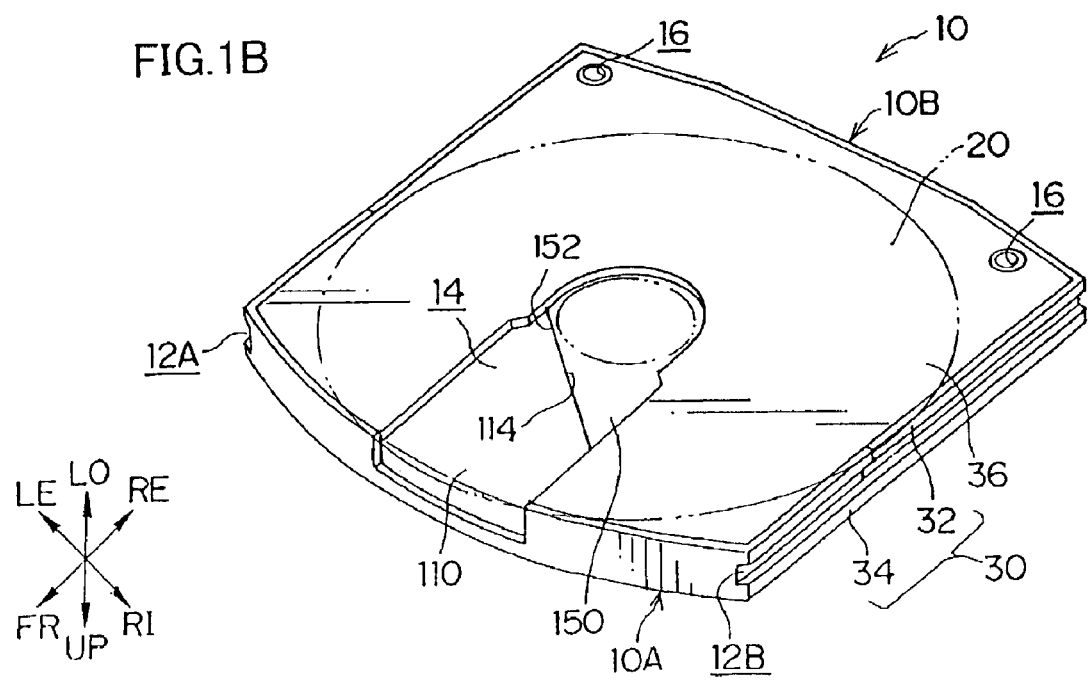

FIG. 1A is a perspective view showing the outlook of the disc cartridge 10 which is obliquely viewed from the upper side, and FIG. 1B is a perspective view showing the outlook of the disc cartridge 10 which is obliquely viewed from the lower side.

As shown in these figures, the disc cartridge 10 is designed like a flat case as a whole, and a disc-shaped disc medium 20 serving as an information recording/reproducing medium is housed in the disc cartridge 10. The disc cartridge 10 has a substantially polygonal shape that the front end portion 10A thereof is curved in the form of an arc in plan view and the rear end portion 10B thereof is chamfered at the right and left corner portions thereof in accordance with required functions, and also it is designed so that the dimension in the front-and-rear direction is slightly larger than the dimension in the right-and-left direction.

Accordingly, the disc cartridge 10 is designed so that the loading direction to a drive device (not shown) is easily recognizable and the loading thereof into the drive device from an incorrect direction is not allowed.

Further, a first guide groove 12A and a second guide groove 12B are formed on the right and left side surfaces of the disc cartridge 10 to guide the disc cartridge 10 when the disc cartridge 10 is loaded into the drive device. A lock release lever 136 and a shutter fitting portion 122 are projected from the first guide groove 12A.

The disc cartridge 10 is equipped with an aperture 14 extending from the center portion of the lower surface of the disc cartridge 10 to the center portion in the right and left direction of the front end portion 10A (front face), and it is used to access the disc medium 20. That is, when the disc medium 20 is used, a rotating spindle and a recording/reproducing head (for example, a laser head) of the drive device are inserted through the aperture 14 and approached to the disc medium 20. The aperture 14 is opened/closed by a first shutter member 110 and a second shutter member 150 as described later.

Two position regulating holes 16 are formed in the neighborhood of the rear end portion of the lower surface of the disc cartridge 10, and it is used to regulate (detect) the position of the disc cartridge 10 in the drive device.

The disc cartridge 10 thus constructed is loaded into the drive device from the front side (in the direction of the arrow FR) while guided to the drive device through the first guide groove 12A and the second guide groove 12B. Through the loading of the disc cartridge 10, the aperture 14 is opened, and the disc cartridge 10 is set to the position detecting and positioning state in the drive device, thereby allowing information to be recorded into the disc medium 20 or reproduced from the disc medium 20.

Figure 2:
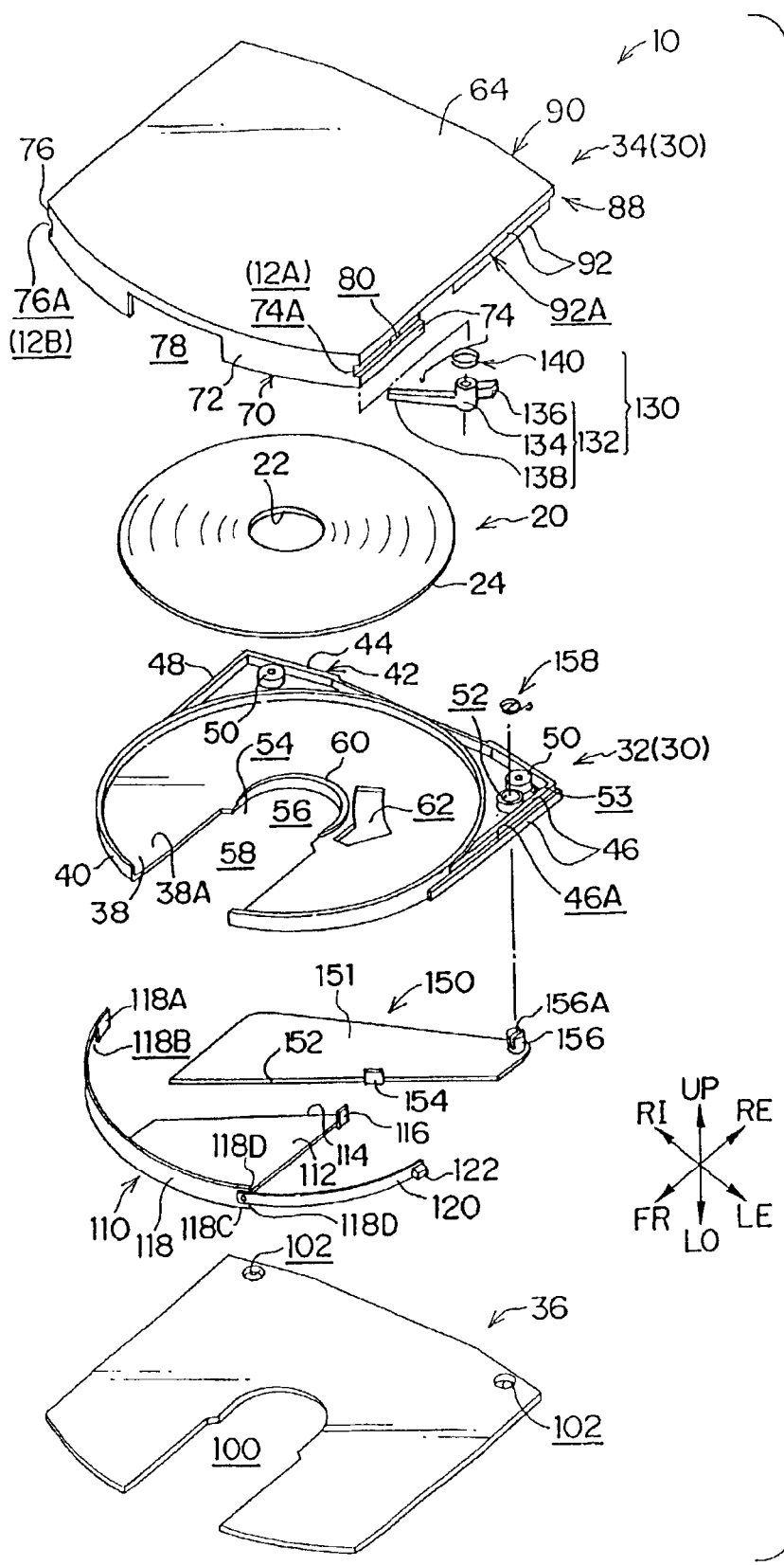
FIG. 2 is an exploded perspective view of the disc cartridge according to the first embodiment of the present invention, which is viewed from the upper side of the disc cartridge.
Figure 3:
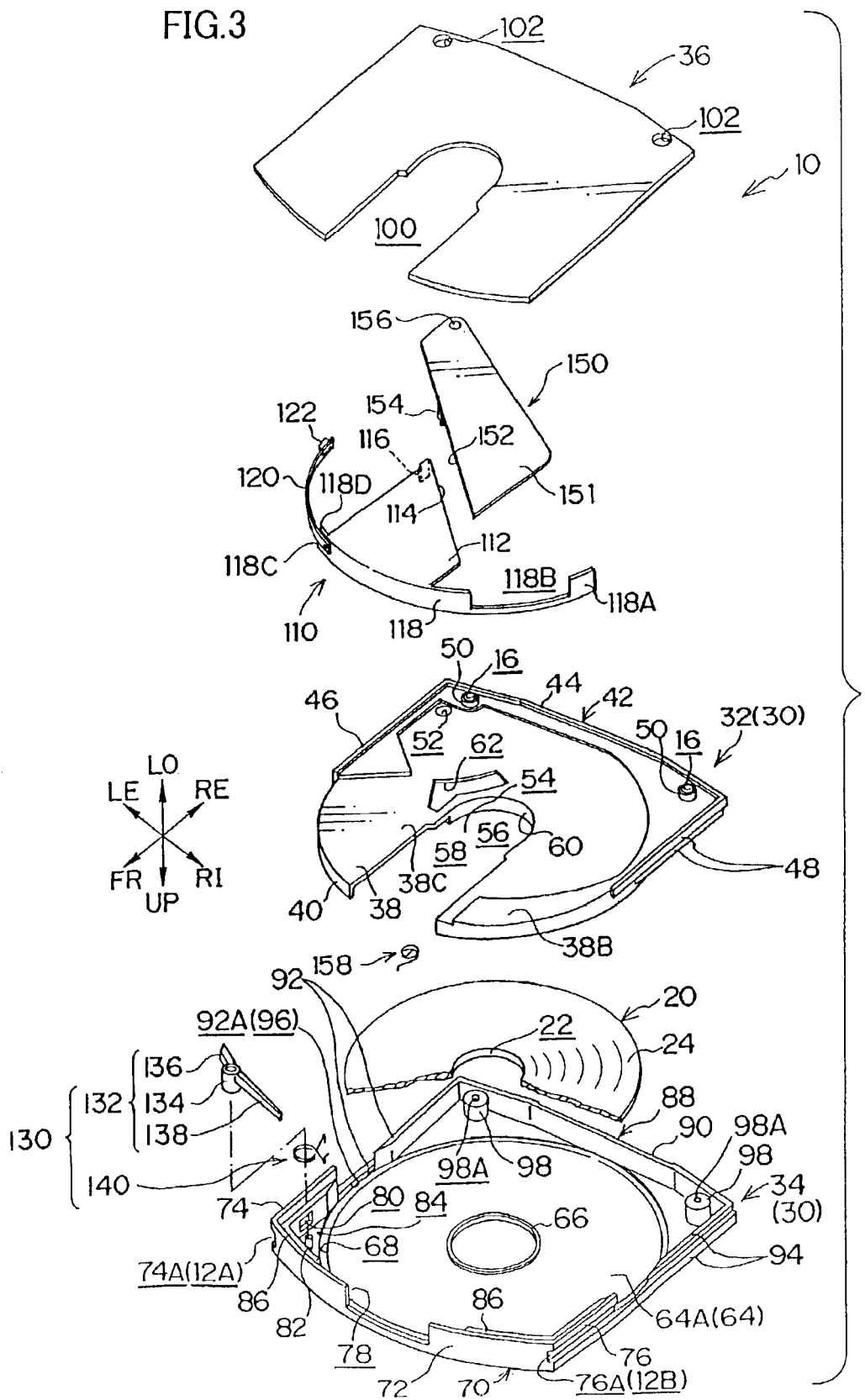
FIG. 3 is an exploded perspective view of the disc cartridge according to the first embodiment of the present invention, which is viewed from the lower side of the disc cartridge.

Further, describing the detailed construction of the disc cartridge 10, the disc cartridge 10 has the disc medium 20 therein as shown in exploded perspective views of FIGS. 2 and 3.

The disc medium 20 has a center hole 22 supported by the rotating spindle of the drive device at the center thereof, and a recording face (not shown) formed on the lower surface 24 thereof is coated and protected by a cover layer (not shown). An annular center core which is mounted on the tip of the rotating spindle shaft by suction or the like may be secured to the center hole 22 by adhesive agent or the like.

The disc cartridge 10 is equipped with a case 30 which is formed by joining a base plate portion 32 serving as a lower shell and an upper plate portion 34 serving as an upper shell and in which the disc medium 20 is rotatably housed, and the lower portion of the case 30 is covered by the lower plate portion 36 serving as a cover member.

The base plate portion 32 is equipped with a base bottom portion 38 formed of a thin plate, and the base bottom portion is designed so that the front portion thereof has a semicircular shape and the rear portion thereof has a substantially rectangular shape. The base bottom portion 38 is designed so that the upper surface 38A thereof is flat and the lower surface 38B thereof has a recess portion 38C corresponding to the movement range of a first shutter member 110 and a second shutter member 150 as described later. That is, the space formed between the recess portion 38C and the lower plate portion 36 serves as an accommodating and operating space of the first shutter member 110 and the second shutter member 150.

A cylindrical wall 40 is provided at the upper surface 38A side of the base bottom portion 38 so as to project upwardly from the base bottom portion 38 by a predetermined height. The cylindrical wall 40 is designed to be coaxial with the semi-circular portion, have the same diameter as the semi-circular portion and also to be slightly larger than the outer diameter of the disc medium 20. The disc medium 20 is housed inside the cylindrical wall 40.

Further, a substantially "U-shaped" peripheral wall 42 in plan view is formed to surround a substantially rear half (substantially rectangular) portion of the cylindrical wall 40 is formed on the outer periphery of the rear portion of the base bottom portion 38. The rear wall 44 of the peripheral wall 42 constitutes a lower half portion of the rear end portion 10B of the disc cartridge 10.

Each of a left wall 46 and a right wall 48 of the peripheral wall 42 is stepwise formed to be lower in height at the outside thereof, and they constitute the lower half portions of the rear portions of the first and second guide grooves 12A and 12B of the disc cartridge 10, respectively. An upwardly-opened slender groove 46A is formed at the stepwise-formed corner portion of the left wall 46.

The peripheral wall 42 is also projected downwardly in a substantially U-shape at the lower surface 38B side of the base bottom portion 38 (see FIG. 3), and it constitutes an engagement site of the lower plate portion 36.

Further, two cylindrical projections 50 are projected upwardly and downwardly from both the upper and lower sides of the base bottom portion 38 between the cylindrical wall 40 and the peripheral wall 42. The lower portion of the inside of each cylindrical projection 50 serves as a position regulating hole 16 for the disc cartridge 10, and a conical screw receiver (not shown) corresponding to the head portion of a fixing screw is formed at the upper portion of each cylindrical projection 50.

A shutter shaft hole 52 and a spring holder 53 are provided in the neighborhood of the cylindrical projection 50 at the left side, and they serve to support the shaft of the second shutter member 150 and hold a torsion spring 158 described later, respectively.

An aperture 54 constituting the aperture 14 of the disc cartridge 10 is formed in the base plate portion 32. The aperture 54 includes a circular hub hole 56 which is formed at the center portion of the cylindrical wall 40 and larger in diameter than the outer diameter of the center hole 22 of the disc medium 20, and a recording/reproducing head window portion 58 designed in a substantially rectangular shape which has a predetermined width dimension (a dimension in the right-and-left direction), extends in the radial direction (front-and-rear direction) of the cylindrical wall 40 to the front end portion of the base bottom portion 38 so that the longitudinal direction thereof corresponds to the radial direction of the cylindrical wall 40 and further cuts out a part of the cylindrical wall 40, the circular hub hole 56 and the window portion 58 being continuously formed with each other.

A rib 60 is erectly provided at the upper surface 38A side around the hub hole 56, and it serves to prevent the contact between the lower surface 24 of the disc medium 20 and the upper surface 38A of the base bottom portion 38.

Further, a shutter guide hole 62 is formed in the neighborhood of the hub hole 56 of the base bottom portion 38. The shutter guide hole 62 is shaped so that the front corner portion of the substantially arcuate hole coaxial with the shutter shaft hole 52 extends forwardly.

The disc medium 20 is housed inside the cylindrical wall 40 of the base plate portion 32 as described above. The upper side of the base plate portion 32 is covered by the upper plate portion 34 under the state that the disc medium 20 is mounted on the rib 60.

The upper plate portion 34 has a flat plate portion 64 whose shape corresponding to the outer shape of the disc cartridge 10 in plan view. An annular projection 66 corresponding to the rib 60 of the base plate portion 32 is provided at the center portion of the lower surface 64A of the flat plate portion 64 to prevent the contact between the disc medium 20 and the lower surface 64A.

An annular groove 68 corresponding to the cylindrical wall 40 of the base plate portion 32 is formed on the lower surface 64A of the flat plate portion 64. The annular groove 68 is designed so that the cylindrical wall 40 is insertable in the annular groove 68, and the front portion of the annular groove 68 at the front side of the left wall 46 and the right wall 48 of the base plate portion 32 is set to be slightly larger (broader) in outer diameter than the other portion thereof, so that the arcuate guide wall portion 118 of the first shutter member 110 as well as the cylindrical wall 40 can be inserted into the annular groove 68.

Further, an outer wall 70 having a substantially U-shape in plan view is provided on the outer periphery of the front portion of the flat plate portion 64 so as to project downwardly. The outer wall 70 is designed to have the height corresponding to the overall thickness of the disc cartridge 10, and it comprises a front wall 72, a left wall 74 and a right wall 76.

The front wall 72 is curved in the form of an arc, and it constitutes the front end portion 10A of the disc cartridge 10. A downwardly cut-out window portion 78 having a rectangular shape 78 is formed at the center portion in the right-and-left direction of the front wall 72. The window portion 78 is designed so that the width dimension in the right-and-left direction corresponds to the width dimension of the recording/reproducing head window portion 58 of the base plate portion 32, and it interlocks with the aperture 54 of the base plate portion (the cut-out portion of the front portion of the cylindrical wall 40) to constitute the aperture 14 of the disc cartridge 10.

The left wall 74 and the right wall 76 have lateral grooves 74A, 76A constituting the substantially front half portions of the first and second guide grooves 12A and 12B of the disc cartridge 10 respectively, and the lower portions of the rear end surfaces thereof abut against the front end surfaces of the left and right walls 46, 48 of the base plate portion 32, respectively.

A lock release lever hole 80 through which the bottom portion of the lateral groove 74A and the inside of the left wall 74 intercommunicate with each other is provided to the left wall 74. Further, a support shaft 82 and a spring holding hole 84 are provided on the lower surface 64A of the flat plate portion 64 in the neighborhood of the lock release lever hole 80.

The outer wall 70 is designed so that the inside portions of both the corner portions are recessed upwardly, and they constitute abutting faces 86 which will abut against the upper surface of the lower plate portion 36 which are fitted to the inner peripheral portions of the recessed inside portions.

Further, a peripheral wall 88 corresponding to the peripheral wall 42 of the base plate portion 32 is formed on the outer periphery of the flat plate portion 64 at the rear side of the outer wall 70 so as to project downwardly.

That is, the rear wall 90 of the peripheral wall 88 abuts against the rear wall 44 of the base plate portion 32 to constitute the rear end portion 10B of the disc cartridge 10, and the left wall 92 and the right wall 94 thereof abut against the left wall 46 and the right wall 48 of the base plate portion 32 respectively to constitute the substantially rear half portions of the first and second guide grooves 12A and 12B respectively. The slender groove 92A intercommunicating with the annular groove 68 of the left wall 92 is confronted to the slender groove 46A of the base plate portion 32 to form a shutter guide groove 96.

Cylindrical positioning projections 98 each of which has a screw hole 98A at the center portion thereof are provided between the peripheral wall 88 and the annular groove 68 in connection with the cylindrical projections 50 of the base plate portion 32. Each positioning projection 98 is designed so that a screw whose head portion is fitted in the screw receiving portion inside the cylindrical projection 50 is threadedly engaged in the screw hole 98A under the state that the lower end surface thereof abuts against the upper end surface of the cylindrical projection 50 of the base plate portion 32, whereby the position of the position regulating hole 16 with respect to the upper plate portion 34 is determined.

Through the threaded engagement, the upper plate portion 34 and the base plate portion 32 are joined to each other to thereby form the case 30 in which the disc medium 20 is housed. Under this state, the cylindrical wall 40 of the base plate portion 32 is inserted in the annular groove 68 of the upper plate portion 34.

In addition, the lower plate portion 36 is disposed at the lower side of the base plate portion 32. The lower plate portion 36 is designed so that the outer shape thereof is substantially the same flat shape as the flat plate portion 64 of the upper plate portion 34, and the outer periphery thereof is slightly smaller than that of the flat plate portion 64.

An aperture 100 having the substantially the same shape as the aperture 54 of the base plate portion 32 is formed so as to confront the aperture 54. That is, the aperture 100 intercommunicates with the aperture 54 to constitute the aperture 14 of the disc cartridge 10.

The lower plate portion 36 has a through hole 102 corresponding to each cylindrical projection 50 of the base plate portion 32. The cylindrical projection 50 of the base plate portion 32 is inserted in the through hole 102, and the lower plate portion 36 is engagedly supported by the peripheral wall 42 of the base plate portion 32 and the outer wall 70 of the upper plate portion 34 under the state that the upper surface thereof abuts against the lower surface 38B (the portion excluding the recess portion 38C) of the base plate portion 32 and the abutting face 86 of the upper plate portion 34.

With the above construction, the lower portion of the case 30 in which the disc medium 20 is housed is covered by the lower plate portion 36, and the aperture 54 of the base plate portion 32, the window portion 78 of the upper plate portion 34 and the aperture 100 of the lower plate portion 36 intercommunicate with one another to thereby constitute the aperture 14 of the disc cartridge 10.

The disc cartridge 10 is equipped with a shutter mechanism for closing or opening the aperture 14. In the following description, when the respective elements of the shutter mechanism are described by using the directions of "frontward", "rearward", "rightward" and "leftward", they are assumed to basically indicate the directions under the closed state of the aperture 14.

The shutter mechanism is equipped with the first shutter member 110, and the first shutter member 110 has a shutter main body 112 which mainly closes the recording/reproducing head window portion 58 of the base plate portion 32.

The shutter main body 112 comprises a thin flat plate formed of resin material, metal plate or the like. The length of the shutter main body 112 in the front-and-rear direction is set to be substantially the same as the radius of the cylindrical wall 40 of the base plate portion 32 and the width thereof is set to be slightly larger than the width of the recording/reproducing head window portion 58. Further, the shutter main body 112 is designed to have such a trapezoidal shape in plan view that the front end portion thereof has the arcuate shape corresponding to the cylindrical wall 40 and the rear right corner portion thereof is cut out. The thickness of the shutter main body 112 is set to be smaller than the depth of the recess portion 38C, that is, the distance from the bottom surface of the recess portion 38C to the upper surface of the lower plate portion 36.

The shutter main body 112 is designed so that the end face of the oblique side portion thereof serves as an abutting portion 114 against the second shutter member 150, and a press piece 116 for pressing the second shutter member 150 is provided at the rear left corner portion thereof to project upwardly.

Further, an arcuate guide wall portion 118 serving as a shutter guide portion is provided to the front end portion of the shutter main body 112 so as to project upwardly. The arcuate guide wall portion 118 comprises a thin flat plate of resin material, metal plate or the like, and it is designed to be curved in conformity with the cylindrical wall 40 of the base plate portion 32 and have such a width dimension as to enable a part of the recording/reproducing head window portion 58 of the base plate portion 32 (the cut-out portion of the front portion of the cylindrical wall 40) to be closed by the arcuate guide wall portion 118.

A window portion 118B corresponding to the window portion 78 of the upper plate portion 34 is formed in a rightwardly-extending extension portion 118A of the arcuate guide wall portion 118. The lower portion of the end face of an extension portion 118C which extends leftwardly by a short distance in the arcuate guide wall portion 118 serves as a lock engaging portion 118D which is engaged with a lock pawl 138 as described later.

The shutter drawing portion 120 serving as the operating member is joined to the extension portion 118C. The joint structure between the extension portion 118C (arcuate guide wall portion 118) and the shutter drawing portion 120 will be described later.

The shutter drawing portion 120 is designed in the form of a plate which is sufficiently smaller in thickness than the arcuate guide wall portion 118 and elastically deformable in the thickness direction, and a shutter fitting portion 122 serving as an operating portion which is formed like a small block is provided to the tip portion of the arcuate guide wall portion 118.

Figure 4:
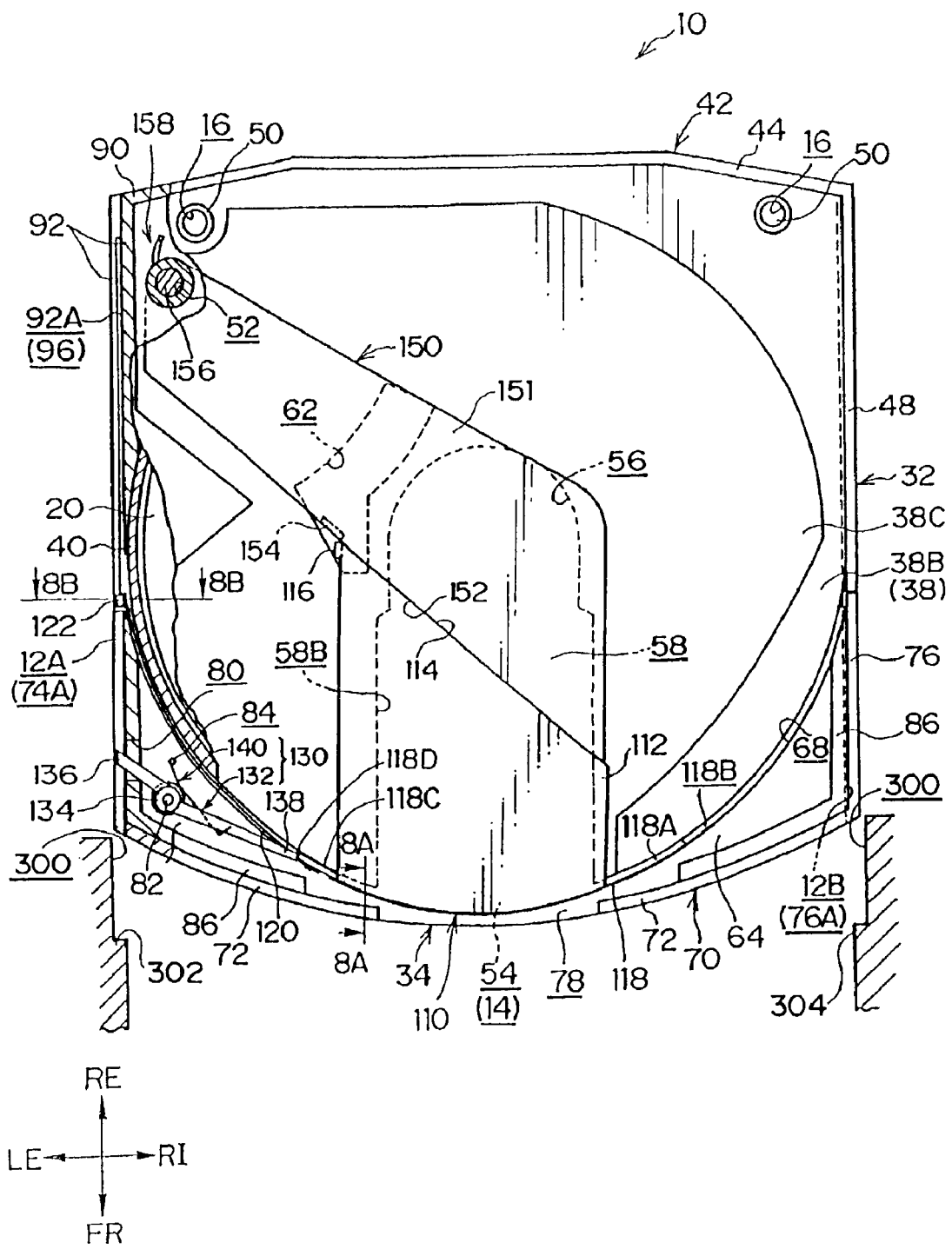
FIG. 4 is a view which shows the overall construction of the disc cartridge according to the first embodiment of the present invention under the state that an aperture is closed, and is a partially-notched bottom view when a lower plate portion is removed.
Figure 8A:
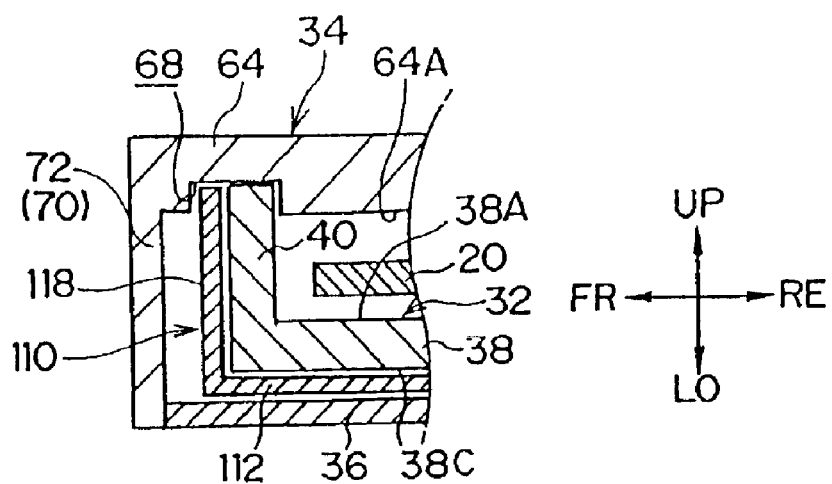
FIG. 8A is a cross-sectional view taken along a line of 8A—8A of FIG. 4.
Figure 8B:
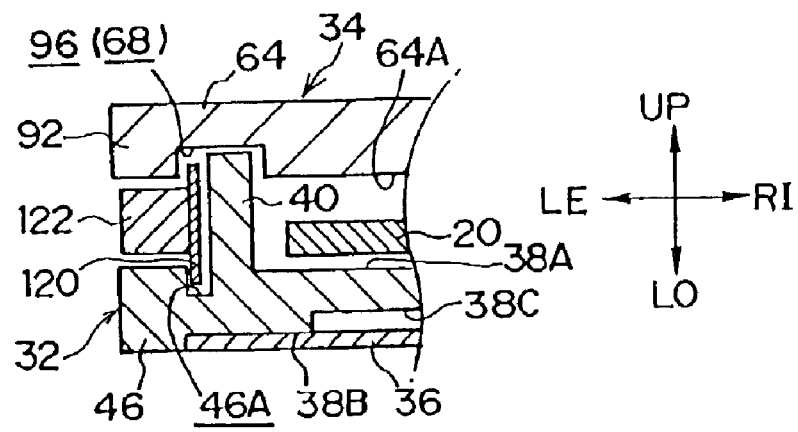
FIG. 8B is a cross-sectional view taken along a line of 8B—8B of FIG. 4.

As shown in FIG. 4 (the bottom view when the lower plate portion 36 is removed) and FIGS. 8A and 8B, in the first shutter member 110, the shutter main body 112 is disposed between the recess portion 38C of the base plate portion 32 and the upper surface of the lower plate portion 36 under the state that the arcuate guide wall portion 118 is inserted in the annular groove 68 of the upper plate portion 34 together with the cylindrical wall 40 of the base portion 32, the shutter drawing portion 120 is inserted in the shutter guide groove 96 and the shutter fitting portion 122 is disposed in the first guide groove 12A. Under this state, the press piece 116 of the shutter main body 112 is inserted in the shutter guide hole 62 of the base plate portion 32, and located at the front portion of the shutter guide hole 62.

Accordingly, by backwardly moving the shutter fitting portion 122 in the first guide groove 12A from the external, the arcuate guide wall portion 118 joined through the shutter drawing portion 120 is slid along the outer peripheral surface of the cylindrical wall 40, so that the shutter main body 112 is rotated (see FIGS. 4 to 7). That is, the shutter drawing portion 120 is designed to convert the moving force in the linear direction of the shutter fitting portion 122 (the direction along the first guide groove 12A) to the rotating force in the peripheral direction of the arcuate guide all portion 118 (along the cylindrical wall 40) while being drawn from the external.

The dimension of each part is set so that under the open state of the aperture 14, the window portion 118B of the extension portion 118A is located at the front side to open the cut-out portion of the front portion of the cylindrical wall 40 (the portion confronting the window portion 78 of the upper plate portion 34).

The shutter mechanism has lock means 130 for regulating the rotation of the first shutter member. The lock means 130 is equipped with a lock lever 132 having a substantially V-shape in plan view. The lock lever 132 is freely rotatably supported around a support shaft 82 of the upper plate portion 34 through the cylindrical shaft 134 at the center portion thereof. One end portion of the lock lever 132 serves as a lock release lever 136 projecting from the lock release lever hole 80 into the first guide groove 12A(lateral groove 74A), and the other end portion thereof serves as a lock pawl 138 which can be engaged with the lock engaging portion 118D of the first shutter member 110.

A torsion spring whose one end portion is inserted and held in the spring holding hole 84 of the upper plate portion 34 is hooked to the lock lever 132 at the other end portion thereof to urge the lock lever 132 so that the lock pawl 138 is engaged with the lock engaging portion 118D of the first shutter member 110, and normally the rotation of the first shutter member 110 in the opening direction of the aperture 14 is prevented.

When the lock release lever 136 is pressed rearwardly, the lock lever 132 is rotated around the cylindrical shaft 134 against the urging force of the torsion spring 140, and the engagement between the lock pawl 138 and the lock engaging portion 118D of the first shutter member 110 is released.

The disc cartridge may be designed so that the first shutter member 110 is locked through the fitting of the lock pawl 138 of the lock means 139 into a small hole formed in the shutter drawing portion 120 of the first shutter member 110.

Further, the shutter mechanism is equipped with the second shutter member 150 serving as a shutter member, and the second shutter member 150 has a thin-plate type shutter face plate 151 for mainly opening/closing the hub hole 56 of the base plate portion 32.

The shutter face plate 151 is designed in a substantially trapezoidal shape in plan view (a trapezoid in which parallel line segments extending in the front-and-rear direction and located at the right and left sides are offset, and the length between the parallel line segments is long), and the thickness thereof is set to be equal to the shutter main body 112 of the first shutter member 110. The shutter face plate 151 is designed so that the end face of the oblique side portion (corresponding to the front end of the shutter face plate 151) serves as an abutting portion 152 which abuts against the abutting portion 114 of the first shutter member 110.

The shutter face plate 151 is designed so that the front-right corner portion sandwiched between the abutting portion 152 corresponding to the oblique side portion of the shutter face plate 151 and the right-side portion (the end portion in the front-and-rear direction) is formed to have an acute angle to thereby open/close a part of the recording/reproducing head window 58 (rear-right portion) as well as the hub hole 56.

A press-subjected piece 154 is upwardly erectly provided at the position of the abutting which corresponds to the press piece 116 of the shutter main body 112. The width dimension of the press-subjected piece 154 is set so that the press-subjected piece 154 abuts against the press piece 116 in the rotation range of the shutter main body 112 (the moving range of the press piece 116 regulated by the shutter guide hole 62) at all times.

The second shutter member 150 has a rotational shaft 156 which is provided at the rear-left end portion of the shutter face plate 151 so as to project upwardly. The rotational shaft 156 corresponds to the shutter shaft hole of the base plate portion 32, and a slit groove 156A serving as a spring fitting portion is formed in the upper end portion of the rational shaft 156.

In the second shutter member 150 thus constructed, the shutter face plate 151 is disposed between the recess portion 38C of the base plate portion 32 and the upper surface of the lower plate portion 36 under the state that the rotational shaft 156 is inserted in the shutter shaft hole of the base plate portion 32 and the press-subjected piece 154 is inserted in the shutter guide hole 62. Under this state, one end portion of the torsion spring 158 is fixedly fitted in the slit groove 156A of the rotational shaft 156, and the other end portion of the torsion spring 158 is fixedly fitted to the holding portion 53 of the base plate portion 32, whereby the second shutter member 150 is urged to abut against the first shutter member 110 at all times.

Accordingly, the second shutter member 150 is designed so that the abutting portion 152 thereof is normally kept to abut against the abutting portion 114 of the first shutter member 110 and mainly close the hub hole 56 of the base plate portion 32.

That is, the first shutter member 110 and the second shutter member 150 normally close the aperture 14 of the disc cartridge 10 under the state that the abutting portions 114, 152 thereof abut against each other as shown in FIG. 1B. Under this state, the press piece 116 of the first shutter member 110 is fitted to the inner edge of the front portion of the shutter guide hole 62 of the case 30 to keep a proper (no-gap) abutting state between the abutting portions 114, 152.

(Joint Structure between Arcuate Guide Wall Portion and Shutter Drawing Portion)

Next, the joint structure between the arcuate guide wall portion 118 and the shutter drawing portion 120 constituting the first shutter member 110 will be described.

Figure 9:
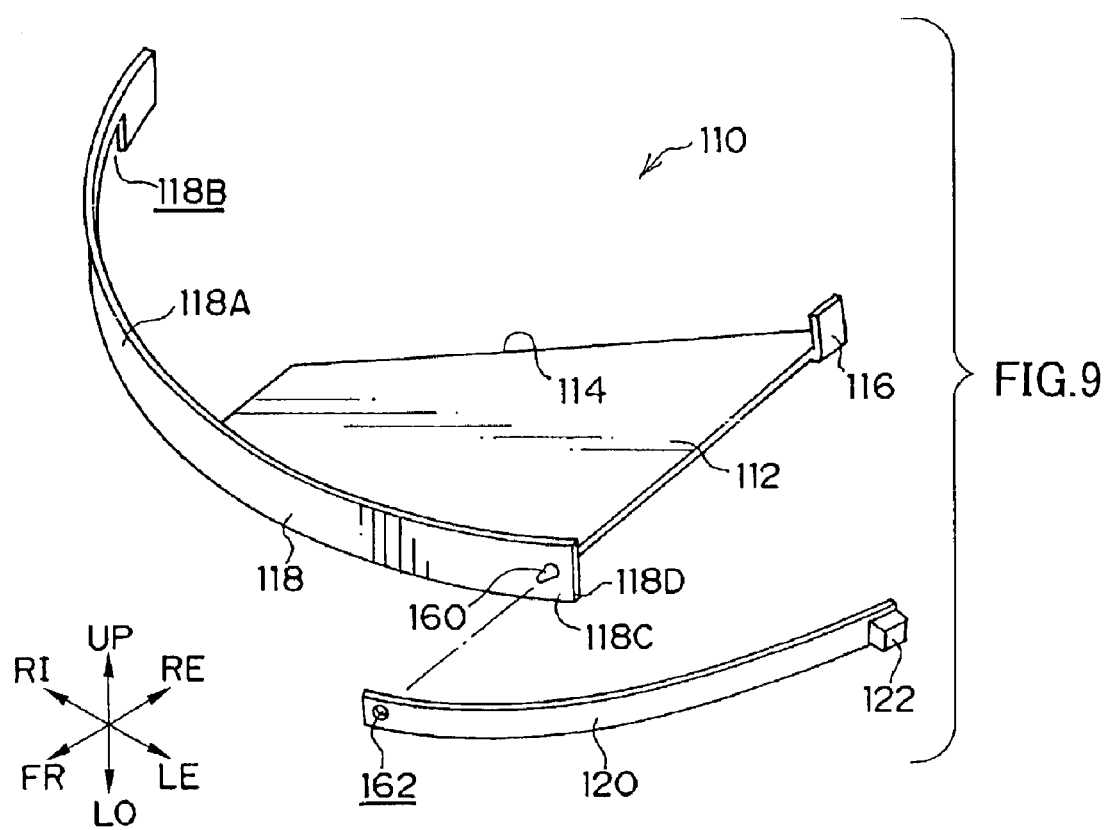
FIG. 9 is an exploded perspective view showing the joint structure of an arcuate guide wall portion and a shutter drawing portion constituting the disc cartridge according to the first embodiment of the present invention.

As shown in an exploded perspective view of FIG. 9, the arcuate guide wall portion 118 has a fitting projection 160 serving as a support shaft (fitted portion) at a leftwardly-extending extension portion 118C thereof. The fitting projection 160 projects outwardly from the substantially center portion in the up-and-down direction on the outer peripheral surface of the extension portion 118C along the radial direction of the arcuate guide wall portion 118.

The shutter drawing portion 120 has an fitting hole 162 serving as a through hole (fitting portion). The fitting hole 162 is provided at the substantially center portion in the up-and-down direction at the end portion opposite to the end portion at which the shutter fitting portion 122 of the shutter drawing portion 120 is mounted, and the inner diameter of the fitting hole 162 is set to be larger than the outer diameter of the fitting projection 160.

By caulking the tip portion of the fitting projection 160 under the state that the fitting projection 160 is inserted (loosely engaged) in the fitting hole 162, the arcuate guide wall portion 118 and the shutter drawing portion 120 are joined to each other while they are prevented from falling off. Under this state, the shutter drawing portion 120 is supported to be swingable (rotatable) around the fitting projection 160 along the outer peripheral surface of the arcuate guide wall portion 118. That is, the shutter drawing portion 120 is joined to the arcuate guide wall portion 118 so as to be swingable around the fitting projection 160 in the height direction (the up-and-down direction, the width direction) of the arcuate guide wall portion 118 (the cylindrical wall 40 under the assembled state of the disc cartridge 10).

The width (height) in the up-and-down direction of the shutter drawing portion 120 is set to be smaller than the width (height) in the up-and-down direction of the arcuate guide wall portion 118, and thus the shutter drawing portion 120 is swingable even under the assembled state of the disc cartridge 10 (the installation state to the case 30). That is, the shutter drawing portion 120 is swingable around the fitting projection 160 in the height direction of the arcuate guide wall portion 118 between the flat plat portion 64 of the upper plat portion 34 and the lower plate portion 36, or in a swing range in which the swinging motion is regulated by the shutter guide groove 96.

Next, the operation of the first embodiment will be described.

In the disc cartridge 10 thus constructed, when the disc medium 20 is unused, the aperture 14 is closed by the first shutter member 110 and the second shutter member 150. That is, as shown in FIG. 4, the abutting portion 114 of the first shutter member 110 and the abutting portion 152 of the second shutter member 150 abut against each other (brought into contact with each other), whereby the first shutter member 110 mainly closes the recording/reproducing head window portion 58 of the base plate portion 32 and the second shutter member 150 mainly closes the hub hole 56 of the base plate portion 32.

At this time, the rotation of the first shutter member 110 in the opening direction of the aperture 14 is regulated by the engagement between the lock pawl 138 of the lock means 130 and the lock engaging portion 118D of the arcuate guide wall portion 118 to keep the close state. The second shutter member 150 keeps the close state by the urging force of the torsion spring 158, thereby preventing invasion of dust into the disc cartridge 10, that is, adhesion of dust to the lower surface 24 of the disc medium 20 when the disc medium 20 is unused.

The disc cartridge 10 is loaded into the drive device when the disc medium 20 is used (when information is recorded into the disc medium 20 or information recorded in the disc medium 20 is reproduced). At the time when the disc cartridge 10 is loaded into the drive device, it is inserted into an insertion port 300 (see FIGS. 4 to 7) of the drive device with the front end portion 10A thereof at the head of the insertion.

Through the insertion, guide projecting portions 302, 304 of the drive device are inserted into the first guide groove 12A and the second guide groove 12B of the disc cartridge 10. The guide projecting portion 302 inserted in the first guide groove 12A is relatively moved to the rear side of the first guide groove 12 through further insertion of the disc cartridge 10, and the lock release lever 136 abuts against the lock release lever 136 to press the lock release lever 136 rearwardly.

Figure 5:
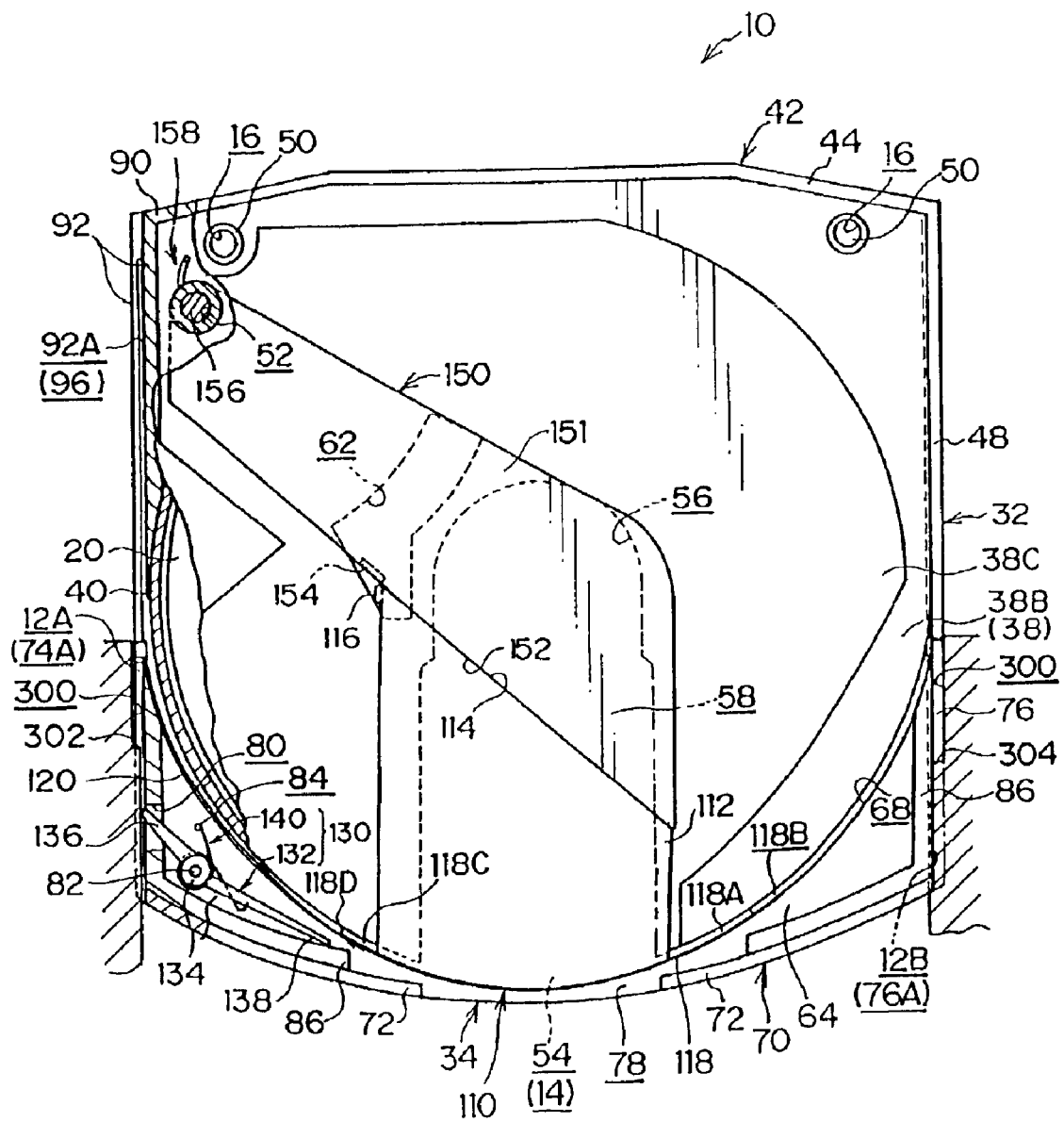
FIG. 5 is a diagram showing a lock release state of the disc cartridge according to the first embodiment of the present invention, which corresponds to FIG. 4.

When the lock release lever 136 is rearwardly pressed, the lock lever 132 is rotated around the cylindrical shaft 134 (support shaft 82) as shown in FIG. 5, the lock release lever 136 is retracted into the lock release lever hole 80, and the engagement between the lock pawl 138 and the lock engaging portion 118D is released, whereby the lock state of the lock means 130 is released and the first shutter member 110 is freely rotatable.

Figure 6:
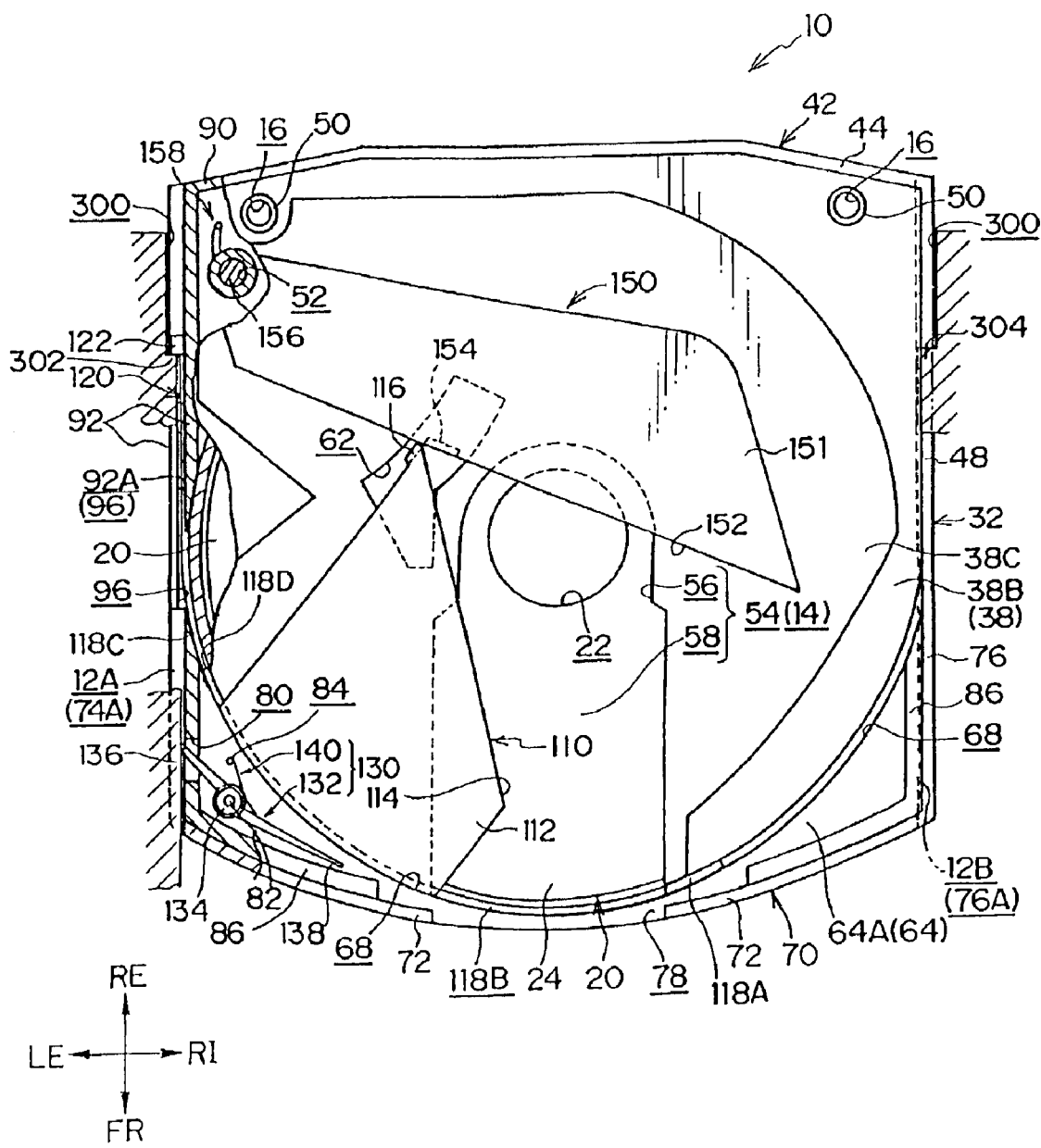
FIG. 6 is a view which shows an opening process of the aperture of the disc cartridge according to the first embodiment of the present invention, which corresponds to FIG. 4.

When the guide projecting portion 302 of the drive device is further relatively moved rearwardly in the first guide groove 12A, the guide projecting portion 302 is fitted to the shutter fitting portion 122 while keeping the lock release state, and presses the shutter fitting portion 122 rearwardly (draws the shutter drawing portion 120). When the shutter fitting portion 122 is rearwardly pressed, the first shutter member 110 for which the lock state is released is rotated as shown in FIG. 6.

That is, through the rearward movement of the shutter fitting portion 122, the shutter drawing portion 120 converts the moving force in the linear direction of the shutter fitting portion 122 to the moving force in the peripheral direction of the arcuate guide wall portion 118, and the arcuate guide wall portion 118 is rotated while sliding along the outer peripheral surface of the cylindrical wall 40, thereby rotating the shutter main body 112 in the opening direction of the aperture 14 around the axial center of the cylindrical wall 40.

Further, through the rotation of the first shutter member 110, the press piece 116 of the shutter main body 112 is moved substantially rearwardly in the shutter guide hole 62 (rotated around the axial center of the cylindrical wall 40). When the press piece 116 is moved substantially rearwardly, the press-subjected piece 154 of the second shutter member 150 disposed so as to abut against the press piece 116 is moved along the arcuate-shape portion of the shutter guide hole 62 while being pressed substantially rearwardly, and rotated around the rotational shaft 156 against the urging force of the torsion spring 158 in such a direction as to be away from the first shutter member 110.

Figure 7:
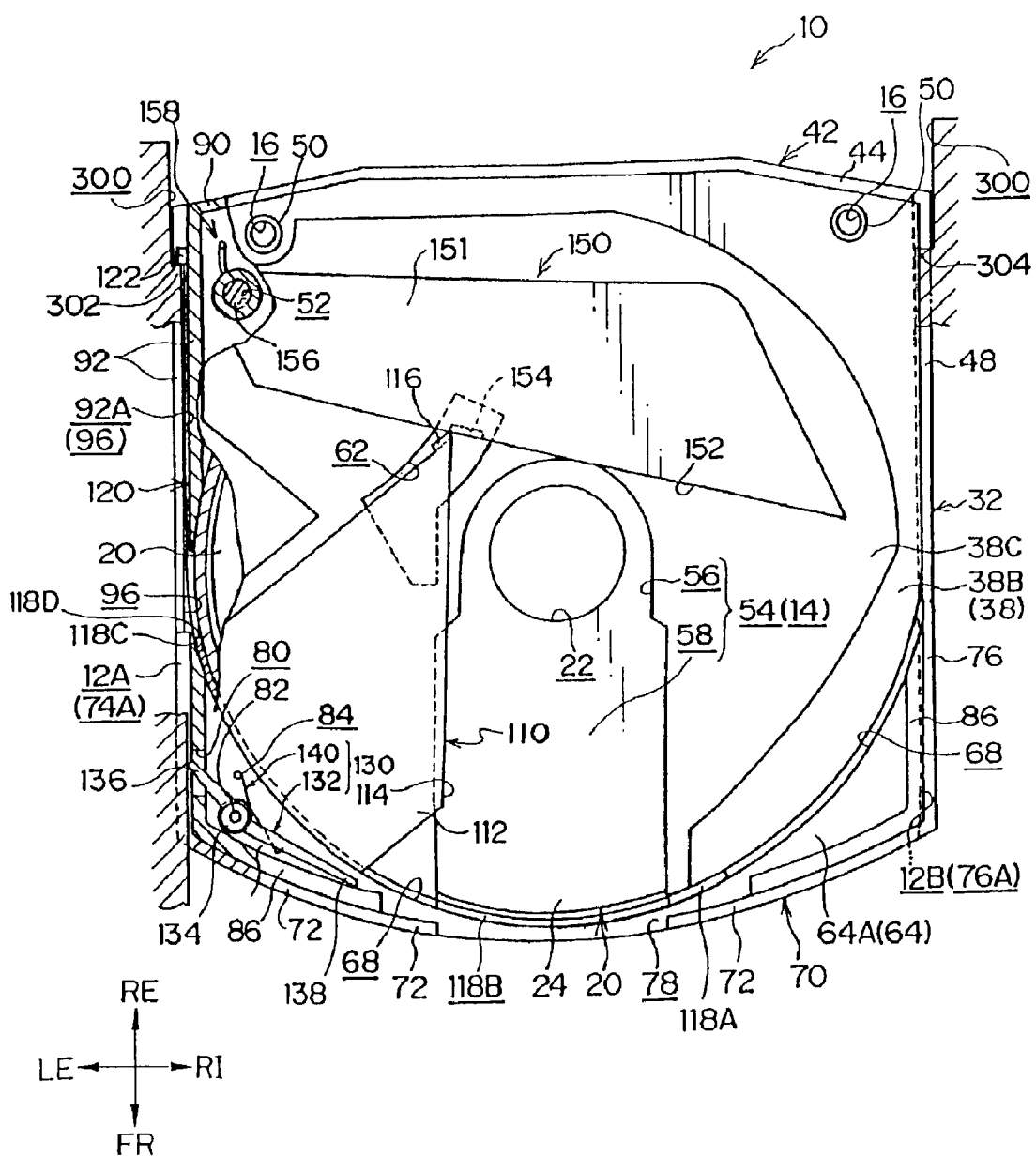
FIG. 7 is a view which shows an open state of the aperture of the disc cartridge according to the first embodiment of the present invention, which corresponds to FIG. 4.

When the guide projecting portion 302 of the drive device which is fitted to the shutter fitting portion 122 is further relatively rearwardly moved in the first guide groove 12A, the first shutter member 110 and the second shutter member 150 are further rotated as shown in FIG. 7, and the recording/reproducing head window portion 58 and the hub hole 56 are opened. Under this state, the window portion 118B of the arcuate guide wall portion 118 is located at the front portion of the disc cartridge 10, and the front portion of the recording/reproducing head window portion 58 is also opened through the window portion 78 of the upper plate portion 34.

When the disc cartridge 10 is inserted to a predetermined position in the drive device, a positioning mechanism of the drive device is inserted into the position regulating holes 16 and accurately positioned.

Under this state, the rotating spindle shaft is inserted from the portion corresponding to the hub hole 56 of the aperture 14 thus opened. The rotating spindle shaft holds the center hole 22 of the disc medium 20 at the tip portion thereof by engagement, suction or the like, and rotates the disc medium 20 around the axial center thereof. Further, the recording/reproducing head is inserted from the portion corresponding to the recording/reproducing head window portion 58 of the aperture 14 to record information on the recording face of the disc medium 20 or reproduce information recorded on the recording face.

On the other hand, when the disc cartridge 10 is unloaded from the drive device, the positioning mechanism is pulled out from the position regulating holes 16 to allow the disc cartridge 10 to be moved in the unloading direction (to the insertion port 300). Under this state, the disc cartridge 10 is moved with the rear end portion 10B thereof at the head of the unloading by the urging force of the torsion spring 158 or the press force in the unloading direction applied by the drive device, so that the press force of the guide projecting portion 302 acting on the shutter fitting portion 122 is lost although the guide projecting portion 302 is fitted to the shutter fitting portion 122, and thus the first shutter member 110 is set to be rotatable.

Under this state, the aperture 14 of the disc cartridge 10 is closed while the disc cartridge 10 moves in the unloading direction. That is, the second shutter member 150 is rotated in the closing direction of the aperture 14 while pressing the press piece 116 of the first shutter member 110 substantially forwardly through the press-subjected piece 154 by the urging force of the torsion spring 158. By this press, the first shutter member 110 pressed substantially forwardly through the press piece 116 is rotated in the closing direction of the aperture 14.

When the first shutter member 110 and the second shutter member 150 are rotated and returned to the respective initial positions, the aperture 14 is closed. The press piece 116 of the first shutter member 110 returned to the initial position is fitted to the inner edge of the front portion of the shutter guide hole 62 to prevent the first shutter member 110 and the second shutter member 150 abutting against the press piece 116 through the press-subjected piece 154 from being further rotated by the urging force of the torsion spring 158.

The rotation of the first shutter member 110 and the second shutter member 150 which makes them overpass the initial positions maybe prevented by fitting the press-subjected piece 154 of the second shutter member 150 to the peripheral edge portion of the shutter guide hole 62 at the initial position or by fitting the tip portion of the extension 118A of the arcuate guide wall portion 118 of the first shutter member 110 into the end portion of the expanded portion of the annular groove 68 at the initial position. Further, the first shutter member 110 may be returned to the initial position by pressing the shutter fitting portion 122 by the drive device.

When the disc cartridge 10 is further moved in the unloading direction and the guide projecting portion 302 is moved at the front side of the lock release lever hole 80 of the first guide groove 12a, the lock lever 132 is rotated by the urging force of the torsion spring 140 to make the lock release lever 136 project into the first guide groove 12A, and the lock pawl 138 is engaged with the lock engaging portion 118D of the first shutter member 110, whereby the disc cartridge 10 is returned to the state before it is loaded in the drive device, and the rotation of the first shutter member 110 is prevented, so that the closing state of the aperture 14 is kept.

Here, the shutter drawing portion 120 is joined to the arcuate guide wall portion 118 so as to be swingable in the height direction of the arcuate guide wall portion 118 (that is, the height direction of the cylindrical wall 40). Accordingly, even when the shutter drawing portion 120 is drawn under the state that the longitudinal direction of the shutter drawing portion 120 and the longitudinal direction of the arcuate guide wall portion 118 are displaced from each other, the shutter drawing portion 120 is moved in the width direction, and thus there hardly occurs component force which causes the arcuate guide wall portion 118 to move in the width direction thereof (angular moment for inclining the shutter main body 112 with respect to the case 30). Accordingly, the arcuate guide wall portion 118 and the shutter main body 112 constituting the first shutter member 110 can be smoothly rotated to open the aperture 14.

As described above, according to the disc cartridge 10 of the first embodiment, the arcuate guide wall portion 118 and the shutter drawing portion 120 are properly joined to each other to smoothly open the aperture 14 to access the disc medium 20. That is, according to the disc cartridge 10, the first shutter member 110 can operate smoothly.

Further, since the width in the height direction of the shutter drawing portion 120 is set to be smaller than the width in the height direction of the arcuate guide wall portion 118, the shutter drawing portion 120 can be surely swung with no interference with the case 30 (between the upper plate portion 34 and the lower plate portion 36, the shutter guide groove 96), thereby surely suppressing occurrence of the component force due to the drawing operation of the shutter drawing portion 120 (the angular moment to incline the shutter main body 112 with respect to the case 30).

In addition, the installation of the shutter drawing portion 120 into the case 30 (disc cartridge 10) can be facilitated, and the size (weight) of the disc cartridge 10 can be reduced.

Still further, since the shutter drawing portion 120 is swingably joined to the arcuate guide wall portion 118, there hardly occurs the angular moment for inclining the shutter main body 112 with respect to the case 30 which is caused by the difference between the gravitational height of the first shutter member 110 and the height of the joint height of the shutter drawing portion 120 (the gravitational height of the first shutter member 110 comprising the shutter main body 112 and the arcuate guide wall portion 118 is located nearer to the shutter main body 112, however, it is difficult to make coincident both the gravitational height of the first shutter member 110 and the height of the joint position of the shutter drawing portion 120 in the disc cartridge 10 which is required to be reduced in thickness). (That is, the angular moment is reduced in accordance with the inclination of the shutter main body 112 or it finally does not act). Therefore, as compared with the construction in which the shutter drawing portion 120 is fixed to the arcuate guide wall portion 118 with no error (no displacement in the longitudinal direction), the sliding resistance between the shutter main body 112 and the case 30 or the lower plate portion 36 can be more remarkably suppressed, and the first shutter member 110 can operate more smoothly.

Further, since the shutter drawing portion 120 is joined to the arcuate guide wall portion 118 along the outer peripheral surface of the arcuate guide wall portion 118, the sliding between the shutter drawing portion 120 and the cylindrical wall 40 through the drawing operation of the shutter drawing portion 120 can be prevented or the sliding area between the shutter drawing portion 120 and the cylindrical wall 40 can be reduced.

Therefore, when the aperture 14 is opened, the operating force of the shutter drawing portion 120 (the inserting force into the drive device to press the shutter fitting portion 122 by the guide projecting portion) is suppressed, and the aperture 14 is further smoothly opened.

The above effects can be achieved with a simple structure by the joint means comprising the fitting projection 160 and the fitting hole 162.

Figure 10:
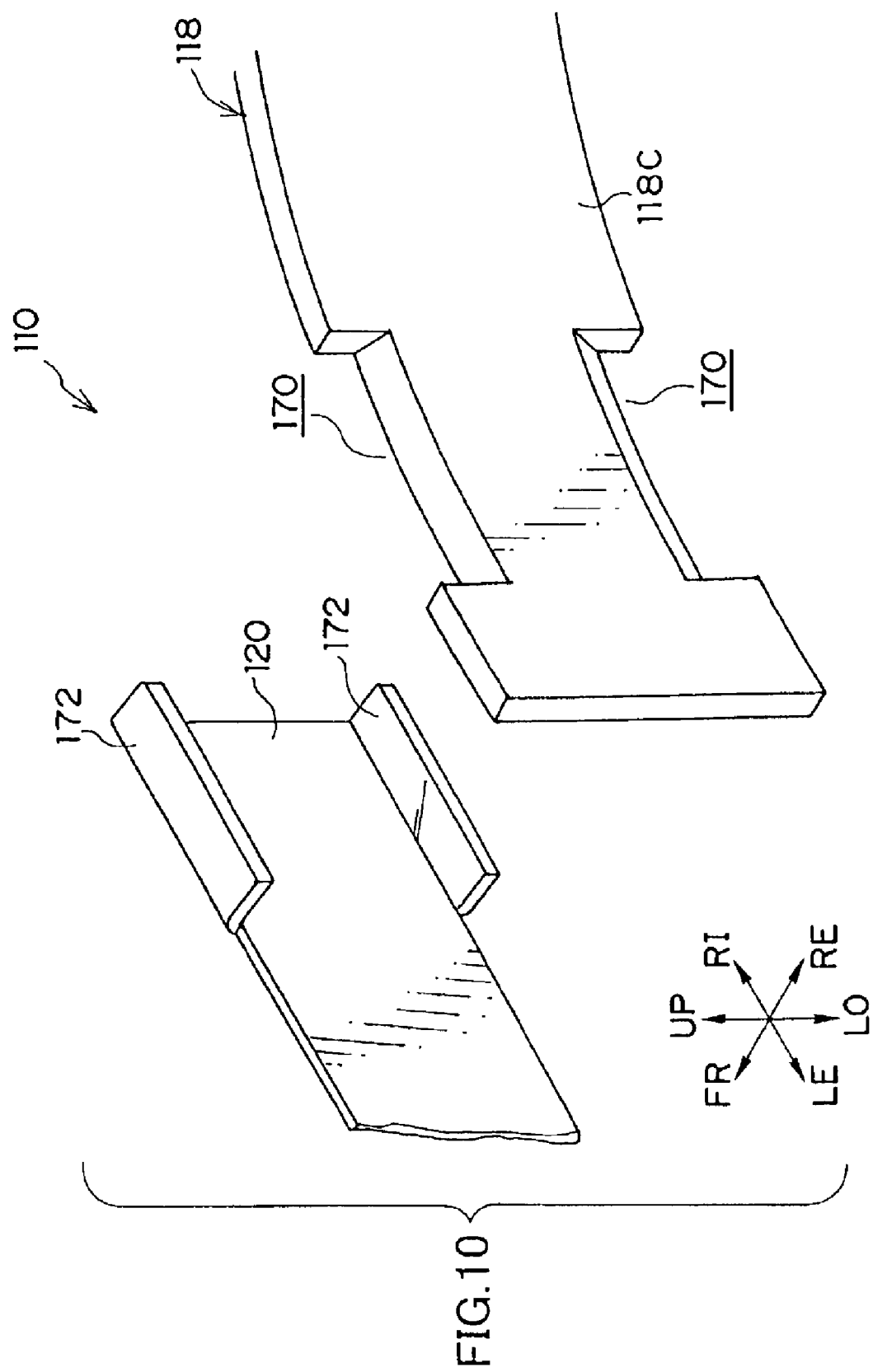
FIG. 10 is an exploded perspective view showing the joint structure of the arcuate guide wall portion and the shutter drawing portion constituting the disc cartridge according to a modification of the first embodiment of the present invention.
Figure 11:
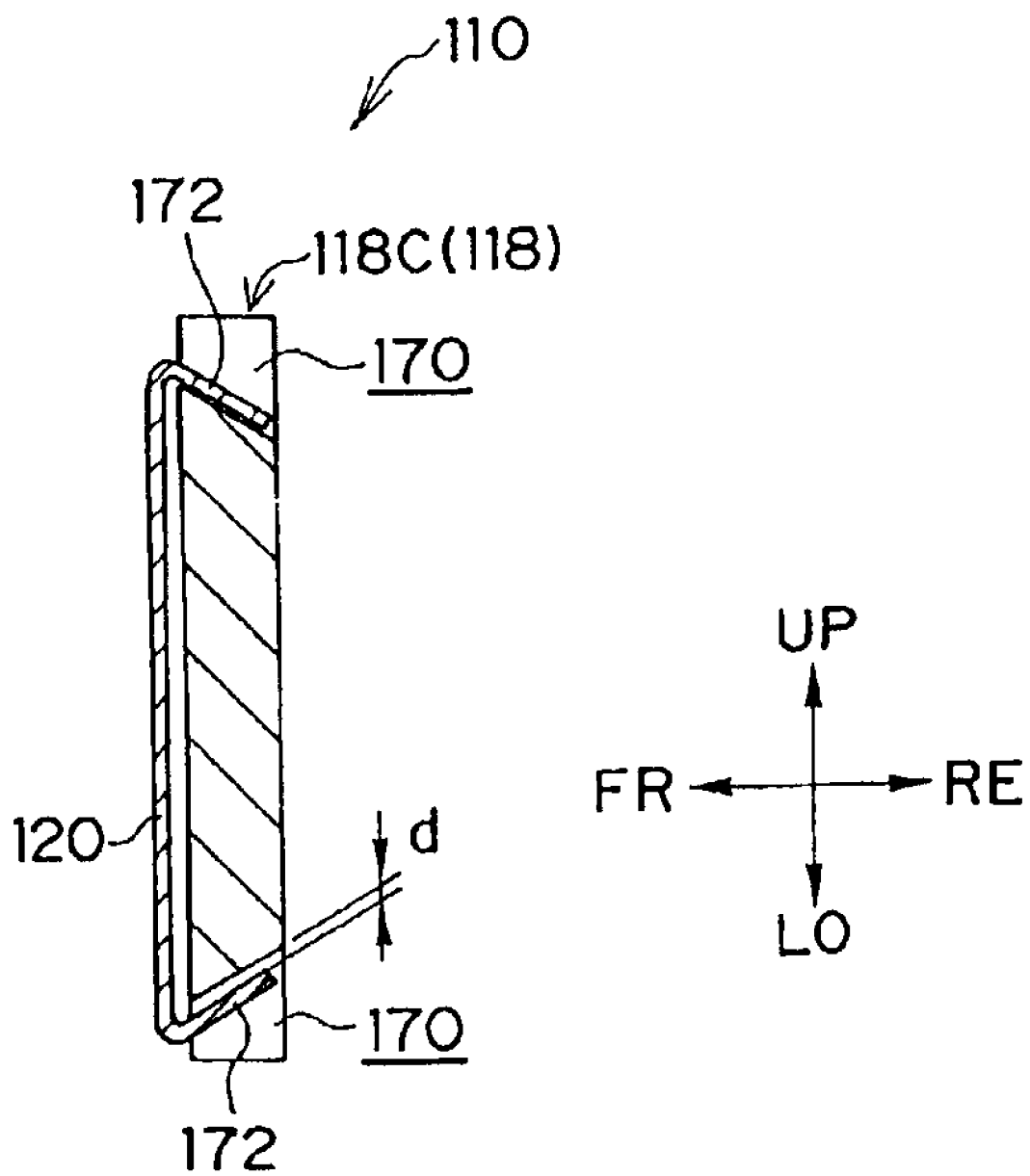
FIG. 11 is a cross-sectional view showing the joint structure of the arcuate guide wall portion and the shutter drawing portion constituting the disc cartridge according to a modification of the first embodiment of the present invention.

In the first embodiment described above, the arcuate guide wall portion 118 and the shutter drawing portion 120 are joined to each other by the fitting projection 160 and the fitting hole 162. However, the present invention is not limited to this joint structure, and a modification of the joint structure as shown in FIGS. 10 and 11 may be used. This modification will be described hereunder. In the following modification, the basically same parts and portions as the first embodiment are represented by the same reference numerals as the first embodiment, and the description thereof is omitted.

FIG. 10 shows an exploded perspective view showing an enlarged joint portion between the arcuate guide wall portion 118 and the shutter drawing portion 120, and FIG. 11 is a cross-sectional view showing the joint portion.

As shown in FIGS. 10 and 11, the leftwardly-extending extension portion 118C of the arcuate guide wall portion 118 is provided with a pair of upper and lower cut-out portions 170 serving as engagement-subjected portions. The cross-section of each notch portion 170 has a tapered shape in which the width (height) of the inner peripheral side of the arcuate guide wall portion 118 is smaller than that of the outer peripheral side thereof. The width of the outer peripheral side of the notch portion 170 (the width of the larger side) is set to be slightly smaller than the width of the shutter drawing portion 120.

Besides, a pair of upper and lower pawl portions 172 serving as engaging portions are provided to the end portion of the shutter drawing portion 120. Each pawl portion 172 is designed so that the length thereof along the longitudinal direction of the shutter drawing portion 120 is set to be slightly shorter than the length of the notch portion 170 (the length in the peripheral direction of the arcuate guide wall portion 118).

The pair of pawl portions 172 are crimped along the tapered surfaces of the pair of cut-out portions 170 under the state that the pair of pawls 172 are inserted in the pair of cut-out portions 170, whereby the arcuate guide wall portion 118 and the shutter drawing portion 120 are joined to each other while they are prevented from falling off. Under this state, a gap d is formed between the notch portion 170 and the pawl portion 172, and the shutter drawing portion 120 is swingable in the height direction of the arcuate guide wall portion 118 along the outer peripheral surface of the arcuate guide wall portion 118 because the pawl portions 172 are shorter than the cut-out portions 170.

Under the above joint structure, the dimensions of the respective parts are determined so that the pawl portions 172 do not project inwardly from the inner peripheral surface of the arcuate guide wall portion 118.

The above construction of the modification of the first embodiment can also achieve the same effect of the first embodiment. That is, the swing motion of the shutter drawing portion 120 suppresses occurrence of component force (angular moment) for inclining the shutter main body 112, and the first shutter member 110 operates smoothly. Further, installation of the shutter drawing portion 120 is facilitated, the sliding resistance between the shutter drawing portion 120 and the cylindrical wall 40 is suppressed, and these effects can be achieved with a simple construction.

In the first embodiment and the modification thereof, it is preferable that the width of the shutter drawing portion 120 is set to be smaller than the width of the arcuate guide wall portion 118. However, the present invention is not limited to this construction. For example, the width of the shutter drawing portion 120 may be equal to or larger than the width of the arcuate guide wall portion 118. However, such a construction is not so preferable from the viewpoint of reduction in thickness of the disc cartridge 10.

Further, in the first embodiment and the modification thereof, it is preferable that the shutter drawing portion 120 is joined to the outer peripheral surface of the arcuate guide wall portion 118. However, the present invention is not limited to this construction, and for example the shutter drawing portion 120 may be joined to an intermediate portion in the thickness direction of the arcuate guide wall portion 118. In this case, the sliding resistance between the shutter drawing portion 120 and the cylindrical wall 40 can be suppressed as in the case of the first embodiment. Further, for example, the shutter drawing portion 120 may be joined to the arcuate guide wall portion 118 so that one side surface of the shutter drawing portion 120 which confronts the cylindrical wall 40 faces the inner peripheral surface of the arcuate guide wall portion 118.

Still further, in the first embodiment, it is preferable that the arcuate guide wall portion 118 and the shutter drawing portion 120 which are separate members are swingably joined to each other. However, the present invention is not limited to this construction. In the construction that the arcuate guide wall portion 118 is joined to a portion located at an outer position in the radial direction (thickness direction) with respect to the inner peripheral surface of the shutter drawing portion 120, for example, the arcuate guide wall portion 118 and the shutter drawing portion 120 may be integrally formed, or the shutter drawing portion 120 may be fixedly mounted on the arcuate guide wall portion 118.

(Second Embodiment)

Next, a disc cartridge 180 according to a second embodiment of the present invention will be described. The basically same parts and portions as the first embodiment are represented by the same reference numerals as the first embodiment, and the description thereof is omitted.

Figure 12:
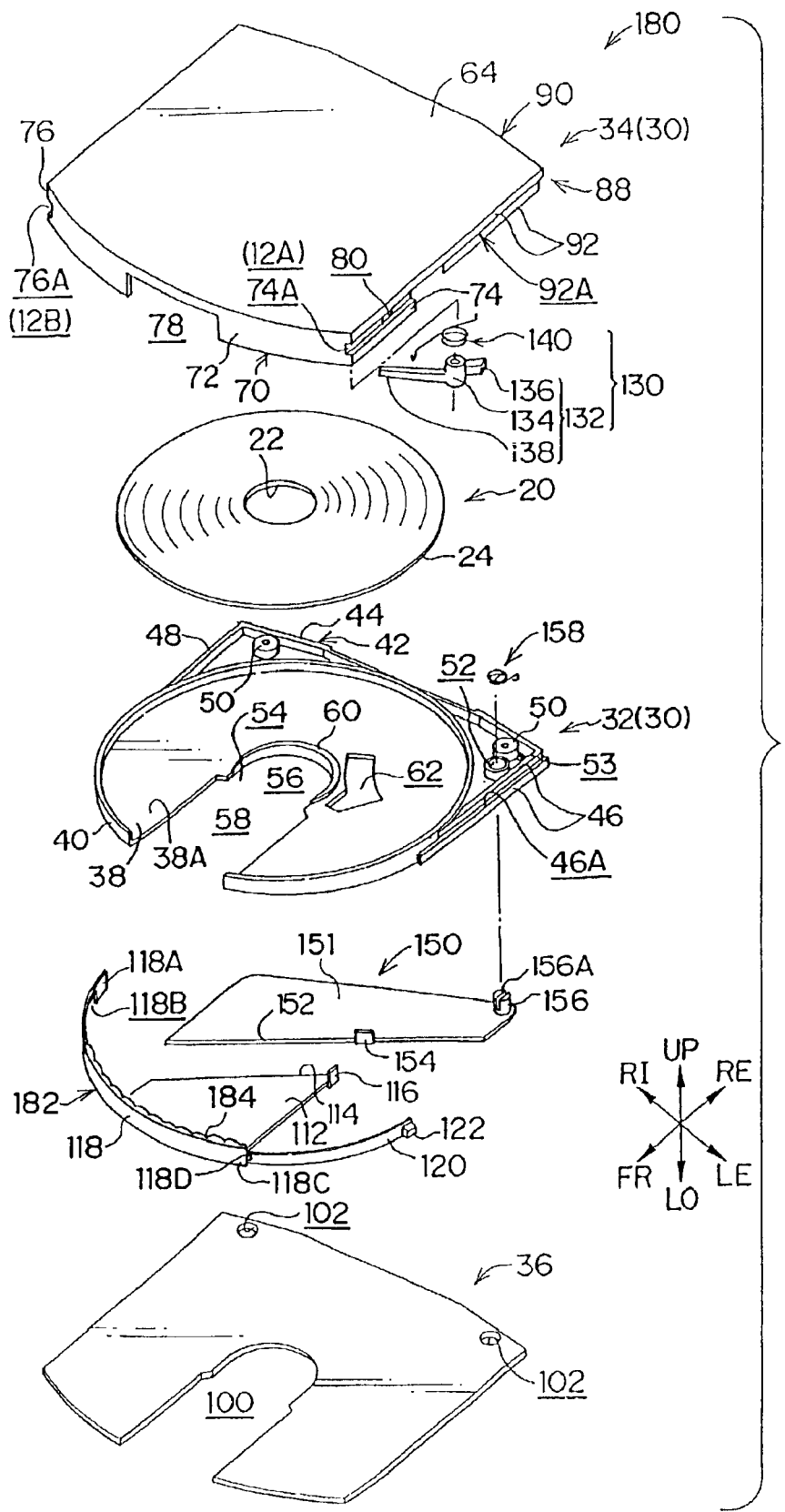
FIG. 12 is an exploded perspective view of the disc cartridge according to a second embodiment of the present invention, which is viewed from the upper side of the disc cartridge according to the second embodiment of the present invention.
Figure 13:
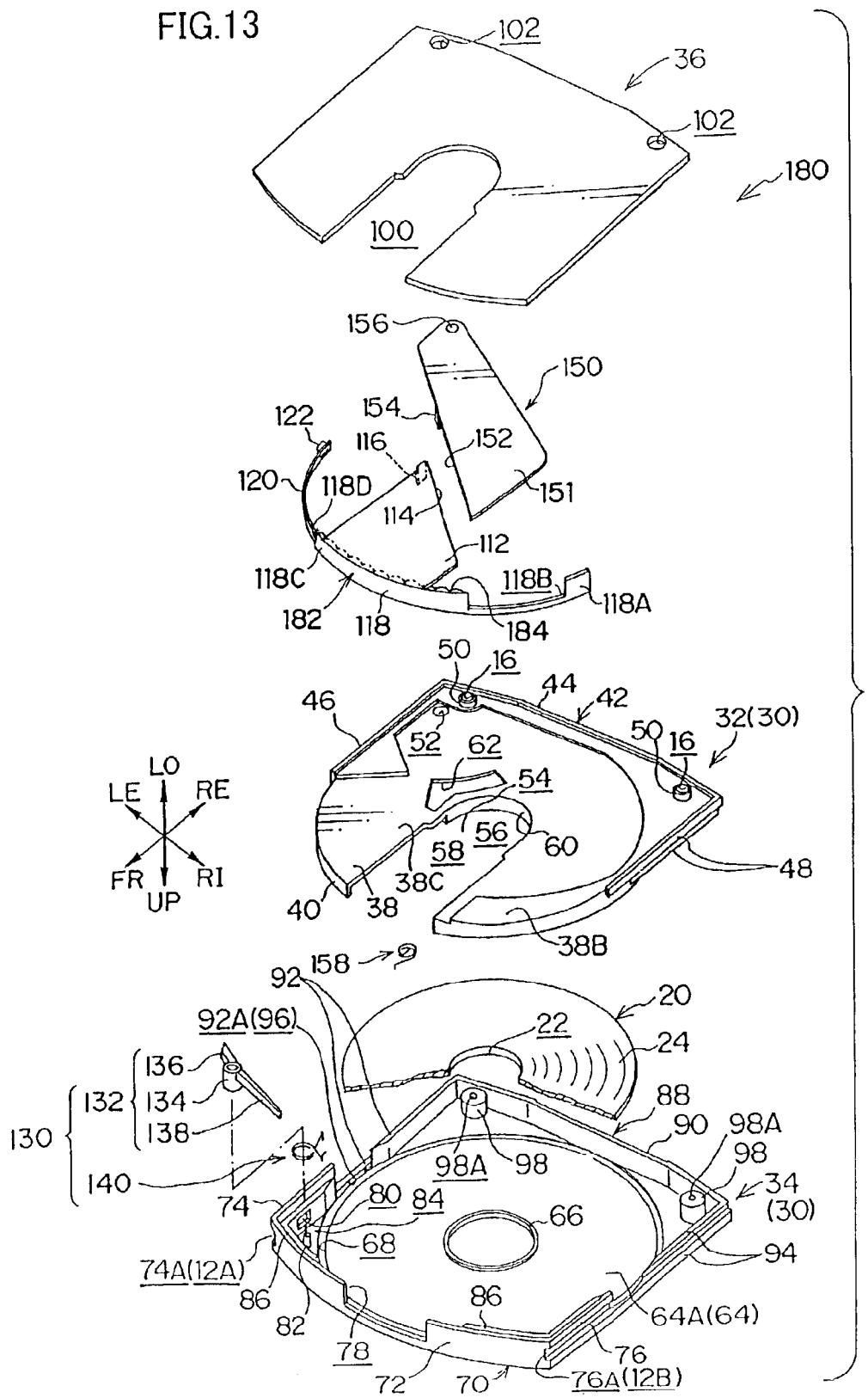
FIG. 13 is an exploded perspective view of the disc cartridge according to the second embodiment, which is viewed from the lower side of the disc cartridge according to the second embodiment of the present invention.

As shown in FIGS. 12 and 13, the disc cartridge 180 has a first shutter member 182 in place of the first shutter member 110. The first shutter member 182 is similar to the first shutter member 110 of the first embodiment in the point that it has a shutter main body 112 (abutting portion 114, press piece 116), an arcuate guide wall portion 118, a shutter drawing portion 120 and a shutter fitting portion 122.

On the other hand, the first shutter member 182 is different from the first shutter member 110 in the point that a groove portion 184 serving as a friction reducing shape is formed on the inner surface of the arcuate guide wall portion 118.

Figure 14:
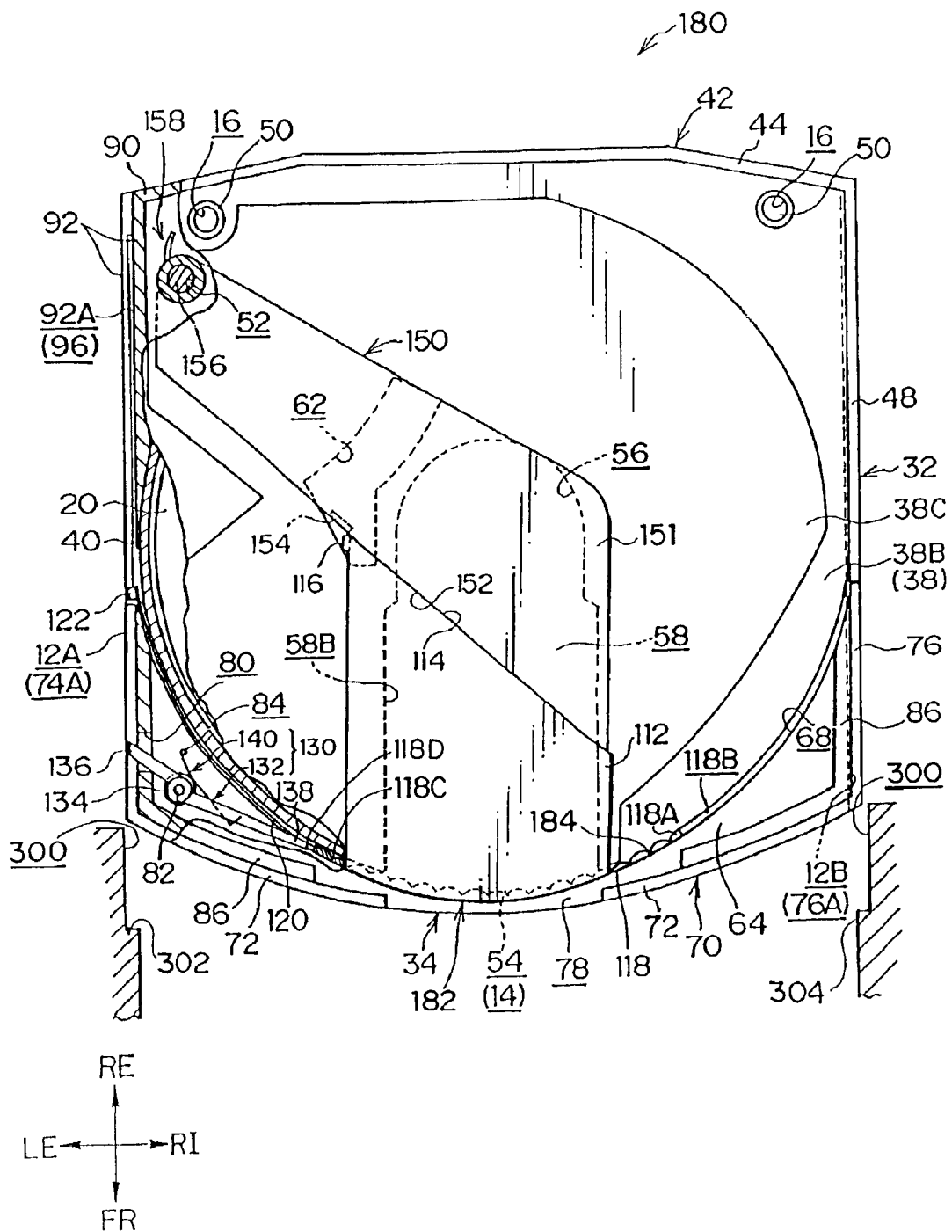
FIG. 14 is a view which shows the whole construction of the disc cartridge according to the second embodiment of the present invention under the aperture closed state, which is a partially-notched bottom view when the lower plate portion is removed.
Figure 15:
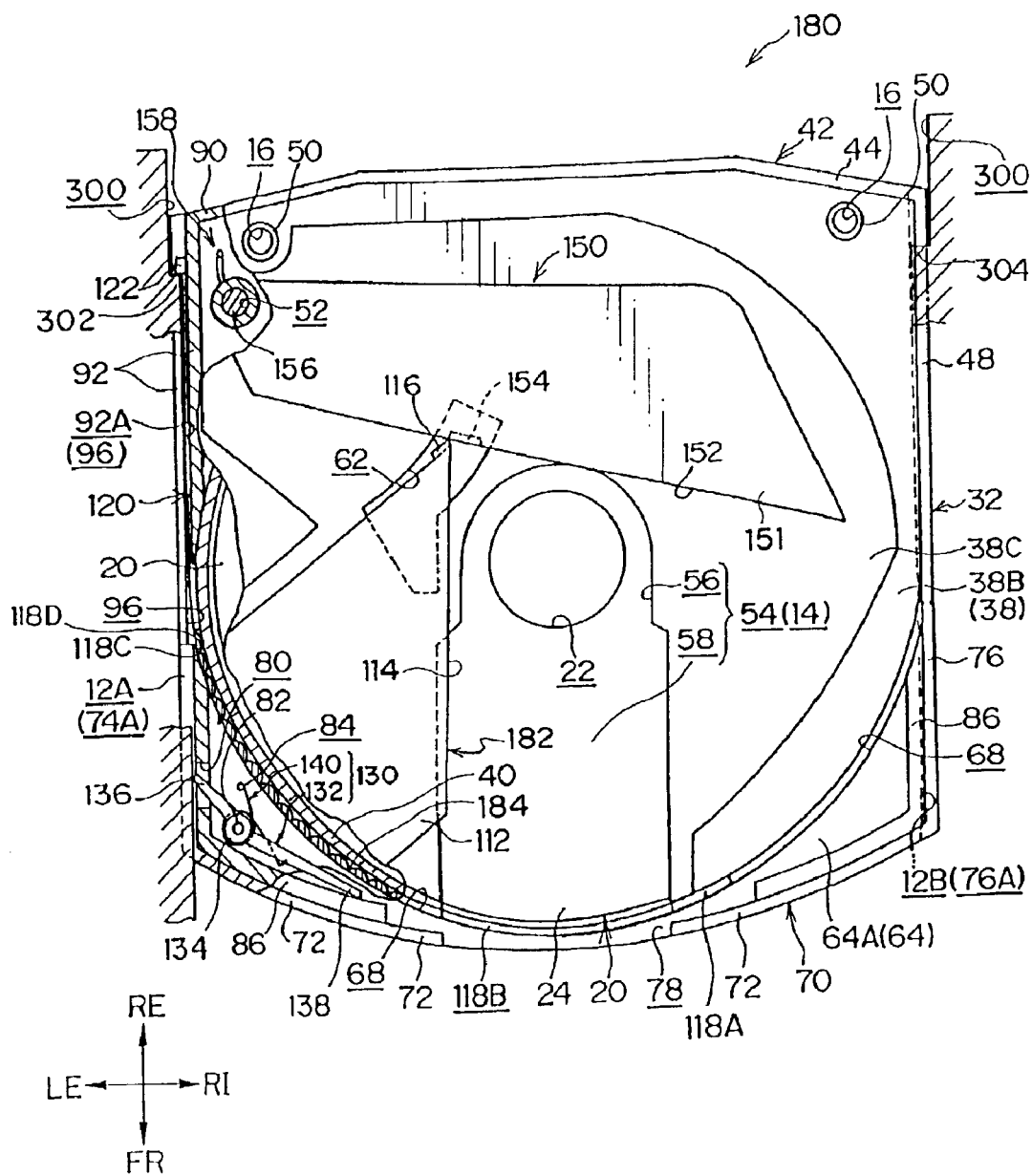
FIG. 15 is a view which shows the aperture opened state of the disc cartridge according to the second embodiment of the present invention, which corresponds to FIG. 14.

As shown in FIGS. 14 and 15, plural groove portions 184 extending in the up-and-down direction are formed at predetermined intervals on the inner surface of the arcuate guide wall portion 118 which is slid along the cylindrical wall 40. Each portion between the groove portions 184 is formed substantially arcuately in plan view, and the inner surface of the arcuate guide wall portion 118 is formed substantially in an uneven shape in plan view as a whole.

Figure 16:
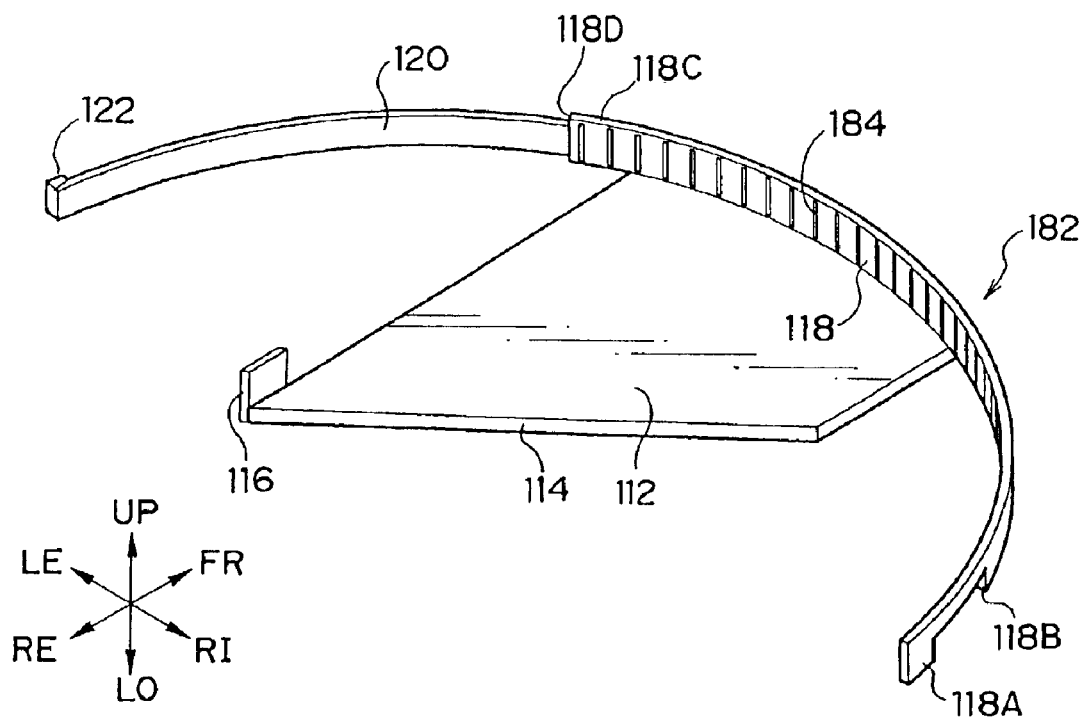
FIG. 16 is a perspective view showing a modification of a first shutter member constituting the disc cartridge according to the second embodiment of the present invention.

The groove portions 184 are formed to reduce the contact area between the arcuate guide wall portion 118 and the outer peripheral surface of the cylindrical wall 40 and thus reduce the sliding resistance (friction). Accordingly, these groove portions 184 may be formed on at least an inner surface portion of the arcuate guide wall portion 118 which closes the cut-out portion of the front portion of the cylindrical wall 40, and it is preferable from the viewpoint of the exterior appearance of the disc cartridge 180 that the outer surface of the arcuate guide wall portion 118 is a flat surface. Further, as shown in FIG. 16, each portion between the groove portions 184 is not necessarily formed in the form of an arc in plan view, however, it is preferable that it is formed arcuately in plan view because the contact area between the arcuate guide wall portion 118 and the outer peripheral surface of the cylindrical wall 40 can be further reduced.

Figure 17:
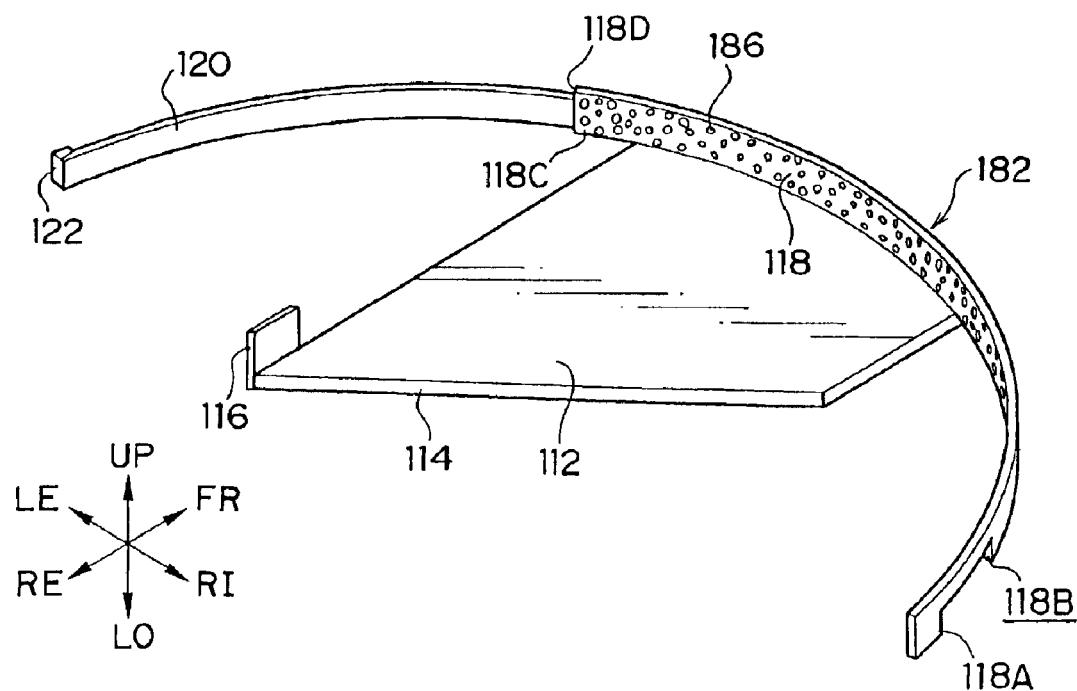
FIG. 17 is a perspective view showing another modification of the first shutter member constituting the disc cartridge according to the second embodiment of the present invention.

Further, in place of the plural groove portions 184, many minute projections 186 may be provided as a friction reducing shape as shown in FIG. 17 to thereby achieve a substantially uneven shape (satin finished surface). The same effect can be also achieved by the above construction. Accordingly, the inner surface of the arcuate guide wall portion 118 may be formed in any shape insofar as it can reduce the contact area between the arcuate guide wall portion 118 and the outer peripheral surface of the cylindrical wall 40 and thus reduce the sliding resistance (friction).

Still further, at least an inner surface portion of the arcuate guide wall portion 118 which is brought into contact with the outer peripheral surface of the cylindrical wall 40 is preferably formed of a material having excellent sliding performance and wear resistance such as POM or the like. Such a material can more enhance the sliding performance of the arcuate guide wall portion 118 and prevent occurrence of powder dust, etc. due to wear.

The shutter drawing portion 120 is not necessary to be provided with groove portions 184, etc. The shutter drawing portion 120 of the first shutter member 182 may be fixedly (integrally) provided to the arcuate guide wall portion 118 or provided along the inner surface of the arcuate guide wall portion 118.

Next, the operation of the disc cartridge 180 according to the second embodiment of the present invention, particularly the different portion from that of the first embodiment will be mainly described.

According to the disc cartridge 180, when the aperture 14 is opened/closed, the inner surface of the arcuate guide wall portion 118 is slid along the outer peripheral surface of the cylindrical wall 40 of the case 30 as in the case of the disc cartridge 10.

At this time, the arcuate guide wall portion 118 has plural groove portions 184 or many minute projections 186 formed on the inner surface thereof, so that the sliding resistance (friction) thereof to the outer peripheral surface of the cylindrical wall 40 is reduced and thus the arcuate guide wall portion 118 slides smoothly.

As described above, the inner surface of the arcuate guide wall portion 118 of the first shutter member 182 which is brought into contact with at least the outer peripheral surface of the cylindrical wall 40 is designed to have such a friction reducing shape that the contact area between the arcuate guide wall portion 118 and the outer peripheral surface of the cylindrical wall 40 is reduced and thus the friction is reduced, that is, the plural groove portions 184 extending in the up-and-down direction are provided to achieve the substantially uneven shape in plan view on the inner surface of the arcuate guide wall portion 118 or the many minute projections 186 are provided to achieve the substantially uneven shape on the inner surface of the arcuate guide wall portion 118. Therefore, the sliding resistance (friction) between the outer peripheral surface of the cylindrical wall 40 of the base plate portion 32 serving as the lower shell and the first shutter member 182 can be reduced, and malfunction and occurrence of powder dust, etc. due to friction can be prevented.

Accordingly, the sliding operation (opening/closing operation) of the first shutter member 182 can be smoothly and stably performed. In addition, occurrence of errors in the recording/reproducing operation due to adhesion of powder dust, etc. to the recording face (lower surface 24) of the disc medium 20 can be prevented.

As described above, according to the disc cartridge 180 of the second embodiment, the sliding performance of the first shutter member 182 can be improved, and the opening/closing operation of the first shutter member 182 can be smoothly performed. That is, in the disc cartridge 180, the first shutter member 182 operates smoothly.

According to the second embodiment, the groove portions 184 or projections 186 are provided as the friction reducing shape on the inner surface of the arcuate guide wall portion 118 of the first shutter member 182. However, the present invention is not limited to this construction. For example, the outer peripheral surface of the cylindrical wall 40 of the base plate portion 32 may be designed to have a friction reducing shape as shown in FIG. 18.

Figure 18:
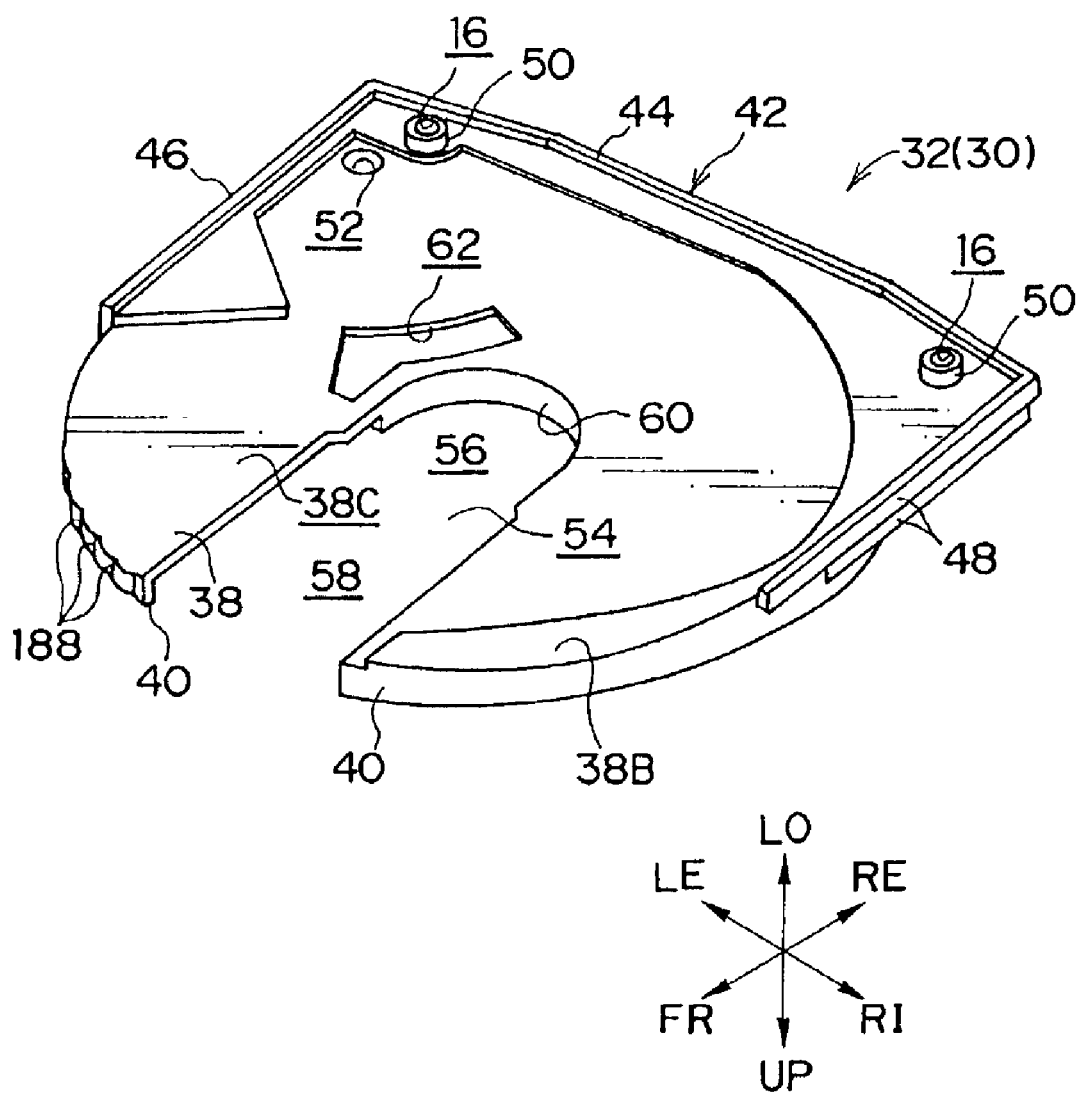
FIG. 18 is a perspective view showing a modification of a base plate portion constituting the disc cartridge according to the second embodiment of the present invention.

That is, as shown in FIG. 18, plural groove portions 188 extending in the up-and-down direction may be provided on the outer peripheral surface of the cylindrical wall 40 which is brought in contact with at least the inner surface of the arcuate guide wall portion 118, and also each portion between the groove portions 188 may be formed substantially arcuately in plan view to thereby achieve the substantially uneven shape in plan view as a whole. This construction also achieves the same effect as described above. In this case, the structure of the metal mold for forming the base plate portion 32 is complicated, and thus it is preferable that the friction reducing shape achieved by providing many minute projections is not provided to the outer peripheral surface of the cylindrical wall 40.

(Third Embodiment)

Next, a disc cartridge 190 according to a third embodiment of the present invention will be described. The basically same parts and portions as the first embodiment are represented by the same reference numerals as the first embodiment, and the description thereof is omitted.

Figure 19:
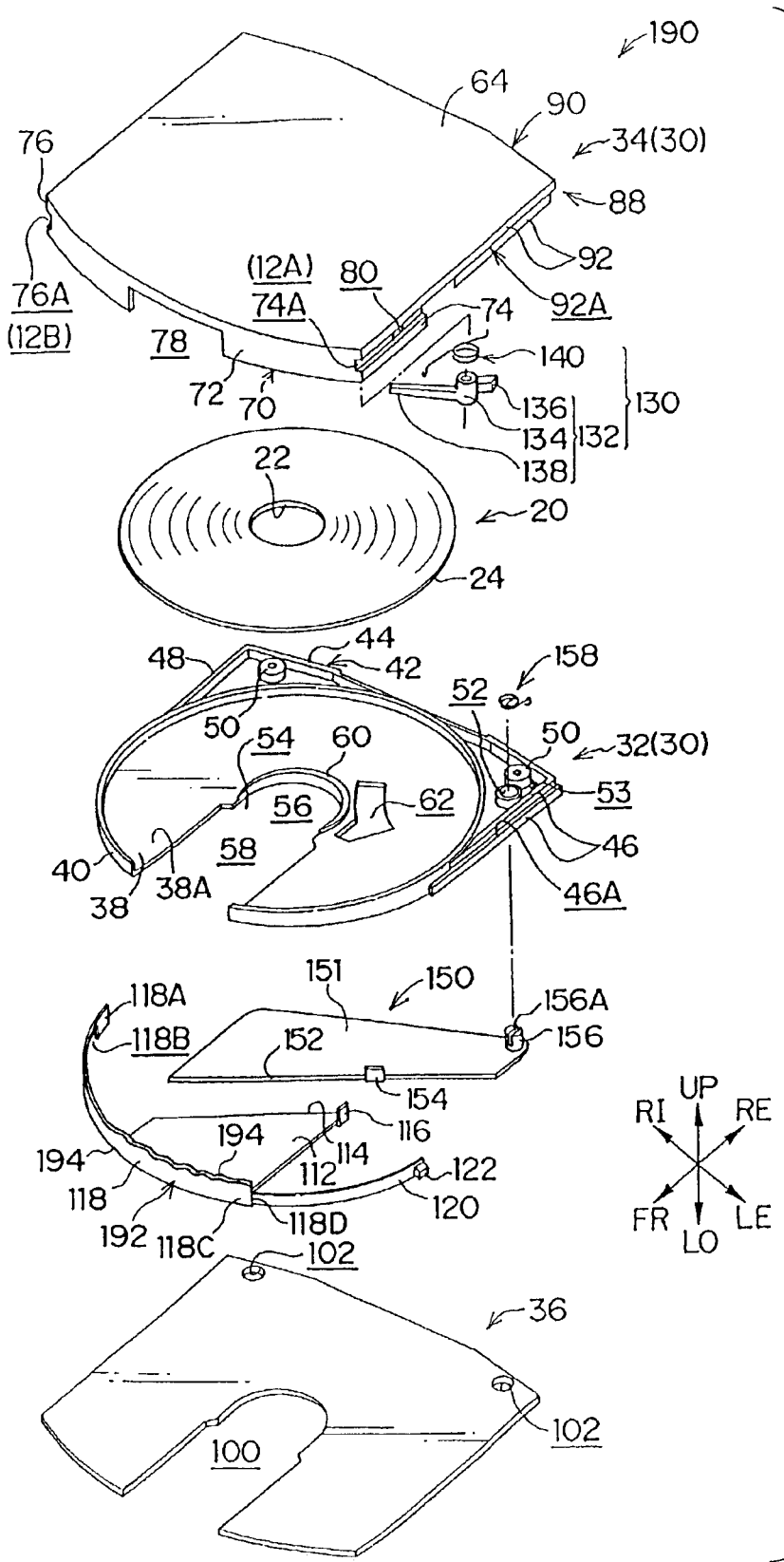
FIG. 19 is an exploded perspective view showing a disc cartridge according to a third embodiment of the present invention, which is viewed from the upper side of the disc cartridge.
Figure 20:
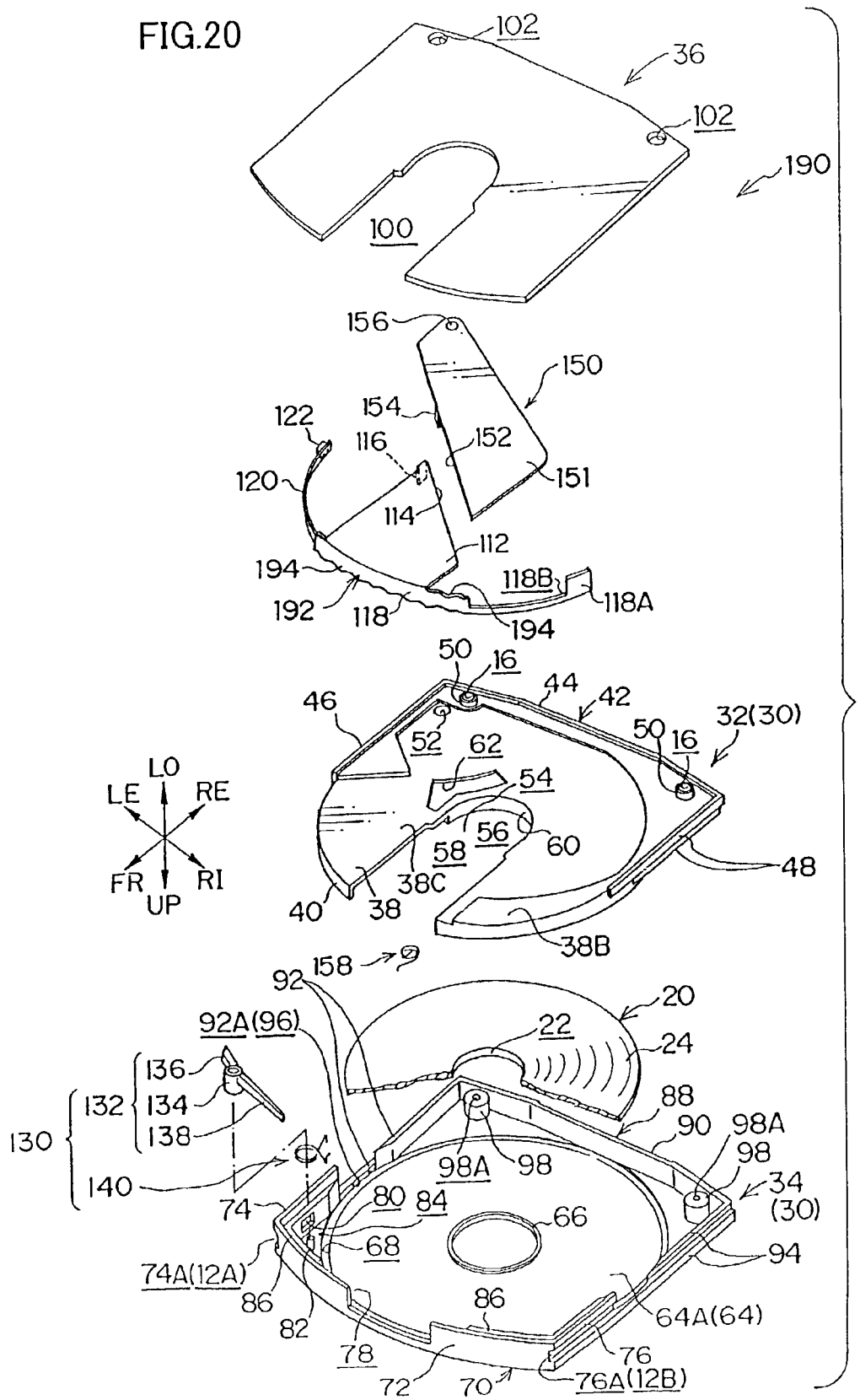
FIG. 20 is an exploded perspective view showing the disc cartridge according to the third embodiment of the present invention, which is viewed from the lower side of the disc cartridge.

As shown in FIGS. 19 and 20, the disc cartridge 190 has a first shutter member 192 in place of the first shutter member 110. The first shutter member 192 has a common construction to the first shutter member 110 of the first embodiment in the point that it has a shutter main body 112 (abutting portion 114, press piece 116), an arcuate guide portion 118, a shutter drawing portion 120 and a shutter fitting portion 122.

On the other hand, the first shutter member 192 is different from the first shutter member 110 in the point that an uneven portion 194 is formed as a friction reducing shape on the upper and lower end portions of the arcuate guide wall portion 118. The first shutter member 192 will be described below in detail.

Figure 21:
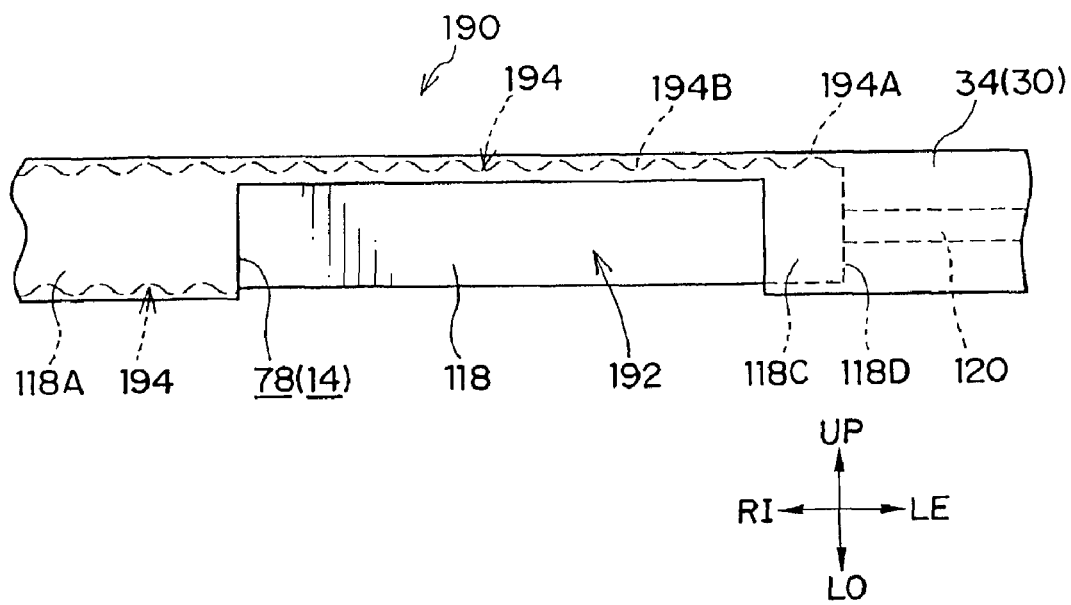
FIG. 21 is a front view showing the disc cartridge according to the third embodiment of the present invention.

In the arcuate guide wall portion 118, an uneven portion 194 having a substantially corrugated shape in front view is formed in each of the upper end portion thereof and the lower end portion with which the shutter main body 112 is not continuous (i.e., the lower portions of the extension portions 118A, 118C) as shown in FIG. 21. The respective uneven portions 194 are provided to reduce the contact area between the arcuate guide wall portion 118 and the annular groove 68 of the upper plate portion 34 and the contact area between the arcuate guide wall portion 118 and the lower plate portion 36 to thereby reduce the sliding resistance (friction). The projecting portions 194A of the uneven portions 194 are preferably formed to be substantially arcuate in order to reduce the contact area as much as possible. The recess portions 194B are formed in such a depth that no gap occurs in the upper portion of the window portion 78 in front view in order to keep the dust control function when the aperture 14 is closed.

Figure 22:
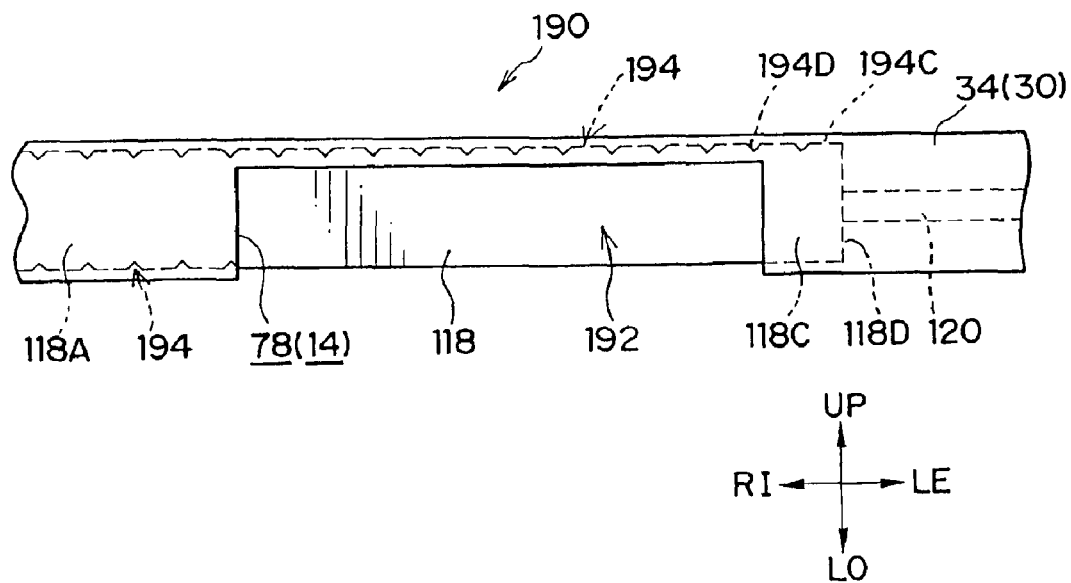
FIG. 22 is a front view showing a disc cartridge according to a modification of the third embodiment of the present invention.
Figure 23:
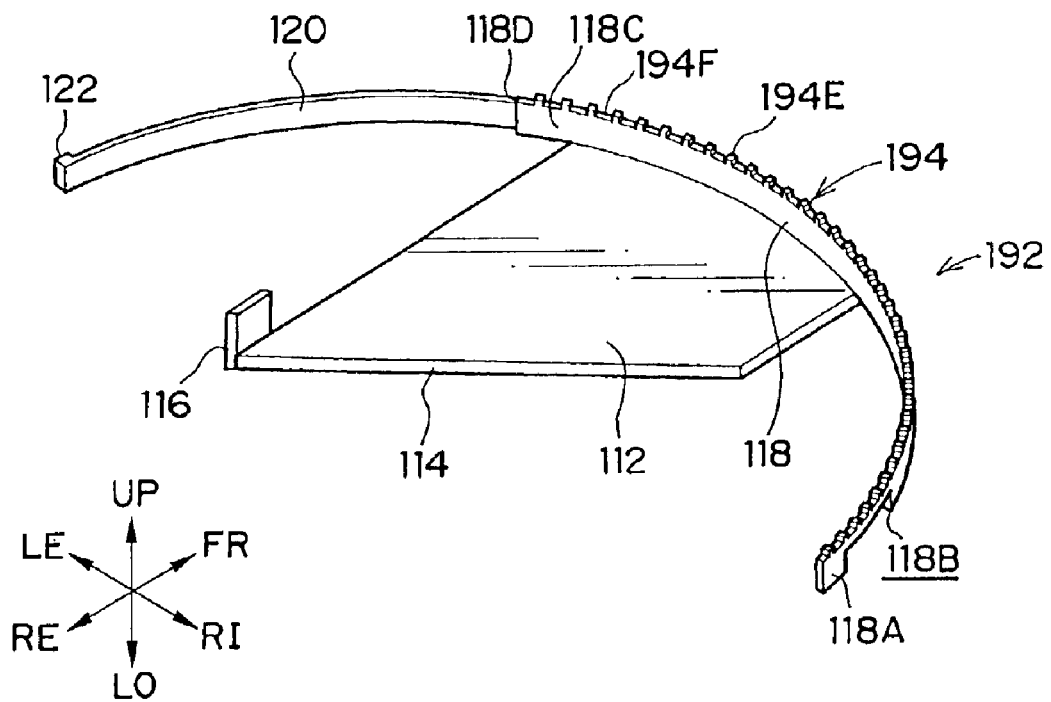
FIG. 23 is a perspective view showing a modification of a first shutter member constituting the disc cartridge according to the third embodiment of the present invention.
Figure 24:
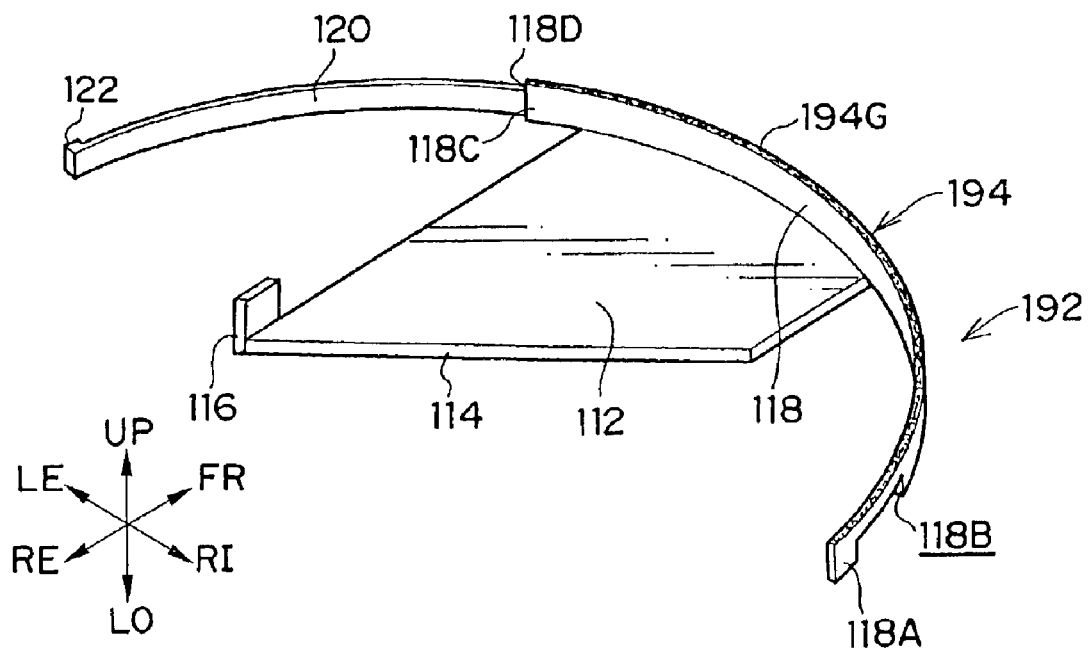
FIG. 24 is a perspective view showing another modification of the first shutter member constituting the disc cartridge according to the third embodiment of the present invention.

The shape of each projecting portion 194A is preferably an substantially arcuate shape in front view s shown in FIG. 21, however, the present invention is not limited to this shape. Any shape, for example, as shown in FIGS. 22 to 24 may be adopted insofar as it reduces the contact area between the arcuate guide wall portion 118 and the annular groove 68 and the contact area between the arcuate guide wall portion 118 and the lower plate portion 36, and thus reduces the sliding resistance (friction). That is, any groove portions 194D each having substantially a V-shape in front view as shown in FIG. 22 may be provided to achieve linear projecting portions 194C, or many recess portions 194F each having substantially a rectangular shape in front view as shown in FIG. 23 may be provided to achieve short linear projecting portions 194E. Further, an uneven portion 194 having a substantially uneven shape achieved by combining the above groove portions 194D and the recess portions 194F may be formed. Further, as shown in FIG. 24, many minute projecting portions 194G may be provided to achieve an uneven portion 194 having a so-called satin-finished surface.

Such an uneven portion 194 is preferably provided to each of the upper and lower end portions of the arcuate guide wall portion 118, however, it may be provided to any one of the upper and lower end portions. Further, the uneven portion 194 of the upper end portion and the uneven portion 194 of the lower end portion may be designed to be different in shape. Further, at least the upper and lower end portions of the arcuate guide wall portion 118 on which the uneven portion 194 is formed are preferably formed of a material having excellent sliding performance and wear resistance, such as POM or the like. This material can more enhance the sliding performance of the arcuate guide wall portion 118, and more prevent occurrence of powder dust, etc. due to wear.

Further, in place of the provision of the uneven portion 194 to the arcuate guide wall portion 118 of the first shutter member 110, the uneven portion may be provided to at least the sites (corresponding to the sliding locus of the arcuate guide wall portion 118) of the annular groove 68 and the lower plate portion 36 which are brought into contact with the upper and lower end portions of the arcuate guide wall portion 118, respectively. The same effects can be also achieved by the above construction. In this case, the uneven portion is preferably provided to each of both the annular groove 68 and the lower plate portion 36, however, it may be provided to any one of the annular groove 68 and the lower plate portion 36.

The uneven portion 194 is not needed to be provided to the shutter drawing portion 120. The shutter drawing portion 120 of the shutter member 192 may be fixedly (integrally) provided to the arcuate guide wall portion 118, or it may be provided along the inner surface of the arcuate guide wall portion 118.

Next, the operation of the disc cartridge 190 according to a third embodiment of the present invention, particularly the different points from the first embodiment will be mainly described.

In the disc cartridge 190, when the aperture 14 is opened/closed, the upper and lower end faces of the arcuate guide wall portion 118 are slid along the bottom surface of the annular groove 68 and the upper surface of the lower plate portion 36 of the case 30 respectively as in the case of the disc cartridge 10. At this time, the arcuate guide wall portion 118 is equipped with the uneven portion 194 having the substantially corrugated shape or the like in plan view at each of the upper and lower end portions thereof, so that the sliding resistance (friction) to the annular groove 68 of the upper plate portion 34 and the lower plate portion 36 is reduced, so that the arcuate guide wall portion 118 slides smoothly.

As described above, the upper and lower end faces of the arcuate guide wall portion 118 are designed to have such a friction reducing shape that the contact area between the upper end portion of the arcuate guide wall portion 118 of the first shutter member 192 and the annular groove 68 of the upper plate portion 34 and/or the contact area between the lower end portion of the arcuate guide wall portion 118 of the first shutter member 192 and the lower plate portion 36 are reduced to thereby reduce the friction, that is, the upper and lower end faces of the arcuate guide wall portion 118 are designed to have a substantially corrugated shape or the like (i.e., they are provided with the uneven portions 194), so that the sliding resistance (friction) of the first shutter member 192 can be reduced and thus malfunction due to friction and occurrence of powder dust, etc. due to wear can be prevented.

Accordingly, the sliding motion (opening/closing operation) of the first shutter member 192 can be smoothly and stably performed, and further occurrence of errors in the recording/reproducing operation due to adhesion of powder dust, etc. to the recording face (lower surface 24) of the disc medium 20 can be prevented.

As described above, according to the disc cartridge 190 of the third embodiment, the sliding performance of the first shutter member 192 can be improved, and the opening/closing operation of the first shutter member 192 can be smoothly performed. That is, the first shutter member 192 of the disc cartridge 190 operates smoothly.

(Fourth Embodiment)

Next, a disc cartridge 200 according to a fourth embodiment of the present invention will be described. The basically same parts and portions as the first embodiment are represented by the same reference numerals as the first embodiment, and the description thereof is omitted.

Figure 25:
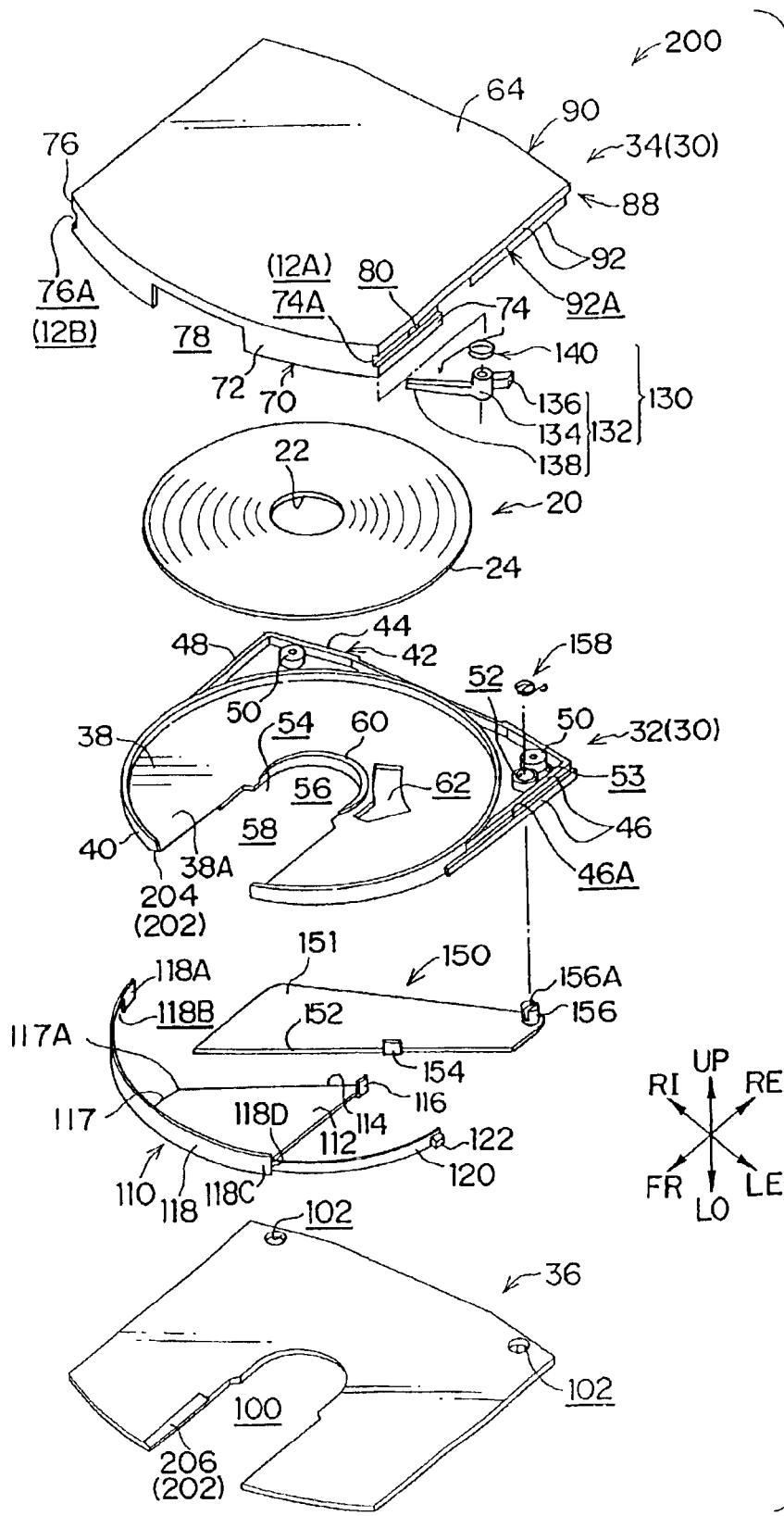
FIG. 25 is an exploded perspective view showing a disc cartridge according to a fourth embodiment of the present invention, which is viewed from the upper side of the disc cartridge.
Figure 26:
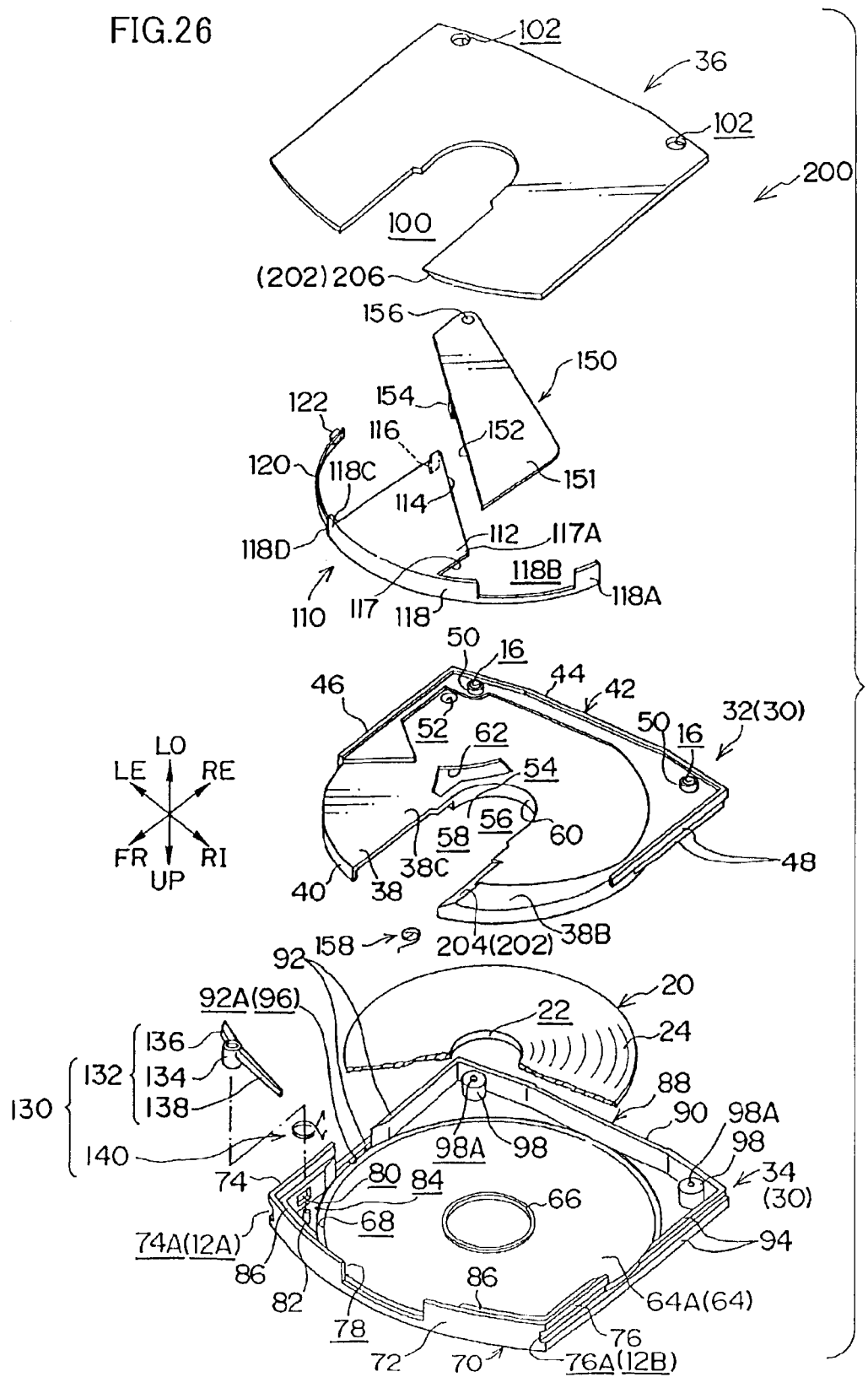
FIG. 26 is an exploded perspective view showing the disc cartridge according to the fourth embodiment of the present invention, which is viewed from the lower side of the disc cartridge.

As shown in FIGS. 25 and 26, the disc cartridge 200 has a first shutter member 110 as in the case of the disc cartridge 10 according to the first embodiment. For convenience's sake of description, the right end portion (close-side end portion) extending in the front-and-rear direction of the shutter main body 112 when the aperture 14 is closed is referred to as "right-side portion" 117, and an obtuse-angle portion which is sandwiched between the rear end of the right-side portion 117 and the abutting portion 114 is referred to as "corner portion" 117A. In the fourth embodiment, the shutter drawing portion 120 of the first shutter member 110 may be fixedly (integrally) provided to the arcuate guide wall portion 118, or it may be provided along the inner surface of the arcuate guide wall portion 118.

The disc cartridge 200 has a tapered reception portion 202 in which the right-side portion 117 of the first shutter member 110 is accommodated under the close state of the aperture 14, and it is different in this point from the disc cartridge 10 in which the right-side portion 117 is merely accommodated in the space (reception portion) in which the recess portion 38C of the base plate portion 32 and the lower plate portion 36 are merely confronted to each other substantially in parallel.

Figure 29A:
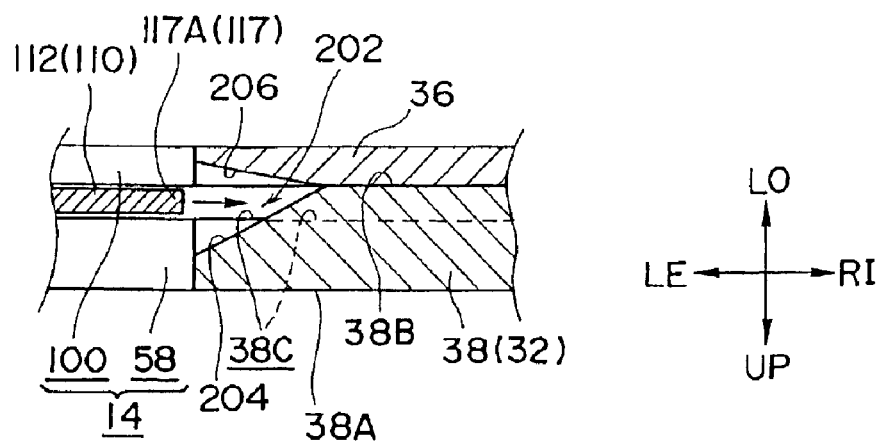
FIG. 29A is a cross-sectional view showing the end portion of the first shutter member and a reception portion constituting the disc cartridge according to the fourth embodiment of the present invention.
Figure 29B:
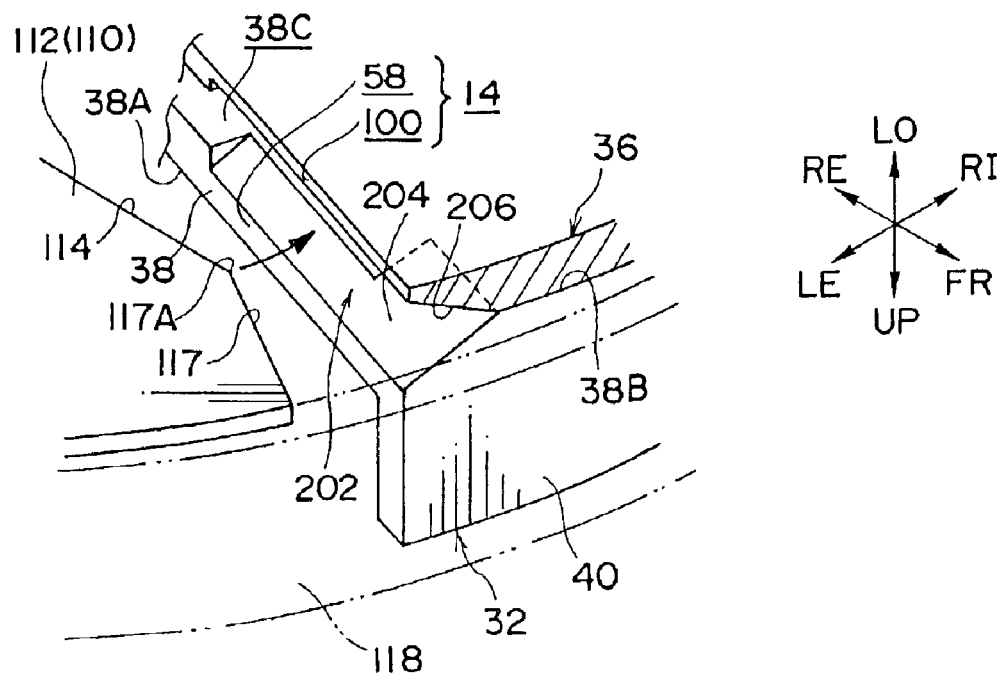
FIG. 29B is a perspective view showing the end portion of the first shutter member and the reception portion.

The reception portion 202 is provided between the recess portion 38C of the base plate portion 32 and the lower plate portion 36 in the neighborhood of the right-side edge portion of the portion corresponding to the recording/reproducing head window portion 58 of the aperture 14. As shown in FIGS. 29A and 29B, the reception portion 202 has an oblique portion 204 provided to the recess portion 38C of the base plate portion 32 and an oblique portion 206 provided to the lower plate portion 36.

The oblique portion 204 is designed to have a flat oblique surface inclined so that the front portion of the right-side edge portion of the recording/reproducing head window portion 58 is chamfered and the base bottom portion 38 is reduced in thickness at the recording/reproducing head window portion 58 side. The front portion of the oblique portion 204 extends to the lower surface 38B of the base plate portion 32. The oblique portion 206 is designed to have a flat oblique surface inclined so that the front portion of the right-side edge portion of the aperture 100 is chamfered and the lower plate portion 36 is reduced in thickness at the aperture 100 side.

Accordingly, the reception portion 202 is designed in such a vertically-symmetrical tapered structure that the confronting interval between the base plate portion 32 (the recess portion 38C) and the lower plate portion 36 is continuously expanded toward the edge portion side of the aperture 14 and the reception port is broad. The length of the reception portion 202 in the front-and-rear direction is set to be longer than the length of the right-side portion 117 of the first shutter member 110, and the reception portion 202 accommodates (receives) the corner portion 117A of the shutter main body 112 in combination with the right-side portion 117.

Next, the operation of the disc cartridge 200 according to the fourth embodiment, particularly the different portion from the first embodiment will be described.

Figure 27:
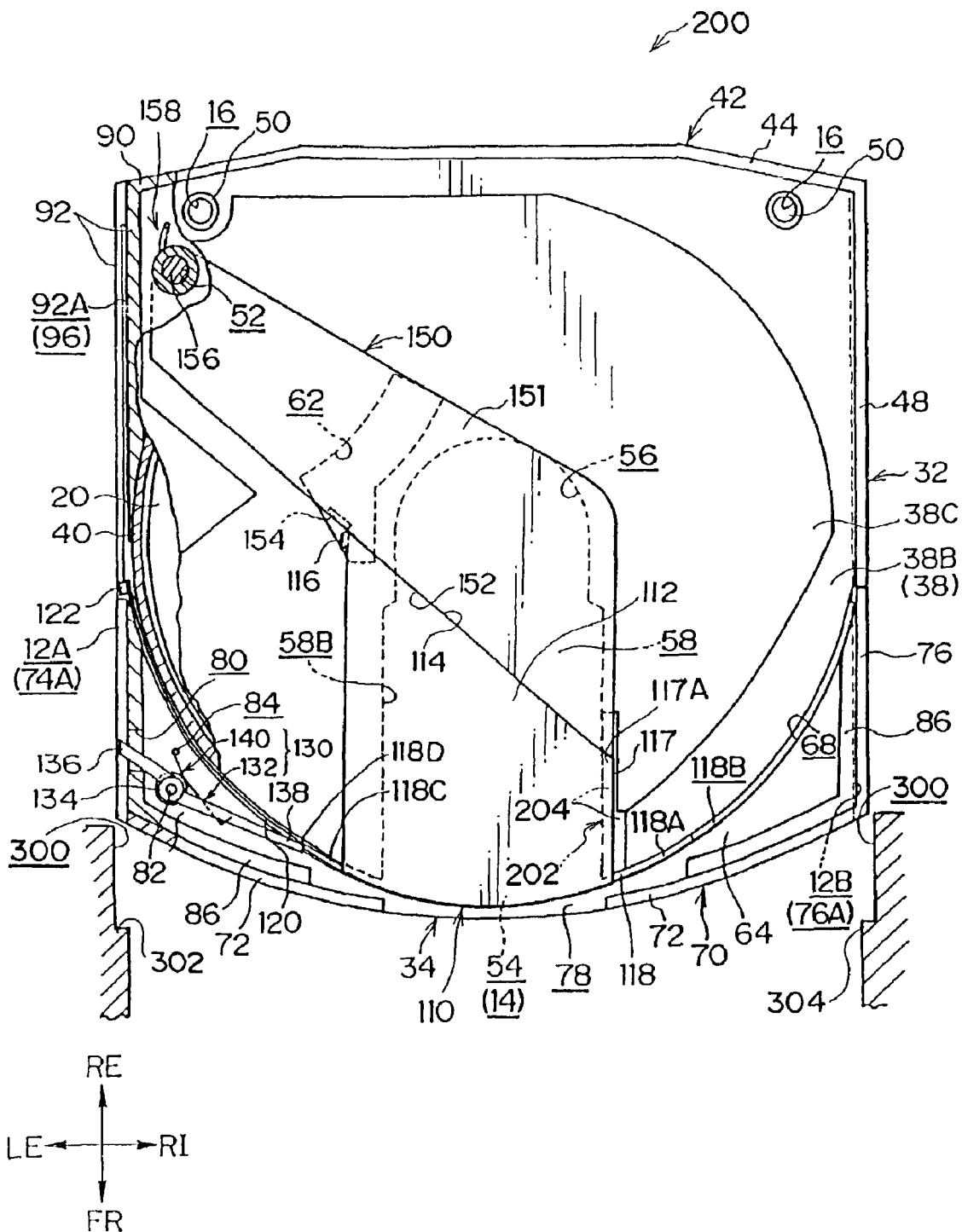
FIG. 27 is a view which shows the whole construction of the disc cartridge according to the fourth embodiment of the present invention under the aperture closed state, which is a partially-notched bottom view when the lower plate portion is removed.

As shown in FIG. 27, in the disc cartridge 200, the right-side portion 117 and the corner portion 117A of the first shutter member 110 (shutter main body 112) is located in the reception portion 202 under the state that the aperture 14 is closed.

Figure 28:
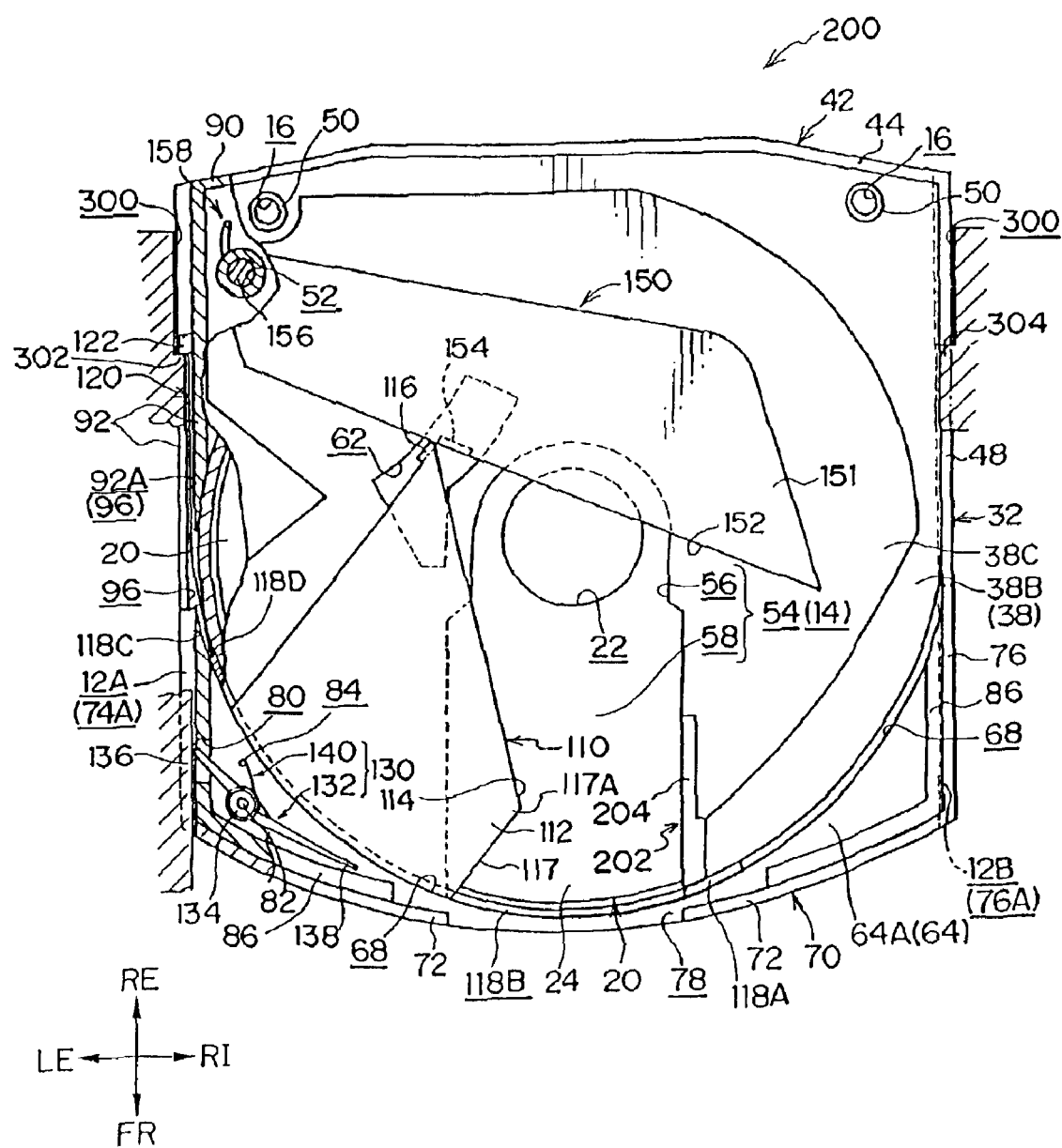
FIG. 28 is a view which shows an aperture opening process of the disc cartridge according to the fourth embodiment of the present invention.

When the aperture 14 opened is closed, the first shutter member 110 (shutter main body 112) is rotated with the corner portion 117A at the head of the rotation, and the corner portion 117A and the right-side portion 117 are accommodated (enters) the reception portion 202, whereby the first shutter member 110 is returned to the initial position, as shown in FIGS. 28 and 29.

Here, since the reception portion 202 is designed in such a tapered structure that the confronting interval between the base plate portion 32 and the lower plate portion 36 is continuously enlarged toward the reception port (the edge portion side of the aperture 14), the interference between the right-side portion 117 of the first shutter member 110 (the shutter main body 112), particularly, the corner portion 117A and the reception portion 202 due to the closing operation of the aperture 14 (the recording/reproducing head window portion 58) can be prevented. That is, the interference between the right-side portion 117 (particularly the corner portion 117A) and the edge portion of the aperture 14 of the base plate portion 32 (case 30) or the lower plate portion 36 can be prevented.

Accordingly, even when the corner portion 117A of the first shutter member 110 is upwardly or downwardly displaced due to warp, the corner portion 117A and the right-side portion 117 can be smoothly accommodated (enter) the reception portion 202, so that the aperture 14 (mainly the recording/reproducing head window portion 58) can be surely closed.

As described above, in the disc cartridge 200 according to the fourth embodiment, the first shutter member 110 can be smoothly operated with no interference between each of the corner portion 117A and the right-side portion 117 of the first shutter member 110 and the edge portion of the aperture 14, and the aperture 14 for access to the disc medium 20 can be surely closed.

Further, the reception portion 202 is designed to have the oblique portion 204 at the base plate portion 32 (case 30) side and the oblique portion 206 at the lower plate portion 36 side, in other words, the corner portion 117A of the shutter main body 112 can enter the reception portion 202 smoothly even when it is warped upwardly or downwardly, so that it is unnecessary to identify the warping direction in the step of processing or manufacturing the first shutter member 110 (shutter main body 112), and thus the processing and manufacturing performance can be enhanced.

Next, a modification of the fourth embodiment will be described with reference to FIG. 30. The basically same parts and portions as the first and fourth embodiments are represented by the same reference numerals as the first and fourth embodiments and the description thereof is omitted.

Figure 30A:
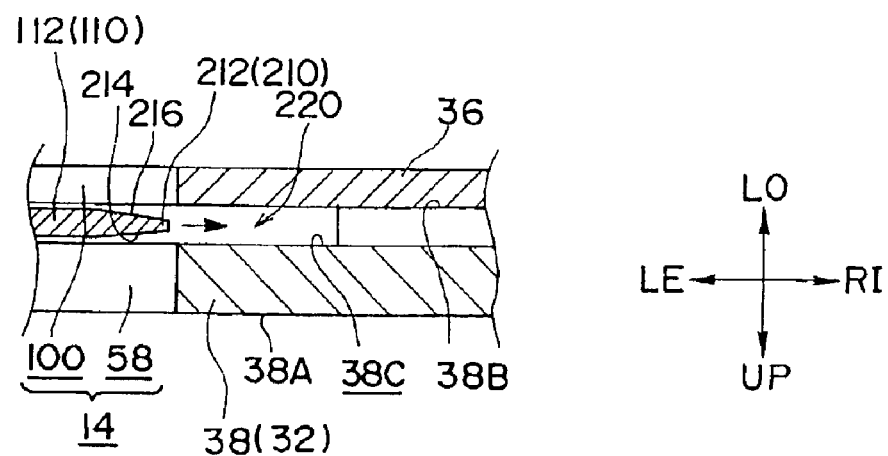
FIG. 30A is a cross-sectional view showing the end portion of the first shutter member and the reception portion constituting a disc cartridge according to a modification of the fourth embodiment of the present invention.
Figure 30B:
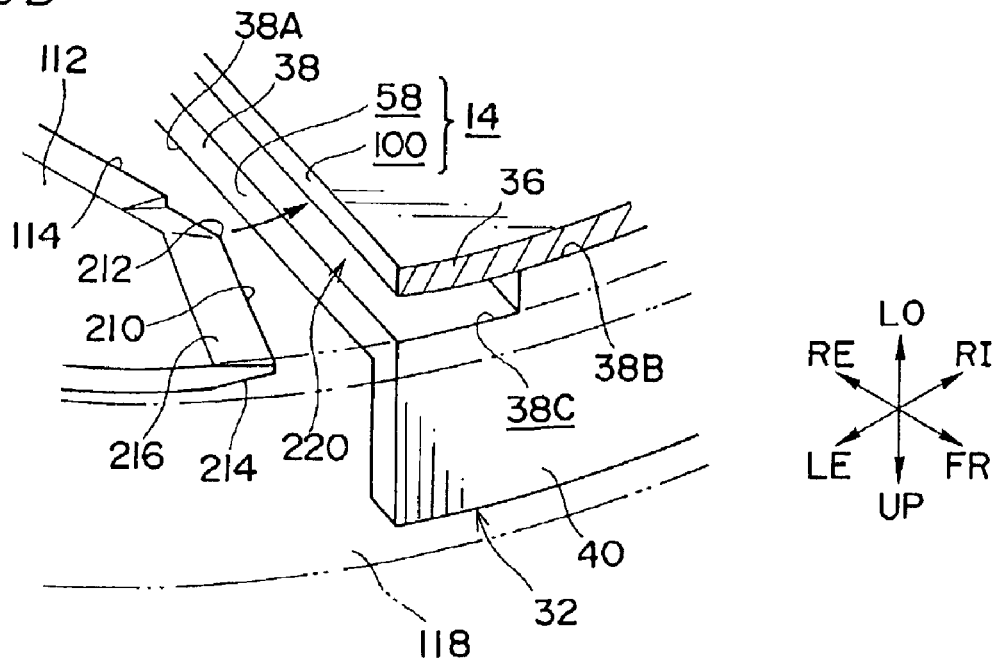
FIG. 30B is a perspective view showing the end portion of the first shutter member and the reception portion.

FIGS. 30A and 30B are cross-sectional and perspective views showing a right-side portion 210 serving as the closing-side end portion of the first shutter member 110 and a reception portion 220 according to a modification of the fourth embodiment, which correspond to FIGS. 29A and 29B.

As shown in FIGS. 30A and 30B, an oblique face 214 which is chamfered at the edge portion (the end portion in the thickness direction) of the upper surface side of the right side portion 210 serving as the right end portion along the front-and-rear direction under the close state of the aperture 14 of the shutter main body 112 (the first shutter member 110) and inclined downwardly toward the end portion is formed at the right side portion 210 containing the corner portion 212 serving as the obtuse-angle portion sandwiched between the abutting portion 114 and the right side portion 210 at the rear end of the right-side portion 210, and the lower surface side edge thereof is chamfered to form an oblique surface inclined upwardly to the end portion. Accordingly, the right-side portion 210 and the corner portion 212 of the shutter main body 112 are designed in a tapered structure which is substantially symmetrical in the up-and-down direction and reduced in thickness toward the end portion.

The reception portion 220 is not provided with the oblique portions corresponding to the oblique portions 204, 206 of the reception portion 202 (the edge portion is not chamfered), and the confronting interval between the base plate 32 (recess portion 38C) and the lower plate portion 36 is fixed. That is, the reception portion 220 is not designed in such a tapered structure as the reception portion 202 (the same construction as the disc cartridge 10 of the first embodiment or the like).

With the construction of this modification, the same effect as the first embodiment can be also achieved. Specifically, the interference between the right-side portion 210 of the first shutter member 110 (shutter main body 112) particularly the corner portion 212 and the and the reception portion 220 due to the closing operation of the aperture 14 (recording/reproducing head window portion 58)can be prevented. That is, the interference between the right-side portion 210 (particularly the corner portion 212) and the base plate portion 32 (case 30) or the edge portion of the aperture 14 of the lower plate portion 36(reception port) can be prevented, and even when the first shutter member 110 is displaced in the up-and-down direction (thickness direction) due to the warp of the corner portion 212, the corner portion 212 and the right-side portion 210 can be accommodated (enter) the reception portion 220 smoothly, so that the aperture 14(mainly the recording/reproducing head window 58) can be surely closed.

Since the right-side portion 210 of the first shutter member 110 is equipped with the oblique faces 214, 216 on the upper and lower surfaces thereof, in other words, the right-side portion 210 is formed (designed) in a substantially symmetrical structure in the up-and-down direction so as to have the oblique surface 214 at the base plate portion 32 (case 30) and the oblique surface 216 at the lower plate portion 36 side, the corner portion 212 of the first shutter member 110 can enter the reception portion 220 smoothly even when a warp occurs in any direction of upward and downward directions. Therefore, it is unnecessary to identify the warping direction in the step of processing or manufacturing the first shutter member 110 (shutter main body 112) and thus the workability and assembly performance can be enhanced.

In the fourth embodiment and the modification thereof, when the aperture 14 is closed, the right-side portion 117 and the corner portion 117A of the first shutter member 110 enter the reception portion 202, and the right-side portion 210 and the corner portion 212 enter the reception portion 220. However, the presents invention is not limited to this style, and for example, the disc cartridge may be designed so that the right-side portion 210 and the corner portion 212 of the first shutter member 110 are accommodated in the reception portion 202.

Further, in the fourth embodiment and the modification thereof, it is preferable that the tapered structure of the reception portion 220 is constructed by the oblique portions 204, 206, and the tapered structure of the first shutter member 110 is constructed by the oblique surfaces 214, 216. However, the present invention is not limited to this construction, and for example, each tapered structure may be constructed asymmetrically in the up-and-down direction by any one of the upper and lower oblique portions or oblique surfaces. Accordingly, for example, in accordance with the warping direction of the shutter main body 112 of the first shutter member 110, it may be modified so that the reception portion 202 has no oblique portion 206 and the tapered structure is based on only the oblique portion 204, or so that the right-side portion 210 has no oblique surface 214 and the tapered structure is based on only the oblique surface 216.

Still further, in the fourth embodiment and the modification, the oblique portion (oblique surface) constituting the tapered structure is constructed by a plane (linear in cross-section view). However, the present invention is not limited to this construction, and for example, one or both of the oblique portions 204, 206 may be constructed by a curved surface.

(Fifth Embodiment)

Next, a disc cartridge 230 according to a fifth embodiment of the present invention will be described. The basically same parts and portions as the first and fourth embodiments are represented by the same reference numerals as the first and fourth embodiments, and the description thereof is omitted.

FIG. 31 is an exploded perspective view showing a disc cartridge 230 which is taken from the lower side of the disc cartridge 230.

As shown in FIG. 31, the disc cartridge 230 is different from the first and fourth embodiments in that it has a first shutter member 234 having a shutter main body 232 in place of the shutter main body 112, and also it is different from the fourth embodiment in that a reception portion 250 (the base plate portion 32, the lower plate portion 36) is not provided with the oblique portions 204, 206 (in this sense, this embodiment is similar to the modification of the fourth embodiment).

Figure 32:
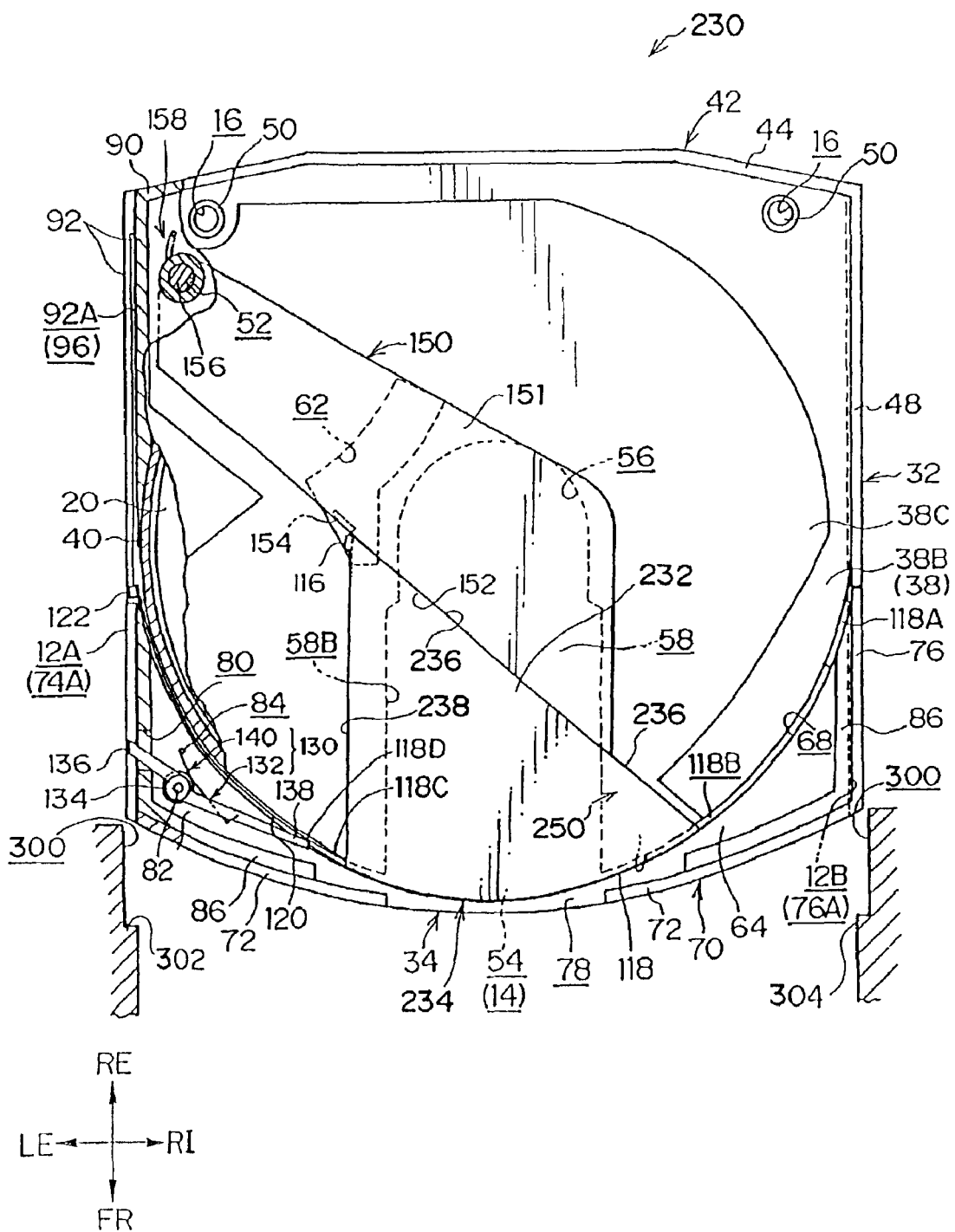
FIG. 32 is a view which shows the whole construction of the disc cartridge according to the fifth embodiment of the present invention, which is a partially-notched bottom view when the lower plate portion is removed.

The shutter main body 232 is designed substantially in such a wedge shape that the abutting portion 114 of the shutter main body 112 has an oblique line portion 236 which is linearly extended to the arcuate guide wall portion 118 and serves as an abutting portion 114. That is, as shown in FIG. 32, the outer edge of the shutter main body 232 is designed in a wedge shape to have a left-side portion 238 serving as a linear portion extending in the longitudinal direction of the aperture 14 (recording/reproducing head window portion 58) when the aperture 14 is closed, a linear oblique-line portion 236 which is inclined with respect to the left-side portion 238 and extends along the left edge portion (the longitudinal direction) of the recording/reproducing head window portion 58 when the aperture 14 is opened, and an arcuate portion 240 from which the arcuate guide wall portion 118 is erected.

Figure 33:
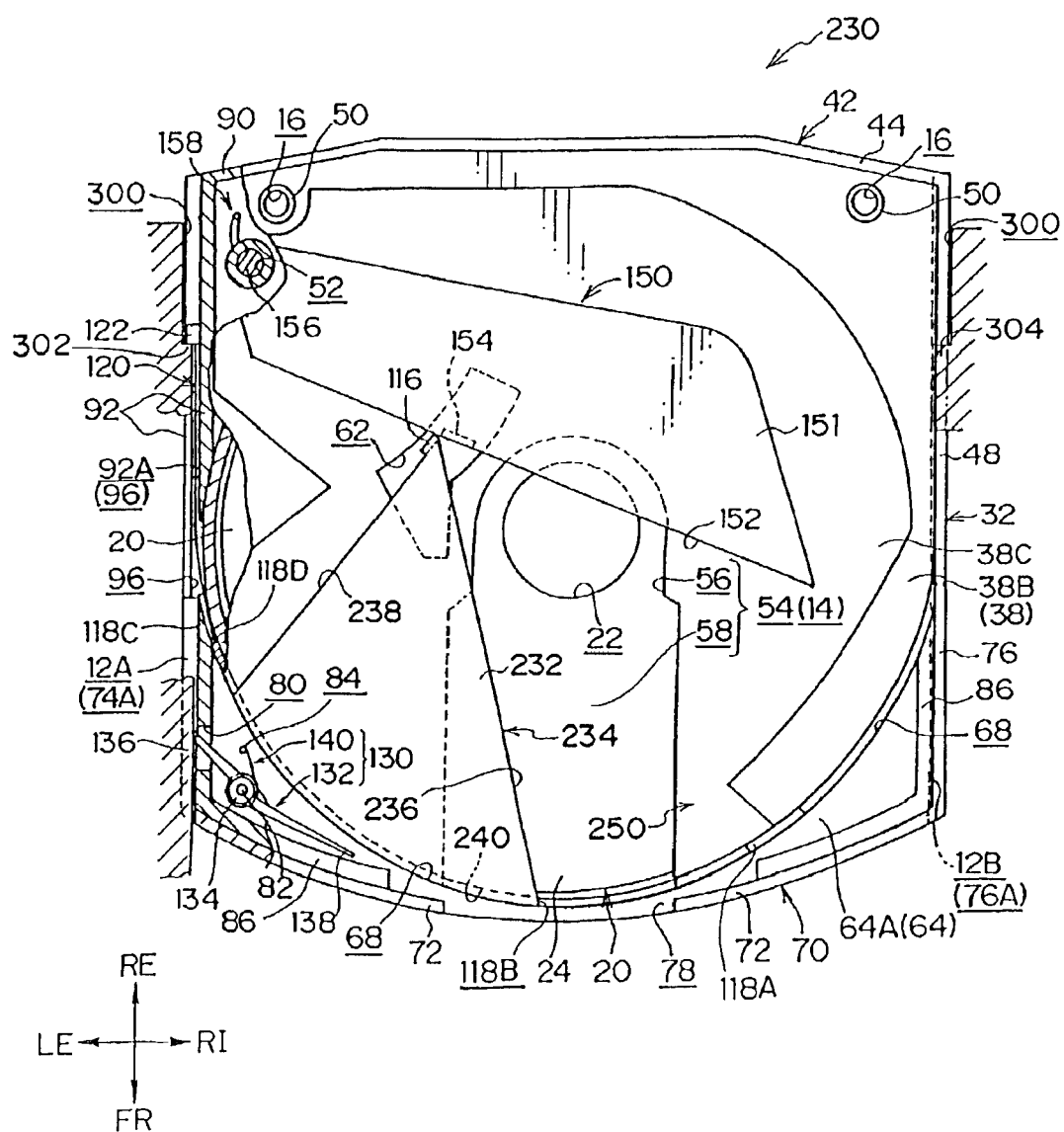
FIG. 33 is a view which shows an aperture opening process of the disc cartridge according to the fifth embodiment of the present invention, which corresponds to FIG. 32.
Figure 34:
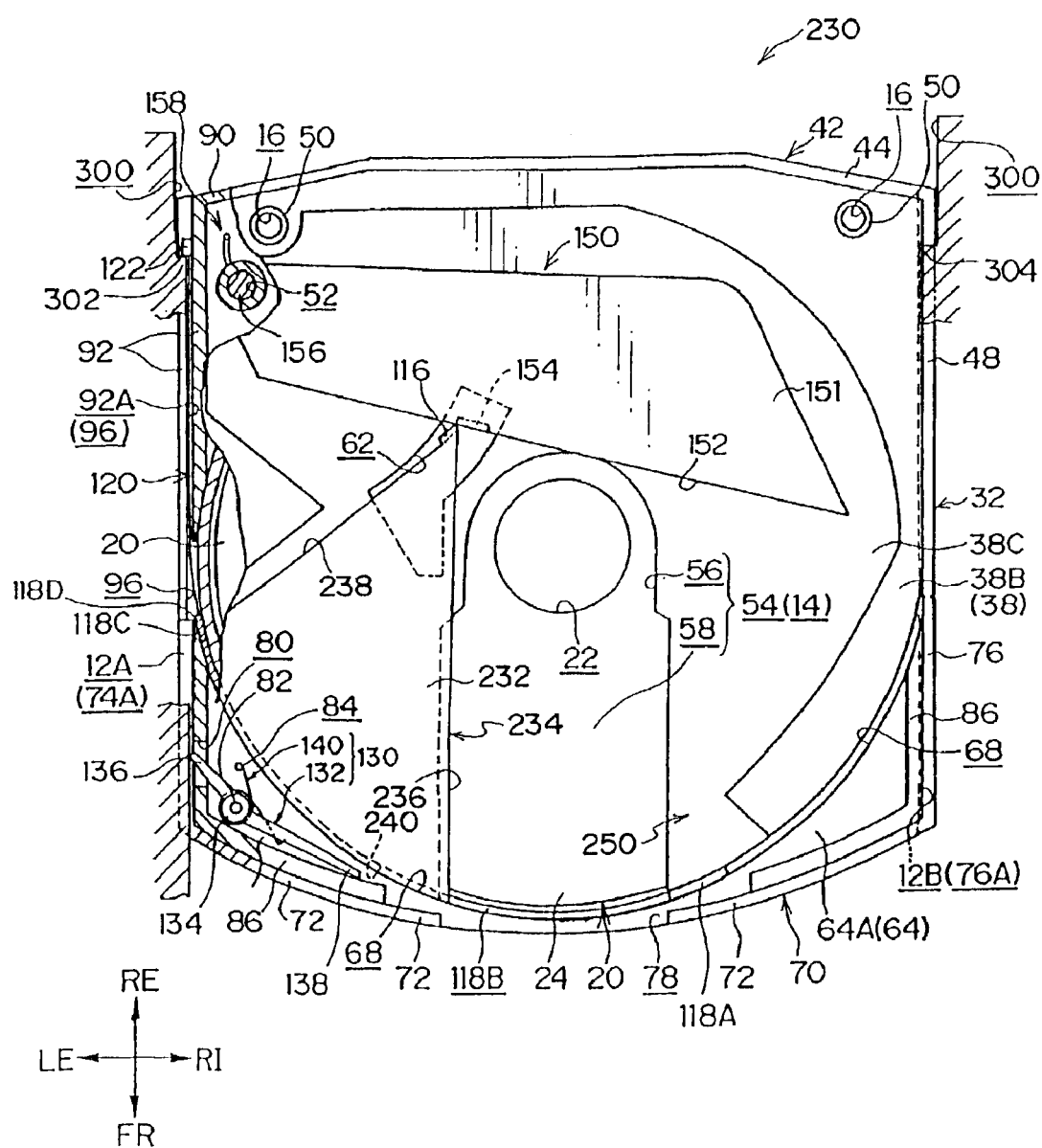
FIG. 34 is a view which shows the aperture opened state of the disc cartridge according to the fifth embodiment of the present invention, which corresponds to FIG. 32.
Figure 35:
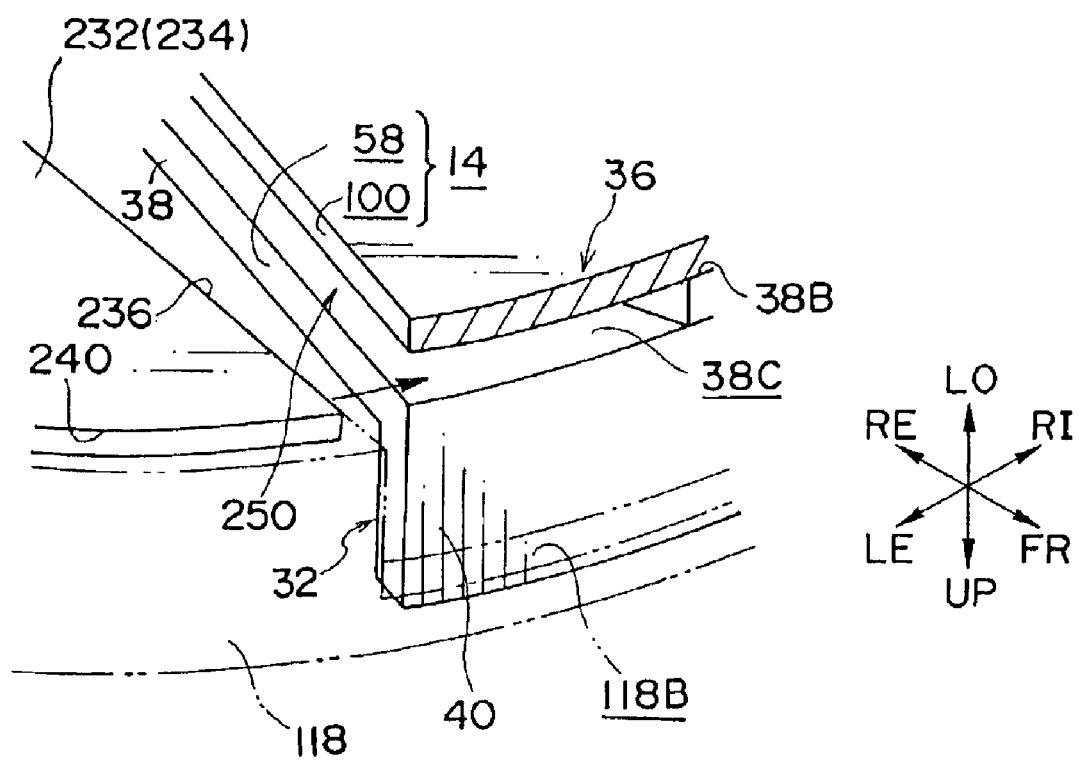
FIG. 35 is a perspective view showing the end portion of the first shutter member and the reception portion constituting the disc cartridge according to the fifth embodiment of the present invention.

Accordingly, a part of the shutter main body 232 which is sandwiched between the oblique-line portion 236 and the arcuate portion 240 is accommodated in (enters) the reception portion 250 between the case 30 (the recess portion 38C of the base plate portion 32) and the lower plate portion 36 when the aperture 14 is closed. That is, the oblique-line portion 236 corresponding to the close-side end portion of the shutter main body 232 has no corner portion. As shown in FIGS. 33 to 35, (the apex portion of) the corner portion sandwiched between the oblique-line portion 236 and the arcuate portion 240 passes the outside of the cylindrical wall 40, that is, the outside of the reception portion 250.

Further, the window portion 118B of the arcuate guide wall portion 118 is provided to the rightwardly-extending extension portion 118A with the cross point between the oblique-line portion 236 and the arcuate portion 240 as a starting point. In the first shutter member 234, the shutter drawing portion 120 may be fixedly (integrally) provided to the arcuate guide wall portion 118, or it may be provided along the inner surface of the arcuate guide wall portion 118.

Next, the operation of the disc cartridge 230 according to the fifth embodiment of the present invention, particularly the different portion from that of the first and fourth embodiments will be mainly described.

According to the disc cartridge 230 of this embodiment, when the disc medium 20 is used, the shutter fitting portion 122 is pressed by a guide projecting portion 302 of the drive device, so that the first shutter member 234 is rotated in the opening direction of the aperture 14 to open the aperture 14 (see FIGS. 33, 34). Under this state, the oblique-line portion 236 is located along the left edge portion of the aperture 14 (the recording/reproducing head window portion 58), and the window portion 118B is located to face the window portion 78 of the aperture 14.

On the other hand, when the aperture 14 is closed while the disc cartridge 230 is unloaded from the drive device, the first shutter member 234 is rotated in the opposite direction to the opening direction of the aperture 14. At this time, as shown in FIG. 35, the shutter main body 232 is rotated with the cross point between the oblique-line portion 236 and the arcuate portion 240 (the abutting position between the arcuate guide wall portion 118 and the oblique-line portion 236 which is located at the most phase-advanced position in the closing direction of the aperture 14 with respect to the axial center of the cylindrical wall 40 which is the rotational center) at the head of the rotation, and the shutter main body 232 is returned to the initial position while a part of the oblique-line portion 236 at the arcuate portion 240 side is accommodated in the reception portion 250. That is, the aperture 14 (recording/reproducing head window portion 58) is closed.

Here, when the aperture 14 is closed, the oblique-line portion 236 which is the close-side end portion of the shutter main body 232 to be accommodated in the reception portion 250 is accommodated in the reception portion 250 with the cross point thereof to the arcuate portion 240 at the head (in entry), in other words, the oblique-line portion 236 is accommodated in the reception portion 250 while a portion of the oblique-line portion 236 which is prevented from being warped by the arcuate guide wall portion 118(the arcuate guide wall portion 118 functions as a rib to prevent the warping of the portion of the oblique-line portion 236) is located at the head (in entry), so that even when a warp occurs in the oblique-line portion 236, it is smoothly accommodated in (smoothly enters) the reception portion 250 while correcting the warping and the aperture 14 can be surely closed.

Since the oblique-line portion 236 of the shutter main body 232 which corresponds to the close-side end portion accommodated in the reception portion 250 is constructed linearly, in other words, the portion of the shutter main body 232 which enters the reception portion 250 has no corner portion (the portion at which a warp may occur), the interference between the shutter main body 232 and the reception portion 250 due to the closing operation of the aperture 14 (recording/reproducing head window portion 58) can be prevented. That is, the interference between the oblique-line portion 236 and the base plate portion 32 (case 30) or the edge portion of the aperture 14 of the lower plate portion 36 can be surely prevented. Particularly, in this construction, even a portion of the oblique-line portion 236 which is accommodated in the reception portion 250 has no corner portion, so that this construction is further suitable.

As described above, according to the disc cartridge 230 of the fifth embodiment of the present invention, the first shutter member 234 can be smoothly operated without any interference between the end portion (oblique-line portion 236) of the first shutter member 234 and the edge portion of the aperture 14, and the aperture 14 for access to the disc medium 20 can be surely closed.

Further, since the window portion 118B of the arcuate guide wall portion 118 is provided with the cross point between the oblique-line portion 236 and the arcuate portion 240 as the starting point, the positioning of the window portion 118B with respect to the shutter main body 232 can be easily performed, and the installation of the shutter main body 232 and the arcuate guide wall portion 118 and the design and manufacturing process for a metal mold for integrally forming the shutter main body 232 and the arcuate guide wall portion 118 can be easily performed.

In the fifth embodiment, it is preferable that the oblique-line portion 236 is designed to be linear over the overall length thereof. However, the present invention is not limited to this construction, and it may have a corner portion (for example, a corner portion having a projecting or recessed shape whose apex portion corresponds to the cross point between the oblique-line portion 236 and the edge portion of the aperture 14) insofar as the oblique-line portion 236 is accommodated in the reception portion 250 under the state that (a portion in the neighborhood of) the cross point between the oblique-line portion 236 and the arcuate portion 240 when the aperture 14 is closed is located at the head (in entry).

Further, in the fifth embodiment, it is preferable that the shutter main body 232 is formed substantially in a wedge shape. However, the present invention is not limited to this structure, and the left-side portion 238 located between the case 30 and the lower plate portion 36 at all times may be formed in any shape, for example. Further, a through hole or a cut-out portion such as a notch portion or the like may be provided to the left-side portion 238 or the portion which enters the reception portion 250.

Still further, in the fifth embodiment, it is preferable that the window portion 118B is formed in the arcuate guide wall portion 118 with the cross point between the oblique-line portion 236 and the arcuate portion 240 as the starting point. However, the present invention is not limited to this structure, and for example, the arcuate guide wall portion 118 may have no window portion 118B or any position may be used as the starting point of the window portion 118B.

(Sixth Embodiment)

Next, a disc cartridge 260 according to a sixth embodiment will be described. The basically same parts and portions as the first embodiment are represented by the same reference numerals as the first embodiment, and the description thereof is omitted.

Figure 36:
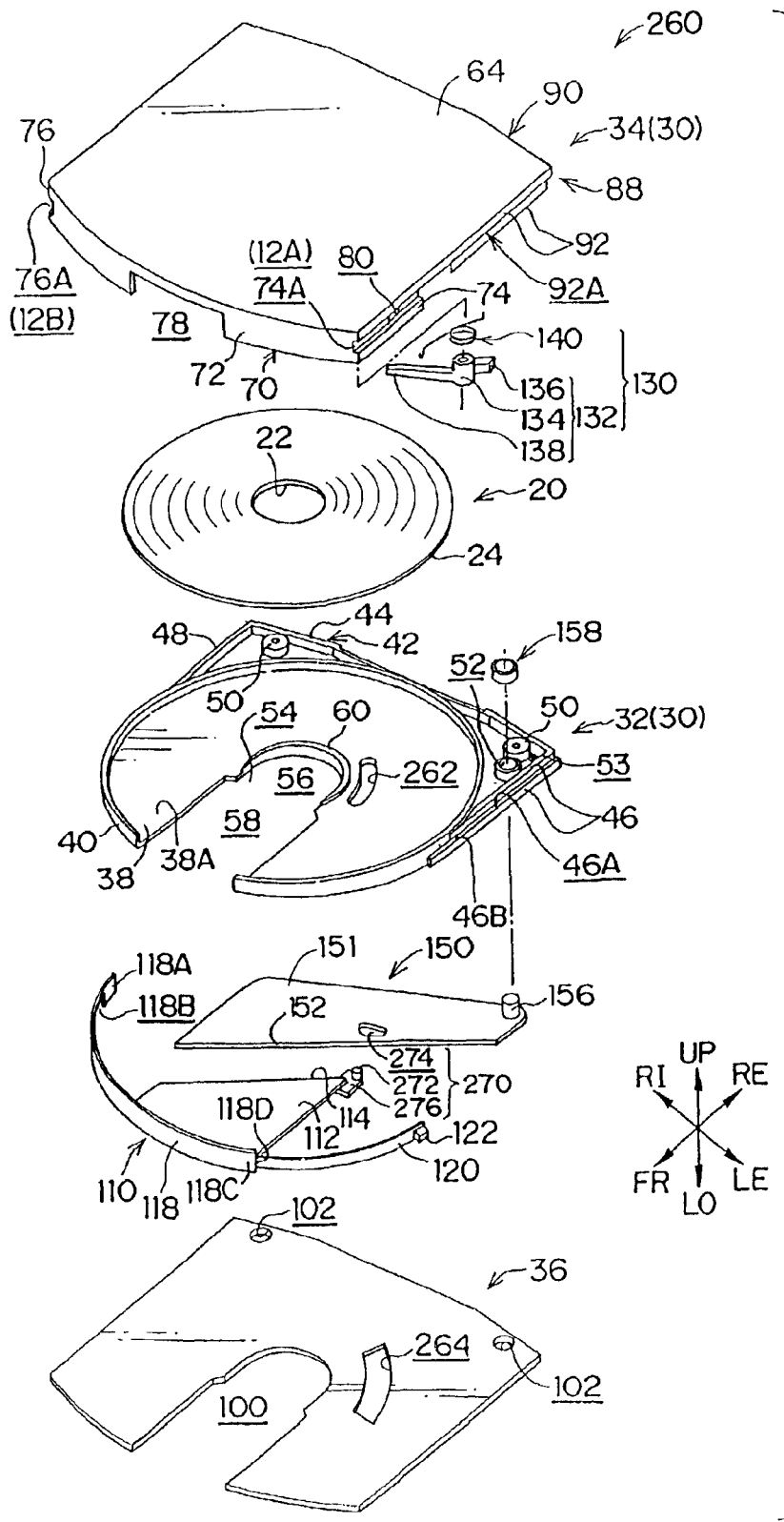
FIG. 36 is an exploded perspective view showing a disc cartridge according to a sixth embodiment of the present invention, which is viewed from the upper side of the disc cartridge.
Figure 37:
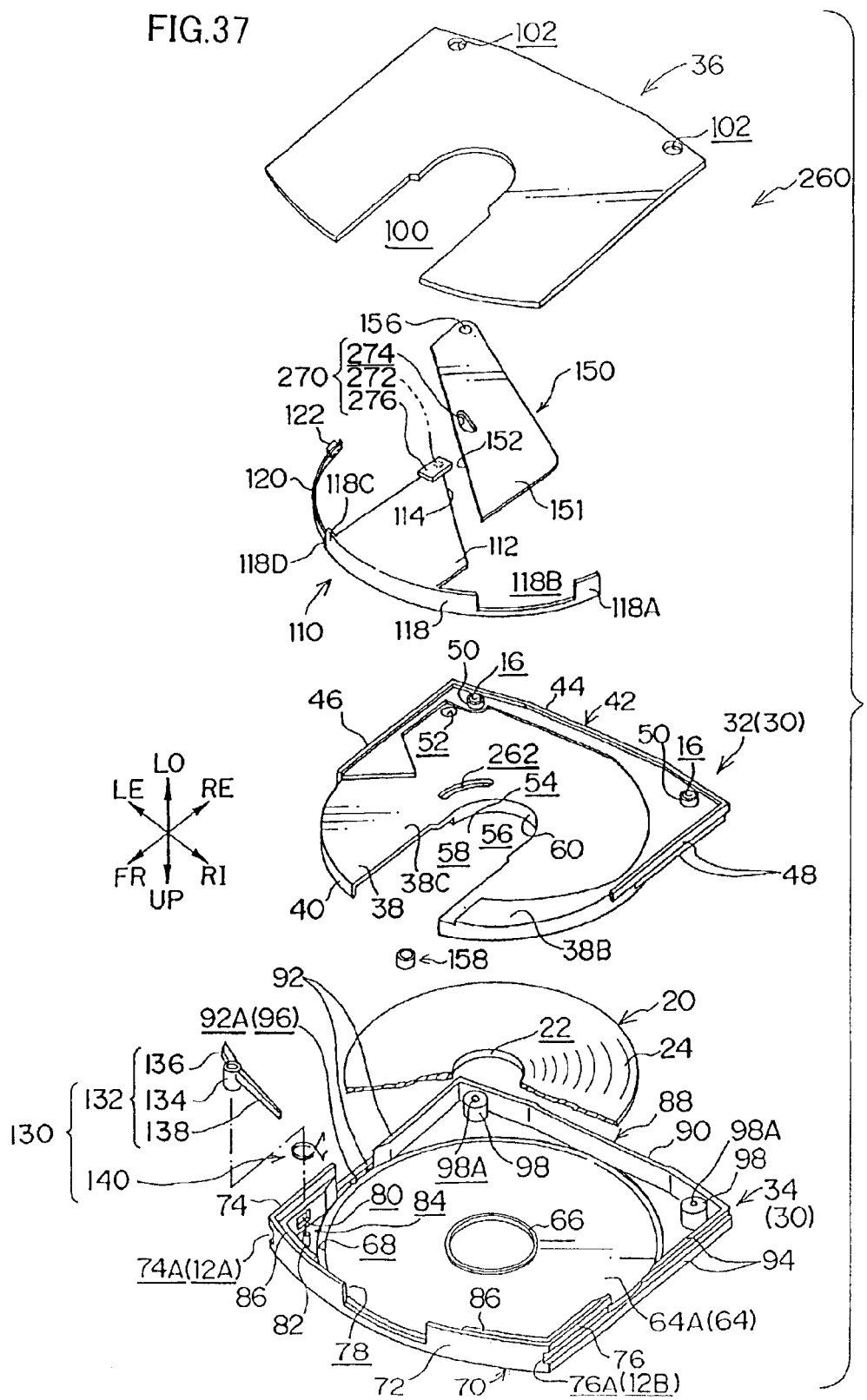
FIG. 37 is an exploded view showing the disc cartridge according to the sixth embodiment of the present invention, which is viewed from the lower side of the disc cartridge.
Figure 40:
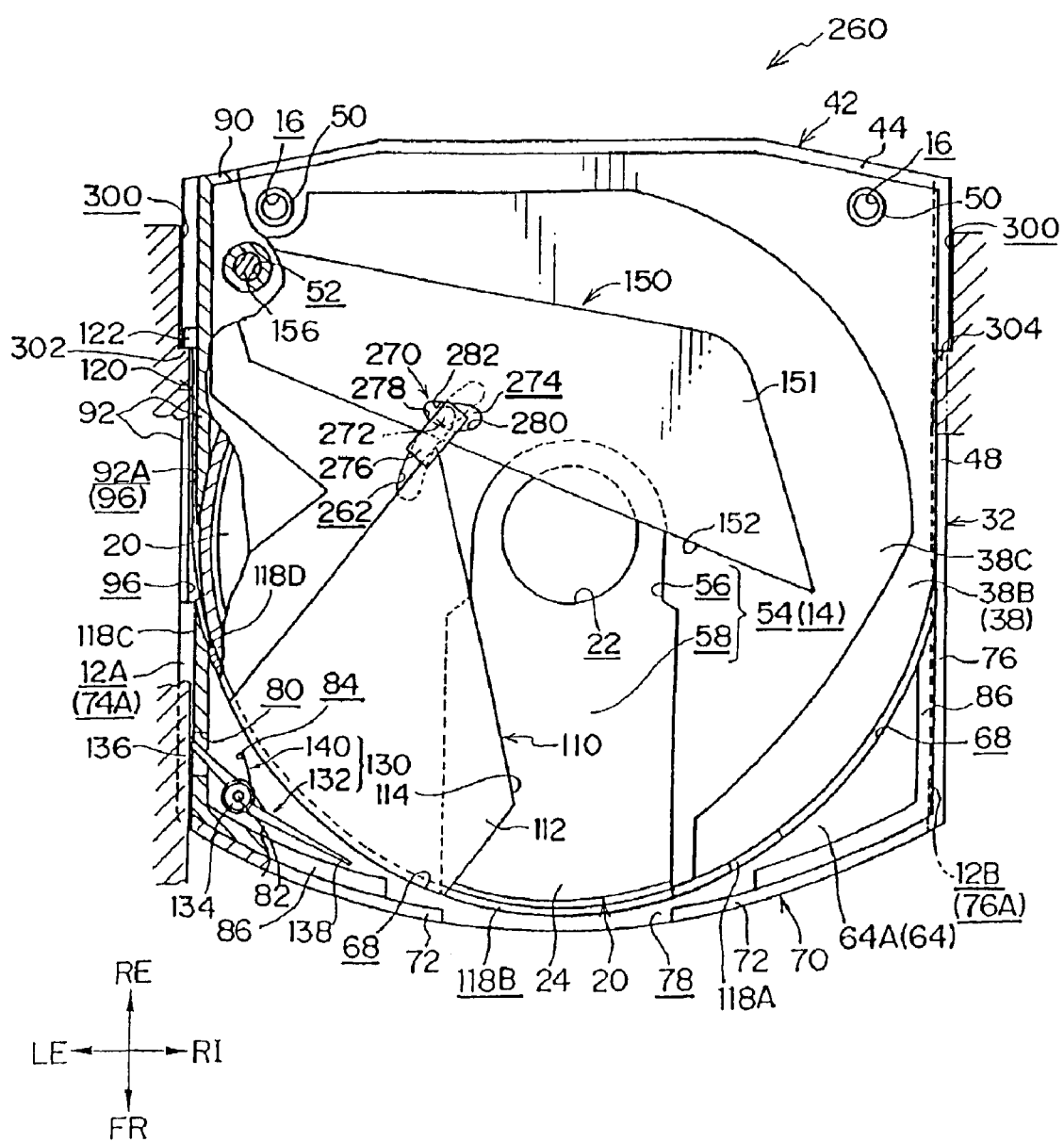
FIG. 40 is a view which shows the aperture opening process of the disc cartridge according to the sixth embodiment of the present invention, which corresponds to FIG. 38.

As shown in FIGS. 36 and 37, the disc cartridge 260 is different from the disc cartridge 10 of the first embodiment in that the disc cartridge 260 has interlocking means 270 described later in place of the press piece 116 of the first shutter member 110 and the press-subjected piece 154 of the second shutter member 150.

Further, the disc cartridge 260 is different from the disc cartridge 10 in that it is not equipped with the torsion spring 158 for urging the second shutter-member 150 in the closing direction of the aperture 14, the spring holding portion 53 for fixing the torsion spring 158 to the case 30 and the slit groove 156A of the rotational shaft 156 for fixing the torsion spring 158 to the second shutter member 150.

In place of the shutter guide hole 62 which is coaxial with the shutter shaft hole 52 and formed in a substantially arcuate shape, the disc cartridge 260 has a shutter guide hole 262 which is coaxial with the cylindrical wall 40 and formed in a substantially arcuate shape, and a fitting projecting portion 272 constituting the interlocking means 270 (the first shutter member 110) described later is inserted into the shutter guide hole 262.

Further, an arcuate groove 264 is formed in the lower plate portion 36 so as to confront the shutter guide hole 262 under the state that the upper surface of the lower plate portion 36 is kept engagedly fitted to the case 30. The arcuate groove 264 is formed in an broader arcuate shape which is coaxial with the shutter guide hole 262, and a joint plate 276 of the interlocking means 270 (first shutter member 110) is inserted (slidable) in the arcuate groove 264.

In the sixth embodiment, the shutter drawing portion 120 of the first shutter member 110 may be fixedly (integrally) provided to the arcuate guide wall portion 118 or it may be provided along the inner surface of the arcuate guide wall portion 118.

Next, the detailed construction of the of the interlocking means 270 will be described.

The shutter mechanism is equipped with the interlocking means 270 for interlocking the first shutter member 110 and the second shutter member 150 with each other. The interlocking means 270 has a fitting projecting portion 272 serving as a projecting portion provided to the shutter main body 112 of the first shutter member 110, and an elongated hole 274 formed in a shutter face plate 151 of the second shutter member.

The fitting projecting portion 272 is formed in a substantially columnar shape, and it is joined to the shutter main body 112 through a joint plate 276 secured to the lower surface of the rear-left corner portion of the shutter main body 112 (first shutter member 110). Under this state, the fitting projecting portion 272 projects upwardly so as to extent to the upside of the upper surface of the shutter main body 112, and also is located at the rear side of the abutting portion 114.

The elongated hole 274 is formed to be larger in size than the outer diameter of the fitting projecting portion 272, and located at the position corresponding to the fitting projecting portion 272 of the shutter face plate 151 (second shutter member 150).

As shown in detail in FIGS. 38 to 42, the elongated hole 274 is formed in a substantially triangular shape by connecting a closing linear wall portion 278, a bent wall portion 280 and an opening linear wall portion 282 to one another through a round (arcuate) wall which is slightly larger than the outer diameter of the fitting projecting portion 272. The closing linear wall portion 278 serves as a linear portion of the elongated hole 274 whose longitudinal direction is along (parallel to) the abutting portion 152, the bent wall portion 280 serves as a bend portion of the elongated hole 274 which is bent (inclined) in such a direction that one end portion of the closing linear wall portion which is farther from the rotational shaft 156 is separated from the abutting portion 152, and the opening linear wall portion 282 is inclined with respect to the closing linear wall portion (that is, the abutting portion 152) by an inclination degree smaller than that of the bent wall portion 280 with respect to the closing linear wall portion 278.

The interlocking means 270 is designed so that the fitting projecting portion 272 is inserted (loosely fit) in the elongated hole 274 with clearance and movable in the longitudinal direction of the elongated hole 274 under the state that the shutter main body 112 and the shutter face plate 151 are disposed between the recess portion 38C of the base plate portion 32 and the lower plate portion 36. Under this state, the tip portion of the fitting projecting portion 272 is inserted into the shutter guide hole 262, and the joint plate 276 is inserted into the arcuate groove 264 of the lower plate portion 36 to be slidable along the shutter face plate 151 and the lower plate portion 36 (the bottom portion of the arcuate groove 264).

Under the closing state of the aperture 14 (the abutting state of the abutting portions 114, 152), the interlocking means 270 is located at such a position that the fitting projecting portion 272 is brought into contact with the bent wall portion 280 of the elongated hole 274.

When the arcuate guide wall portion 118 is guided along the cylindrical wall 40 and the first shutter member 110 (shutter main body 112) is rotated in the opening direction of the aperture 14 around the axial center of the cylindrical wall 40, the fitting projecting portion 272 is moved to the rotational shaft 156 side along (in the longitudinal direction of) the opening linear wall portion 282 while pressing the opening linear wall portion 282 of the elongated hole 274 in the rotational direction of the shutter member 110. When the first shutter member 110 is rotated in the closing direction of the aperture 14, the fitting projecting portion 272 is moved to the bent wall portion 280 side along (in the longitudinal direction of) the closing linear wall portion 278 while pressing the closing linear wall portion 278 in the rotational direction of the first shutter member 110.

Accordingly, the interlocking means 270 rotates the second shutter member 150 (shutter face plate 151) around the rotational shaft 156 interlockingly with the rotation of the first shutter member 110 while absorbing the difference between the rotational locus of the shutter main body 112 (that is, the fitting projecting portion 272) and the rotational locus of the shutter face plate 151.

Further, the opening linear wall portion 282 is inclined with respect to the abutting portion 152 (the opening linear wall portion 282 is inclined in such a direction that the interval between the opening linear wall portion 282 and the abutting portion 152 is shorter as they approaches to the rotational shaft 156). Therefore, when the aperture 14 is opened, the fitting projecting portion 272 can press the opening linear wall portion 282 before the end portion of the abutting portion 114 of the shutter main body 112 presses the abutting portion 152 (except for the time just after the rotation of the first shutter member 110 is started). Accordingly, when the aperture 14 is opened, the interlocking means 270 interlocks the first shutter 110 and the second shutter member 150 with each other while a gap (clearance, backlash) is kept between the end portion of the abutting portion 114 (a portion in the neighborhood of the setup position of the joint plate 276) and the abutting portion 152.

Since the closing linear wall portion 278 is parallel to the abutting portion 152, the first shutter member 110 and the second shutter member 150 are interlocked with each other with keeping the gap when the aperture 14 is closed.

When the aperture 14 is closed, the bending degree of the bent wall portion 280 is set so that the gap is eliminated when the aperture 14 is closed and both the first shutter member 110 and the second shutter member 150 are allowed to abut against each other through the abutting portions 114, 152 with no gap when the fitting projecting portion 272 returns to the initial position which abuts against the bent wall portion 280.

The shutter guide hole 262 of the base plate portion 32 and the arcuate groove 264 of the lower plate portion 36 are provided in conformity with the rotational loci (around the axial center of the cylindrical wall 40 of the joint plate 276) of the fitting projecting portion 272 and the joint plate 276 which are fitted in the shutter guide hole 262 of the base plate portion 32 and the arcuate groove 264 of the lower plate portion 36, respectively. The front end portion of the shutter guide hole 262 is fitted in the fitting projecting portion 272 under the closing state of the aperture 14.

Next, the operation of the disc cartridge 260 according to the sixth embodiment of the present invention, particularly the different portion from the first embodiment will be mainly described.

In the disc cartridge 260 thus constructed, when the disc medium 20 is unused, the aperture 14 is closed by the first shutter member 110 and the second shutter member 150. At this time, the rotation of the first shutter member 110 in the opening direction of the aperture 14 is regulated by the lock means 130 to keep the closing state.

The second shutter member 150 is interlockingly joined to the first shutter member 110 through the interlocking means 270, and thus it is impossible for the second shutter member 150 to rotate under the lock state of the first shutter member 110 (the rotation-regulated state as described above), so that the closing state is kept.

When he disc medium 20 is used, the disc cartridge 260 is loaded into the insertion port 300 of the drive device, and the lock state of the first shutter member 110 by the lock means 130 is released as shown in FIG. 39, whereby the first shutter member 110 and the second shutter member 150 are allowed to be rotated in the opening direction of the aperture 14.

When the guide projecting portion 302 of the drive device is further relatively rearwardly moved in the first guide groove 12A and the shutter fitting portion 122 is pressed rearwardly, the first shutter member 110 for which the lock state is released is rotated in the opening direction of the aperture 14.

Through the rotation of the first shutter member 110, the interlocking means 270 makes the second shutter member rotate around the rotational shaft 156. Specifically, the fitting projecting portion 272 joined to the shutter main body 112 is rotated around the axial center of the cylindrical wall 40 along the shutter guide hole 262, and moved toward the rotational shaft 156 along the opening linear wall portion 282 (substantially in the longitudinal direction of the elongated hole 274) while pressing in the rotational direction the opening linear wall portion 282 of the elongated hole 274 of the second shutter member 150 in which the fitting projecting portion 272 is loosely fit, whereby the second shutter member 150 (shutter face plate 151) is rotated around the rotational shaft 156 in such a direction as to be separated from the first shutter member 110.

Figure 41:
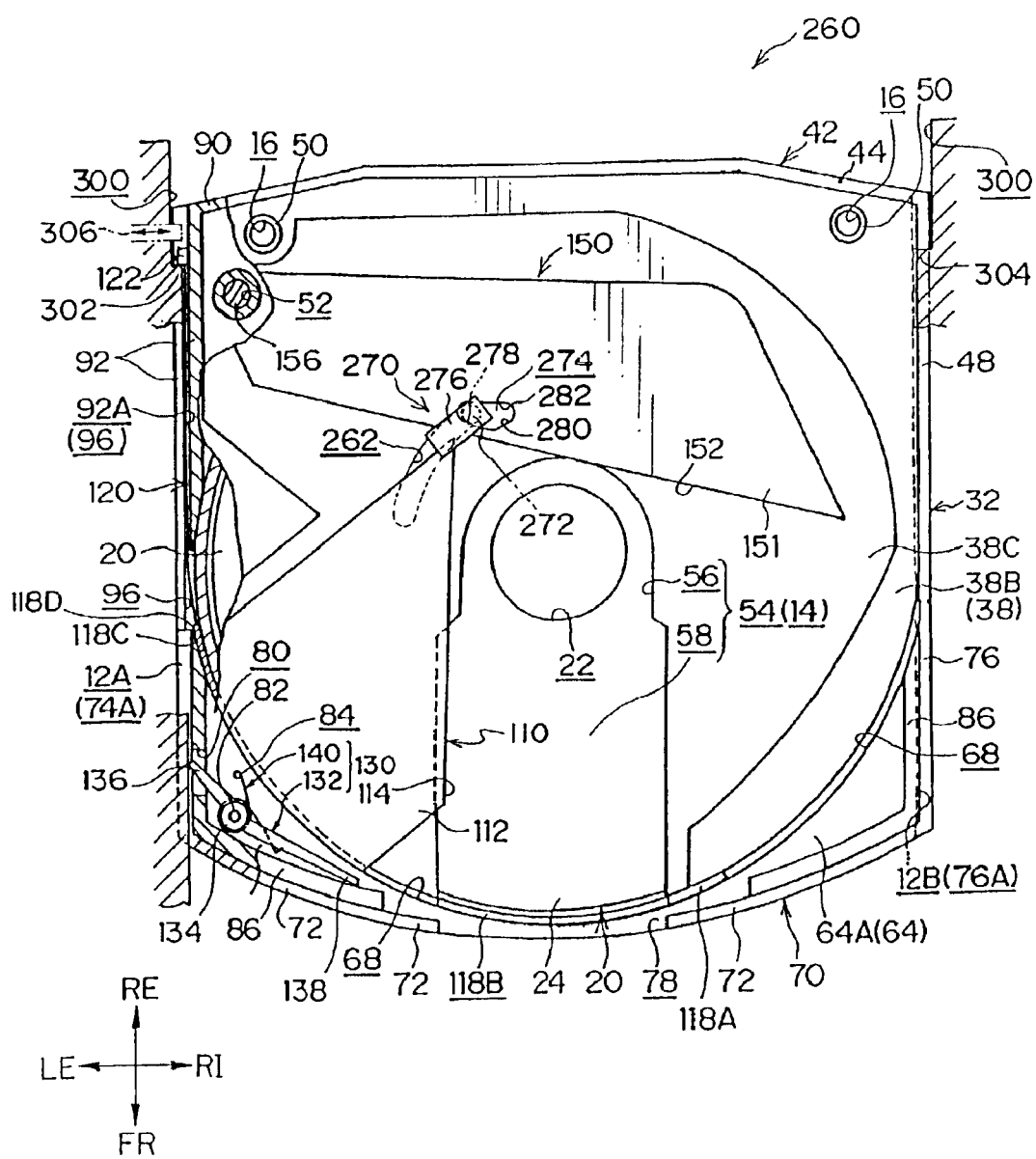
FIG. 41 is a view which shows the aperture opening process of the disc cartridge according to the sixth embodiment of the present invention, which corresponds to FIG. 38.

When the guide projecting portion 302 of the drive device which is fitted to the shutter fitting portion 122 is further rearwardly relatively moved in the first guide groove 12A, the first shutter member 110 and the second shutter member 150 are further rotated as shown in FIG. 41, and the recording/reproducing head window portion 58 and the hub hole 56, that is, the aperture 14 is opened. At this time, in the locking means 270, the fitting projecting portion 272 is located in the neighborhood of the end portion of the elongated hole 274 which is nearer to the rotational shaft 156.

When the disc cartridge 260 is unloaded from the drive device, the positioning mechanism is drawn out from the position regulating hole 16 to allow the disc cartridge 260 to move in the unloading direction (toward the insertion port 300).

As shown by an imaginary line in FIG. 41, a closing projecting portion 306 of the drive device enters the rear side of the shutter fitting portion 122 of the first guide groove 12A (toward the insertion port 300). The entrance of the closing projecting portion 306 into the first guide groove 12A may be performed in advance after the disc cartridge 260 is positioned as described above.

Under this state, the disc cartridge 260 is moved by the drive device with the rear end portion 10B thereof at the head (in entry). Through this movement, the rearward press force by the guide projecting portion 302 does not act on the shutter fitting portion 122, so that the first shutter member 110 is allowed to be rotated and also forward press force acts on the shutter fitting portion 122 through the fitting of the closing projecting portion 306 to the shutter fitting portion 122.

Accordingly, the disc cartridge 260 closes the aperture 14 while moving in the loading direction as described above. That is, the press force acting on the shutter fitting portion 122 of the first shutter member 110 is converted to the rotational force in the peripheral direction of the arcuate guide wall portion 118 by the shutter drawing portion 120, so that the first shutter member 110 is rotated around the axial center of the cylindrical wall 40 in the closing direction of the aperture 14.

The closing linear wall portion 278 of the elongated hole 274 is pressed by the fitting projecting portion 272, so that the second shutter member 150 joined to the first shutter member 110 through the interlocking means 270 is rotated around the rotational shaft 150 in the closing direction of the aperture 14. Through further rotation of the first shutter member 110, the fitting projecting portion 272 presses the closing linear wall portion 278 and the bent wall portion 280 while moving from the closing linear wall portion 278 to the bent wall portion 280, thereby further rotating the second shutter member 150.

When the first shutter member 110 and the second shutter member 150 are rotated and returned to the initial positions thereof, the aperture 14 is closed. The fitting projecting portion 272 of the first shutter member 110 returned to the initial position is fitted to the inner edge of the front portion of the shutter guide hole 262 to prevent further rotation of the first shutter member 110 and the second shutter member 150 interlocked with the first shutter member 110. The further rotation of each of the first shutter member 110 and the second shutter member 150 over the initial position may be prevented by fitting the tip portion of the extension portion 118A of the arcuate guide wall portion 118 of the first shutter member 110 to the end portion of the broader portion of the annular groove 68 at the initial position.

Under this state, the closing projecting portion 306 of the drive device exits from the first guide groove 12A of the disc cartridge 260, thereby preventing the interference between the closing projecting portion 306 and the lock release lever 136.

When the disc cartridge 260 is further moved in the unloading direction and the guide projecting portion 302 is moved to the front side of the lock release lever hole 80 of the first guide groove 12A, the lock lever 132 is rotated by the urging force of the torsion spring 140, and the lock release lever 136 projects into the first guide groove 12A. In addition, the lock pawl 138 is engaged with the lock engaging portion 118D of the first shutter member 110. Accordingly, the disc cartridge 260 is returned to the state before the loading thereof into the drive device, and the first shutter member 110 and the second shutter member 150 interlocked with the first shutter member 110 are prevented to keep the closing state of the aperture 14.

Here, the elongated hole 274 of the interlocking means 270 has the bent wall portion 280 achieved by bending the end portion of the closing linear wall portion 278 farther from the rotational shaft 156 in such a direction that the end portion concerned is separated from the abutting portion 152. Therefore, the fitting projecting portion 272 which is moved along the closing linear wall portion 278 so as to be separated from the rotational shaft 156 through the closing operation of the aperture 14 presses the bent wall portion 280 substantially forwardly just before the aperture 14 is closed, whereby the second shutter member 150 (shutter face plate 151) is greatly moved in the closing direction of the aperture 14 (attracted toward the first shutter member 110).

Figure 42A:
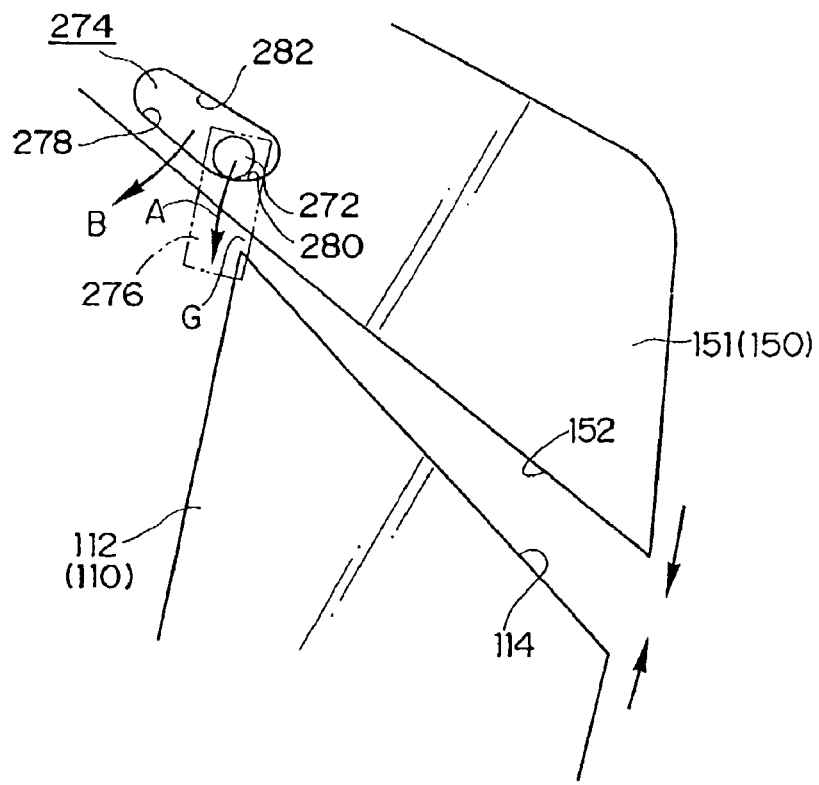

That is, as shown in FIG. 42A, just before the aperture 14 is closed, the fitting projecting portion 272 which is rotated in the direction of the arrow A around the axial center of the cylindrical wall 40 is moved from the closing linear wall portion 278 to the bent wall portion 280 due to the difference in rotational locus between the fitting projecting portion 272 and the shutter face plate 151 (elongated hole 274) while rotating the shutter face plate 151 in the direction of the arrow B around the rotational shaft 156.

When the fitting projecting portion 272 is moved to the bent wall portion 280 while being rotated in the direction of the arrow A, the bent wall portion 280 which is bent so as to be separated from the abutting portion 152 is pressed by the fitting projecting portion 272, and the shutter main body 112 and the shutter face plate 151 are rotated in the respective closing directions of the aperture 14 (the direction of the arrow A, the direction of the arrow B) while eliminating the gap (clearance, backlash) between the abutting portions 114, 152.

Figure 42B:
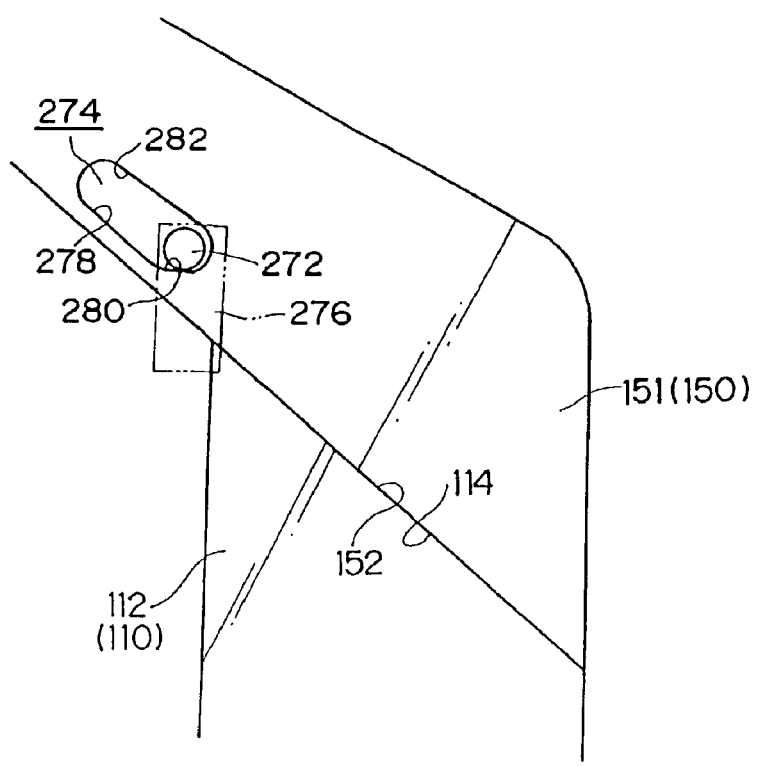
Figure 43:
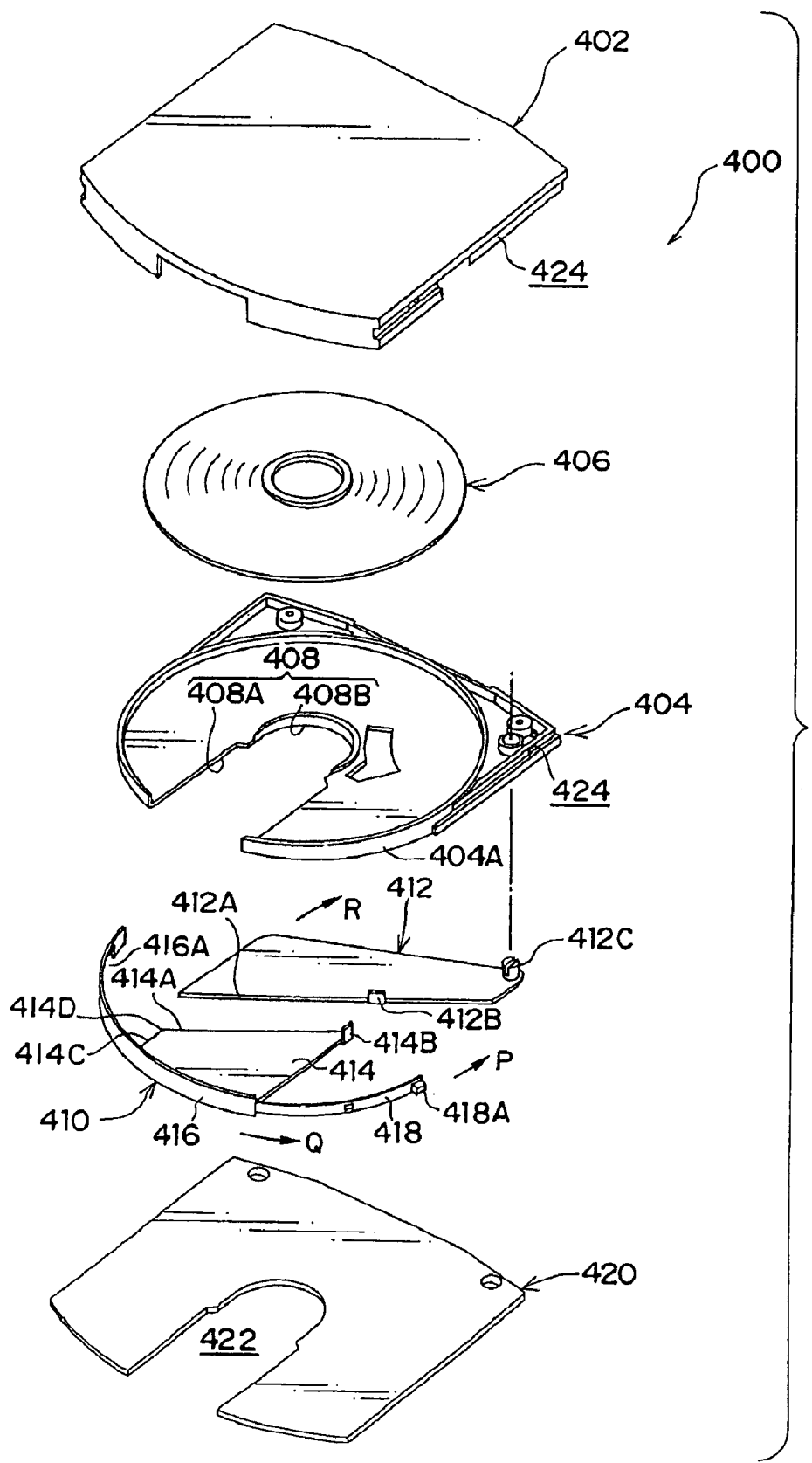
FIG. 43 is an exploded perspective view showing a conventional disc cartridge.

Therefore, the elongated hole 274 in which the fitting projecting portion 272 is loosely fitted smoothly interlocks the first shutter member 110 and the second shutter member 150 with each other with clearance (margin) to open/close the aperture 14, and it attracts the second shutter member 150 toward the first shutter member 110 (relatively greatly moves the second shutter member 150 to eliminate the gap) just before the aperture 14 is closed, whereby the abutting portion 114 of the first shutter member 110 and the abutting portion 152 of the second shutter member 150 are brought into contact with each other with no gap. Accordingly, the aperture 14 can be surely closed as shown in FIG. 42B.

The bending degree of the bent wall portion 280 is set so that the abutting portions 114, 152 of the first and second shutter members 110 and 150 abut against each other with no gap when the aperture 14 is closed. Therefore, the rotation of the second shutter member 150 over the closing position of the aperture 14 can be surely prevented, and thus the second shutter member 150 does not obstruct the returning of the first shutter member 110 to the initial position.

As described above, according to the disc cartridge 260 of this embodiment, the first shutter member 110 and the second shutter member 150 can be smoothly interlocked with each other by proper driving force, and the aperture for access to the disc medium can be surely closed.

Further, since the first shutter member 110 and the second shutter member 150 are interlocked with each other by the interlocking means 270, the closing state of the aperture 14 when the disc medium is unused can be surely kept by only the lock means 130 having the lock pawl 138 which is engaged with the lock engaging portion 118D of the first shutter member.

Still further, since the second shutter member 150 interlocks with the first shutter member 110, it is unnecessary to provide a mechanism for driving the second shutter member 150 (for example, a torsion spring for urging in the closing direction of the aperture 14 or the like), and the disc cartridge 260 can be designed in compact size.

In the sixth embodiment described above, the first shutter member 110 is driven by the drive device, and the second shutter member 150 is interlocked with (driven by) the first shutter member 110. However, the present invention is not limited to this construction, and for example, the second shutter member 150 may be driven by the drive device while the first shutter member 110 is driven by the second shutter member, or the shutter member to be driven may be different between the opening operation of the aperture 14 and the closing operation of the aperture 14. In the construction that the second shutter member 150 is driven when the aperture 14 is closed, the bending direction of the bent wall portion 280 of the elongated hole 274 is opposite to that described above (it is bent toward the abutting portion 152).

Further, in the sixth embodiment of the present invention, the shutter fitting portion 122 is forwardly pressed by the drive device (closing projecting portion 306) to close the aperture 14. However, the present invention is not limited to this construction, and the aperture 14 may be closed by the urging force of a coil spring or power spring provided between the arcuate guide wall portion 118 of the first shutter member 10 and the case 30.

In the sixth embodiment described above, the interlocking means 270 comprises the fitting projecting portion 272 provided to the first shutter member 110 and the elongated hole 274 formed in the second shutter member 150. However, the present invention is not limited to this construction. For example, the elongated hole 274 maybe formed in the first shutter member 110 while the fitting projecting portion 272 is provided to the second shutter member 150, thereby constructing the interlocking means 270. Further, the elongated hole 274 is not limited to a through hole, but it may be a cavity having a bottom.

Further, in the sixth embodiment of the present invention, the joint plate 276 for joining the first shutter member 110 and the fitting projecting portion 272 is fixed to the lower surface of the shutter main body 112. However, the present invention is not limited to this construction. For example, the joint plate 276 may be fixed to the upper surface of the shutter main body 112 while the fitting projecting portion 272 is formed downwardly projectingly so as to be fitted in the elongated hole 274. In this construction, the shutter guide hole 262 is designed to be broader in conformity with the arcuate groove 264, and the arcuate groove 264 of the lower plat portion 36 is not needed.

In the sixth embodiment, there is provided the substantially triangular elongated hole 274 having the opening linear wall portion 282 and the closing linear wall portion 278 which are mutually inclined, the opening linear wall portion 282 being pressed by the fitting projecting portion 272 when the aperture is opened while the closing linear wall portion 278 is pressed by the fitting projecting portion 272 when the aperture is closed. However, the present invention is not limited to this construction. For example, the elongated hole 274 may be designed substantially in V-shape by a linear portion comprising an opening linear wall portion 282 and a closing linear wall portion 278 arranged in parallel to each other and a bent portion which is inclined with respect to the linear portion, or it may be designed substantially in a trapezoidal shape by bending the end portion of the opening linear wall portion 278 parallel to the opening linear wall portion 282 to provide a bent wall portion 280. These constructions are suitably applied to such a construction that the first shutter member 110 and the second shutter member 150 close the aperture 14 by overlapping the end faces thereof with each other.

The disc cartridges 10, 180, 190, 200, 230, 260 are shown in the above-described embodiments. However, the present invention is not limited to these disc cartridges. For example, a part or all the parts of each characteristic constituent element of each disc cartridge may be suitably combined with a part of all the parts of the other disc cartridges. The best mode of the present invention resides in that the shutter drawing portion 120 of the first shutter member 110 is joined to the arcuate guide wall portion 118 so as to be swingable in the width direction, the arcuate guide wall portion 118 has at least the groove portions 184, the minute projections 186 and/or the uneven portion 194, or the cylindrical wall 40 has the groove portions 188, the first shutter member 110 having the shutter main body 112 is accommodated in the reception portion 202 or the shutter main body 112 has the oblique faces 214, 216 or the first shutter member 110 (234) has the shutter main body 232 and the first shutter member 110 and the second shutter member 150 are interlocked with each other by the inter locking means 270.

In each of the above-described embodiments, a part of the right rear portion of the recording/reproducing head window portion 58 is opened/closed by the second shutter member 150 to miniaturize the overall construction of the shutter mechanism (reduce the rotation range). However, the present invention is not limited to the above construction, and the first shutter member 110, 182, 192, 234 may be designed so as to open/close the overall recording/reproducing head window portion 58.

Further, in each of the above-described embodiments, the disc medium 20 is designed as one-side recording type, and the aperture 14 is provided to face downwardly (containing forwardly). However, the present invention is not limited to this construction. For example, the disc medium 20 may be designed as double-side recording type. In this case, an upper aperture 14 is also provided to face upwardly, and shutter members for opening/closing the upper and lower apertures respectively are disposed. Further, the aperture 14 is not limited to the construction that the hub hole 56 and the recording/reproducing head window portion 58 are formed continuously with each other, and the hub hole 56 and the recording/reproducing head window portion 58 may be formed separately from each other.

As described above, the disc cartridge according to the present invention has an excellent effect that the shutter member can operate smoothly.

What is claimed is:

1. A disc cartridge, characterized by including:
   an aperture to access a disc-shaped medium, the aperture being formed in a case in which a disc-shaped disc medium is rotatably housed inside a cylindrical wall having a substantially cylindrical shape;
   a plate-shaped shutter main body which is rotated to open/close at least a part of the aperture;
   a shutter guide portion which is curved along the cylindrical wall and erectly provided to the shutter main body; and
   an operating member having one end portion joined to the shutter guide portion and the other end portion located at the outside of the case, the other end of the operating member being drawn from the external to rotate the shutter guide portion along the cylindrical wall when at least a part of the aperture is opened,
   wherein the operating member is joined so as to be slidable in the width direction of the shutter guide portion.

2. The disc cartridge as claimed in claim 1, wherein the width of the operating member is set to be smaller than the width of the shutter guide portion.

3. The disc cartridge as claimed in claim 1, wherein the operating member is joined to the shutter guide portion while a through-hole provided at the one end portion of the operating member is loosely fitted to a support shaft provided on the outer surface of the shutter guide portion.

4. A disc cartridge according to claim 1, wherein said aperture is located in the base of the case in which the disc-shaped medium is housed.

5. A disc cartridge according to claim 1, wherein said disc-shaped medium is substantially surrounded by the cylindrical wall.

6. A disc cartridge characterized by including:
   an aperture to access a disc-shaped medium, the aperture being formed in a case in which a disc-shaped disc medium is rotatably housed inside a cylindrical wall having a substantially cylindrical shape;
   a plate-shaped shutter main body which is rotated to open/close at least a part of the aperture;
   a shutter guide portion which is curved along the cylindrical wall and erectly provided to the shutter main body; and
   an operating member having one end portion joined to the shutter guide portion and the other end portion located at the outside of the case, the other end of the operating member being drawn from the external to rotate the shutter guide portion along the cylindrical wall when at least a part of the aperture is opened,
   wherein the operating member is joined to a portion located at the outer side than the inner peripheral surface of the shutter guide portion.

* * * * *